United States Patent
Hatanaka et al.

(10) Patent No.: US 11,002,896 B2
(45) Date of Patent: May 11, 2021

(54) RETARDATION FILM

(71) Applicant: Sumitomo Chemical Company, Limited, Tokyo (JP)

(72) Inventors: Nobuyuki Hatanaka, Osaka (JP); Shinnosuke Yoshioka, Osaka (JP); Shoichi Ozawa, Niihama (JP); Tatsuaki Kasai, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 61 days.

(21) Appl. No.: 15/391,202

(22) Filed: Dec. 27, 2016

(65) Prior Publication Data
US 2017/0184767 A1 Jun. 29, 2017

(30) Foreign Application Priority Data
Dec. 28, 2015 (JP) .............. JP2015-257134

(51) Int. Cl.
*G02B 5/30* (2006.01)
*C09K 19/38* (2006.01)
*C09K 19/52* (2006.01)
*G02F 1/13363* (2006.01)
*G02F 1/1335* (2006.01)

(52) U.S. Cl.
CPC ........ *G02B 5/3016* (2013.01); *C09K 19/3852* (2013.01); *C09K 19/3861* (2013.01); *C09K 19/52* (2013.01); *G02B 5/3083* (2013.01); *G02F 1/133634* (2013.01); *C09K 2019/523* (2013.01); *C09K 2219/03* (2013.01); *C09K 2323/00* (2020.08); *C09K 2323/03* (2020.08); *G02F 1/133541* (2021.01); *G02F 1/133633* (2021.01); *G02F 1/133637* (2021.01); *G02F 1/133638* (2021.01); *G02F 2201/086* (2013.01)

(58) Field of Classification Search
CPC .... G02B 5/3016; G02B 5/305; G02B 5/3083; C09K 19/3852; C09K 19/3861; C09K 19/52; C09K 2019/523; C09K 2219/03; Y10T 428/10; Y10T 428/1036; G02F 1/133634; G02F 1/133541; G02F 1/133633; G02F 1/133637; G02F 2201/086

USPC ........ 428/1.1, 1.3, 1.31, 1.33; 349/117, 118, 349/194; 252/589, 299.6; 359/492.01; 548/494, 505; 524/94
See application file for complete search history.

(56) References Cited

U.S. PATENT DOCUMENTS

| | | | |
|---|---|---|---|
| 5,296,519 A | 3/1994 | Otsuka | |
| 5,401,438 A | 3/1995 | Otsuka | |
| 2012/0140161 A1* | 6/2012 | Nimura ................. | G02B 5/208 349/194 |
| 2015/0108401 A1* | 4/2015 | Hirai ..................... | C09K 19/54 252/299.4 |
| 2015/0218454 A1 | 8/2015 | Kobayashi et al. | |

FOREIGN PATENT DOCUMENTS

| | | |
|---|---|---|
| JP | H04134065 A | 5/1992 |
| JP | 2006308936 A | 11/2006 |
| JP | 2007284516 A | 11/2007 |
| JP | 2009288756 A | 12/2009 |
| JP | 2015143789 A | 8/2015 |

OTHER PUBLICATIONS

U.S. Appl. No. 15/390,965, filed Dec. 27, 2016.
U.S. Appl. No. 15/391,052, filed Dec. 27, 2016.
English Translation of Office Action dated Apr. 20, 2020 in CN Application No. 201611233366.9.

* cited by examiner

*Primary Examiner* — Ruiyun Zhang
(74) *Attorney, Agent, or Firm* — Panitch Schwarze Belisario & Nadel LLP

(57) ABSTRACT

Disclosed is a retardation film which shows a high light selective absorbency to visible rays having short wavelengths near 400 nm to have a high light resistance, and which can give, when used in a display device, good display properties to the display device. This film is a retardation film, satisfying all of the following formulae (1) to (4): $2 \leq A(380)$ (1), $0.5 \leq A(400)$ (2), $0.4 \geq A(420)/A(400)$ (3), and $100 \text{ nm} \leq Re(550) \leq 170 \text{ nm}$ (4), in which each $A(\lambda)$ represents the absorbance of the film at a wavelength $\lambda$ nm, and Re (550) represents the in-plane retardation value of the film to a light ray having a wavelength of 550 nm.

8 Claims, No Drawings

RETARDATION FILM

BACKGROUND OF THE INVENTION

Field of the Invention

The present invention relates to a retardation film, a circularly polarizing plate including the retardation film, and a display device including the retardation film.

Description of the Related Art

In a flat panel display device (FPD) such as an organic EL display device or a liquid crystal display device, various members are used, examples thereof including display elements such as an organic EL element and a liquid crystal cell, and optical films such as a polarizing plate and a retardation film. An organic EL compound, a liquid crystal compound and other materials that are used for these members are organic substances. Thus, a problem may be caused that these materials are deteriorated by ultraviolet rays (UV). In order to solve such a problem, various countermeasures have been made.

For example, according to Patent Literature 1 (JP-A-2006-308936), such members are prevented from being deteriorated by adding an UV absorbent into a protection film for polarizing plates used in these display devices. Moreover, in an actual situation that display devices are desired to be made thinner, a polarizing plate without having any protection film has been required. Patent Literature 2 (JP-A-2015-143789) discloses an attempt for producing a retardation film from a polymerizable liquid crystal compound having a UV absorbing function to express both of the UV absorbing function and a retardation function.

CITATION LIST

Patent Literatures

Patent Literature 1: JP-A-2006-308936
Patent Literature 2: JP-A-2015-143789

In recent years, about display devices such as liquid crystal displays, there are caused problems that when a person views their display over a long period, the person is tired and is deteriorated in visual power. For a countermeasure thereagainst, the display devices are required to have a blue light cutting function of cutting visual rays having short wavelengths (near 400 nm).

It has been becoming evident in connection with the present invention that various members constituting a display device are deteriorated in performances by not only ultraviolet rays but also visible rays each having a short wavelength. Optical films such as a polarizing plate are required to have an absorption property in regard to light having a wavelength near 400 nm. In the meantime, in order to give good display properties to a display device, it is necessary that the display device does not show any absorption property to visible rays having wavelengths more than 430 nm (for example, blue light), and it is important that the device has a high light selective absorbency to visible rays having short wavelengths of near 400 nm.

Furthermore, in order to respond to the requirement of making any display device thinner to attain the matter of causing the display device to have a sufficient UV absorption property and further making its optical film thinner, it is conceivable to blend a light absorbent into the optical film, which is e.g., a retardation film. The blend of a light absorbent into a pressure-sensitive adhesive is frequently performed. However, in many cases, a layer made of the pressure-sensitive adhesive is relatively thick; thus, it may become difficult to make the display device thinner. In the meantime, when a light absorbent is blended into an optical film, by using not a micro-order pressure-sensitive adhesive but a nano-order adhesive, it becomes possible to bond the retardation film onto any other member and it is expected to make the display device thinner. However, when the light absorbent is blended into the optical film, it becomes necessary that the light absorbent has a high solubility into a liquid crystal compound or coating liquid which forms the retardation film or is to be form the optical film, and that the light absorbent has an affinity with the material constituting the retardation film. If these properties are insufficient, the ultraviolet absorbent bleeds out with time after the retardation film is formed and further the orientation of the liquid crystal is hindered so that the display device may be lowered in optical function.

SUMMARY OF THE INVENTION

Thus, an object of the present invention is to provide a retardation film which shows a high light selective absorbency to visible rays having short wavelengths near 400 nm to have a high light resistance, and which can give, when used in a display device, good display properties to the display device.

The present invention provides the following preferred aspects:

[1] A retardation film, satisfying all of the following formulae (1) to (4):

$$2 \leq A(380) \tag{1},$$

$$0.5 \leq A(400) \tag{2},$$

$$0.4 \geq A(420)/A(400) \tag{3, and}$$

$$100 \text{ nm} \leq Re(550) \leq 170 \text{ nm} \tag{4}$$

wherein each $A(\lambda)$ represents the absorbance of the film at a wavelength of $\lambda$ nm, and $Re(550)$ represents the in-plane retardation value of the film to a light ray having a wavelength of 550 nm.

[2] The retardation film according to item 1, which has a thickness of 0.5 to 5 μm both inclusive.

[3] The retardation film according to item [I] or [2], which is a layer comprising a polymer which is made from a polymerizable liquid crystal compound in an orientation state.

[4] The retardation film according to any one of items [1] to [3], which further has an optical property represented by the following formulae (5) and (6):

$$Re(450)/Re(550) \leq 1 \tag{5, and}$$

$$1 \leq Re(650)/Re(550) \tag{6}$$

wherein each $Re(\lambda)$ represents the in-plane retardation value of the film to a light ray having a wavelength of $\lambda$ nm.

[5] The retardation film according to items [1] to [4], wherein the polymer, which is made from the orientation-state polymerizable liquid crystal compound, shows a maximum absorption at a wavelength of 300 to 400 nm, and further shows an absorption satisfying the formula (1).

[6] The retardation film according to any one of items [1] to [5], comprising a compound showing a maximum absorbance at a wavelength of 360 to 420 nm.

[7] The retardation film according to item [6], wherein the compound showing the maximum absorbance at a wavelength of 360 to 420 nm satisfies the following formula (I):

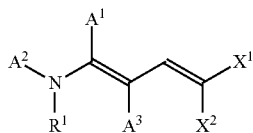

wherein $R^1$ represents a hydrogen atom or an alkyl group having 1 to 10 carbon atoms provided that when the alkyl group has one or more methylene groups, the methylene group or at least one of the methylene groups is optionally substituted with an oxygen atom or a sulfur atom;

$A^1$, $A^2$ and $A^3$ each independently represent a hydrogen atom, an alkyl group having 1 to 6 carbon atoms, an aromatic hydrocarbon group, or an aromatic heterocyclic group provided that when the alkyl group has one or more methylene groups, the methylene group or at least one of the methylene groups is optionally substituted with a secondary amino group, an oxygen atom or sulfur atom, that the aromatic hydrocarbon group and the aromatic heterocyclic group may each have a substituent, and that $A^1$ and $A^2$, as well as $A^1$ and $A^3$, may be linked to each other to form a cyclic structure; and $X^1$ and $X^2$ each independently represent an electron withdrawing group, and $X^1$ and $X^2$ may be linked to each other to form a cyclic structure.

[8] A circularly polarizing plate, comprising the retardation film recited to any one of items [1] to [7], and a polarizing plate laminated over the retardation film, wherein a slow axis of the retardation film and an absorption axis of the polarizing plate make an angle of substantially 45°.

[9] An organic EL display device, comprising the circularly polarizing plate recited in item [8].

[10] An elliptically polarizing plate, comprising the retardation film recited in any one of items [1] to [7], and a polarizing plate laminated over the retardation film, a slow axis of the retardation film being consistent with or orthogonal to an absorption axis of the polarizing plate.

[11] A liquid crystal display device, comprising the elliptically polarizing plate recited in item [10].

The present invention makes it possible to provide a retardation film which shows a high absorption property to visible rays having short wavelengths near 400 nm to have a high light resistance, and which can give, when used in a display device, good display properties to the display device while having a blue light cutting function.

DETAILED DESCRIPTION OF THE PREFERRED EMBODIMENTS

Hereinafter, embodiments of the present invention will be described in detail. The scope of the invention is not limited to the embodiments described herein. Thus, the embodiments may be various changed as far as the changed embodiments do not damage the subject matter of the invention.

The retardation film of the present invention is a retardation film satisfying all of the following formulae (1) to (4):

$2 \leq A(380)$ (1), $0.5 \leq A(400)$ (2), $0.4 \geq A(420)/A(400)$ (3), and $100 \text{ nm} \leq Re(550) \leq 170 \text{ nm}$ (4).

In the formulae (1), (2) and (3), each A(A) represents the absorbance of the film at a wavelength of λ nm, and Re(550) represents the in-plane retardation value of the film to a light ray having a wavelength of 550 nm. When a retardation film satisfies the formulae (1) to (4), this retardation film shows a high absorption property to ultraviolet rays having wavelengths near 380 nm and visible rays having short wavelengths near 400 nm. Thus, this film can be restrained from being deteriorated by the ultraviolet rays having wavelengths near 380 nm and the visible rays having short wavelengths near 400 nm. Furthermore, when this film is used in a display device, the film becomes a retardation film that can give good display properties to the device.

It is demonstrated that as the value A(380) is larger, the film more largely absorbs light at a wavelength of 380 nm. If this value is less than 2, the film weakly absorbs light at the wavelength of 380 nm, so that an organic EL element or any other display element which is positioned below the film is easily deteriorated. Light having ultraviolet wavelengths particularly causes a deterioration in individual members constituting a display device; thus, in the retardation film of the invention, the value A(380) is 2 or more, preferably 2.2 or more, more preferably 2.5 or more, even more preferably 2.8 or more, in particular preferably 3 or more. The upper limit of the value A(380) is not particularly limited, and is usually 4 from the viewpoint of the compatibility of the retardation film with the members.

It is demonstrated that as the value A(400) is larger, the film more largely absorbs light at a wavelength of 400 nm. If this value is less than 0.5, the film weakly absorbs light at the wavelength of 400 nm, so that the retardation film is easily deteriorated by light having wavelengths near 400 nm and further when the retardation film is used in a display device, an organic EL element or any other display element that is positioned below the retardation film is easily deteriorated. Light rays having wavelengths near 400 nm, as well as ultraviolet rays, cause a deterioration in individual elements constituting the display device. In the retardation film of the invention, for this reason, and for a purpose of giving a good blue cutting function to the film, the value A(400) is 0.5 or more, preferably 0.6 or more, more preferably 0.7 or more, even more preferably 1 or more, in particular preferably 1.2 or more. The value is, for example, 2 or more. The upper limit of the value A(400) is not particularly limited, and is usually 4 from the viewpoint of the compatibility of the retardation film with the members.

The value A(420)/A(400) represents the absorption intensity of the film at a wavelength of 400 nm to that of the film at a wavelength of 420 nm. As this value is smaller, greater is the possibility that the film shows a specific absorption at wavelengths near 400 nm. As this value is smaller, the film becomes a more transparent retardation film, which is less yellowish. If this value is more than 0.4, the film cannot sufficiently absorb light having wavelengths near 400 nm, or the film unfavorably absorbs blue light having wavelengths near 420 nm and emitted from a display element such as an organic EL element. Thus, if this film is used in a display device, the film hinders a good color expression so that display properties of the display device tend to be lowered. Thus, in the retardation film of the present invention, the value A(420)/A(400) is 0.4 or less, preferably 0.3 or less, more preferably 0.25 or less, even more preferably 0.23 or less, in particular preferably 0.2 or less. The value is, for example, 0.15 or less. The lower limit thereof is not particularly limited, and is usually preferably 0.01. In a preferred embodiment of the present invention, the value A(420)/A(400) is from 0.07 to 0.15.

The retardation film of the present invention can function as a quarter wavelength plate by having the optical property represented by the formula (4). In the retardation film of the invention, Re(550) is theoretically preferably 137.5 nm. This film preferably satisfies the following formula (4-1) as giving good display properties:

$$130 \text{ nm} \leq Re(550) \leq 150 \text{ nm} \qquad (4\text{-}1).$$

Furthermore, the retardation film of the present invention preferably has reverse-wavelength dispersibility. The reverse-wavelength dispersibility is such an optical property that the in-plane retardation value of the film at short wavelengths is larger than that at long wavelengths. The retardation film preferably satisfies formulae (5) and (6) described below. Each Re(λ) represents the in-plane retardation vale of the film to light having a wavelength λ nm.

$$Re(450)/Re(550) \leq 1 \qquad (5)$$

$$1 \leq Re(630)/Re(550) \qquad (6)$$

In a case where the retardation film of the present invention has reverse-wavelength dispersibility, at the time when the display device gives a black display, coloration is favorably lowered. When the formula (5) is limited to the following formula, a more preferable result is obtained: 0.82≤Re(450)/Re(550)≤0.93.

The retardation film having optical properties satisfying the formulae (5) and (6) can give an elliptically polarizing plate or a circularly polarizing plate by combining this film with a polarizing plate. This circularly polarizing plate tends to be excellent in anti-reflection property since the plate gives a uniform polarization conversing property to a light ray having each visible ray wavelength. Furthermore, the circularly polarizing plate has a high light resistance against ultraviolet rays having wavelengths near 380 nm, and visible rays having short wavelengths near 400 nm.

The retardation film of the present invention is preferably a layer including a polymer which is made from a polymerizable liquid crystal compound in an orientation state (hereinafter, this layer will also be referred to as the "optically anisotropic layer"). The polymerizable liquid crystal compound is a liquid crystal compound having a polymerizable functional group, particularly, a photopolymerizable functional group. The photopolymerizable functional group denotes a group that can be related to polymerization reaction through, e.g., an active radical or acid generated from a photopolymerization initiator. Examples of the photopolymerizable group include vinyl, vinyloxy, 1-chlorovinyl, isopropenyl, 4-vinylphenyl, acryloyloxy, methacryloyloxy, oxiranyl, and oxetanyl groups. Out of these groups, preferred are acryloyloxy, methacryloyloxy, vinyloxy, oxiranyl, and oxetanyl groups. More preferred is an acryloyloxy group. The liquid crystal of the polymer may be thermotropic liquid crystal, or lyotropic liquid crystal. A phase order structure in the thermotropic liquid crystal may be a nematic liquid crystal or smectic liquid crystal structure.

The polymerizable liquid crystal compound in particular preferably has a structure of the following formula (a) since the compound of this structure expresses the above-mentioned reverse-wavelength dispersibility:

[Chem. 2]

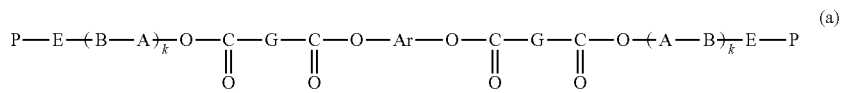

(a)

In the formula (a), Ar is a bivalent aromatic group, and this aromatic group has therein at least one of a nitrogen atom, an oxygen atom, and a sulfur atom;

Gs each represent a bivalent alicyclic hydrocarbon group provided that any hydrogen atom contained in the alicyclic hydrocarbon group is optically substituted with a halogen atom, an alkyl group having 1 to 4 carbon atoms, a fluoroalkyl group having 1 to 4 carbon atoms, an alkoxy group having 1 to 4 carbon atoms, a cyano group or a nitro group, and that any —CH$_2$— (methylene group) contained in the alicyclic hydrocarbon group is optically substituted with —O—, —S—, or NH—;

B(s) (each) represent(s) a single bond or a bivalent linking group;

A(s) (each) represent(s) a bivalent alicyclic hydrocarbon group having 3 to 20 carbon atoms, or a bivalent aromatic hydrocarbon group having 6 to 20 carbon atoms provided that any hydrogen contained in the alicyclic hydrocarbon group and the aromatic hydrocarbon group is optionally substituted with an alkyl group which has 1 to 4 carbon atoms and which is optionally substituted with a halogen atom, an alkoxy group which has 1 to 4 carbon atoms and which is optionally substituted with a fluorine atom, a cyano group or a nitro group, that —CH$_2$— contained in the alicyclic hydrocarbon group is optionally substituted with —O—, —S—, or —NR$^1$— wherein R$^1$ represents a hydrogen atom or an alkyl group having 1 to 4 carbon atoms, and that —CH(—)— contained in the alicyclic hydrocarbon group is optionally substituted with —N(—)—;

k's each represent an integer of from 0 to 3 provided that when each of k's is an integer of 2 or more, plural As, as well as Bs, may be the same as or different from each other;

Es each represent an alkanediyl group having 1 to 17 carbon atoms provided that any hydrogen atom contained in the alkanediyl group is optionally substituted with a halogen atom, and that —CH$_2$— contained in the alkanediyl group is optionally substituted with —O—, or CO—;

Ps each represent a polymerizable group.

In the formula (a), the bivalent aromatic group represented by Ar is preferably an aromatic group having a heterocycle from the viewpoint of the expression of the reverse-wavelength dispersibility. An example thereof is an aromatic group having a furan, benzofuran, pyrrole, thiophene, pyridine, thiazole, benzothiazole or phenanthroline ring and having at least one of nitrogen, oxygen and sulfur atoms. The aromatic group having a heterocycle is in particular preferably an aromatic group having a benzene, thiazole or benzothiazole ring; and is more preferably an aromatic group having a benzothiazole ring. Any nitrogen atom contained in the aromatic ring in Ar preferably has one or more π electrons.

The total number N$_\pi$ of the π electron(s) contained in the aromatic ring is preferably 10 or more, more preferably 12 or more, even more preferably 14 or more, and is preferably 30 or less, more preferably 25 or less from the viewpoint of the expression of the reverse-wavelength dispersibility.
Examples of the aromatic ring represented by Ar include the following groups:
[Chem. 3]
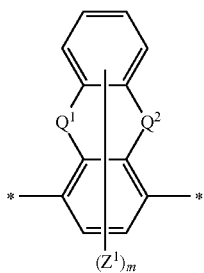
(Ar-1)
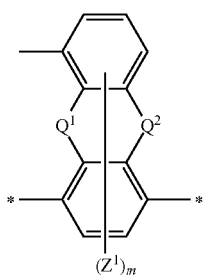
(Ar-2)
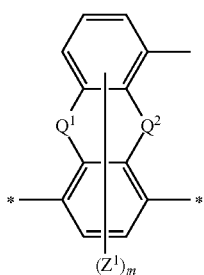
(Ar-3)
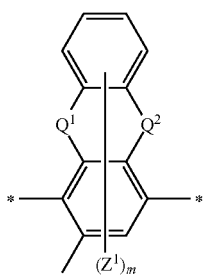
(Ar-4)
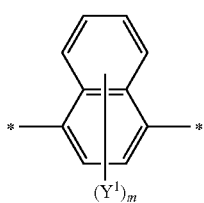
(Ar-5)
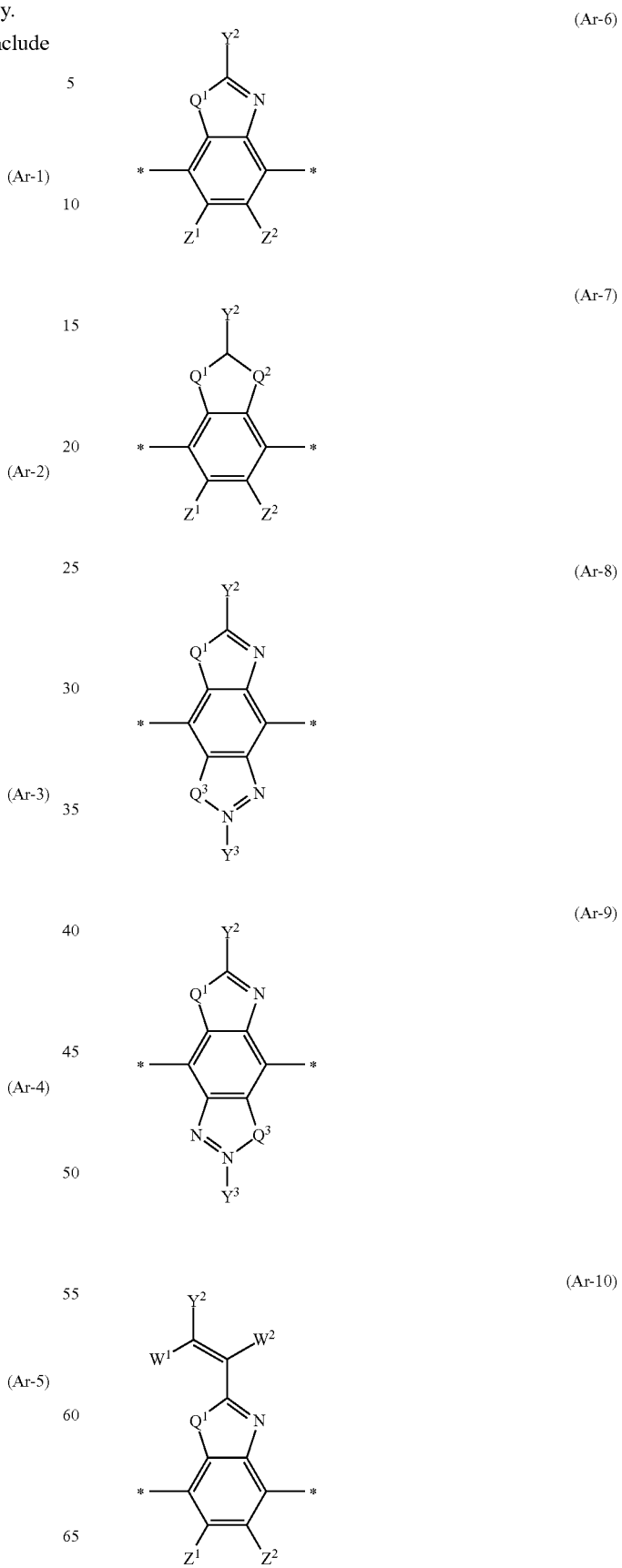

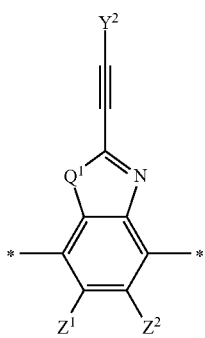
(Ar-11)
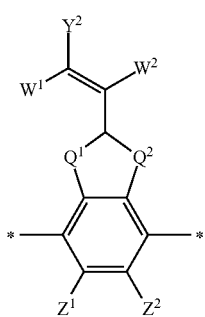
(Ar-12)
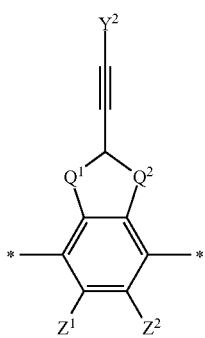
(Ar-13)
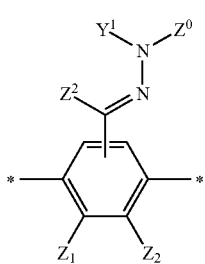
(Ar-14)
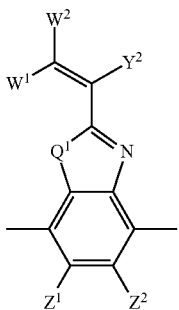
(Ar-15)
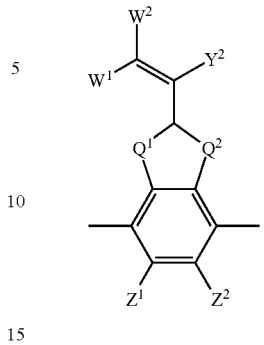
(Ar-16)
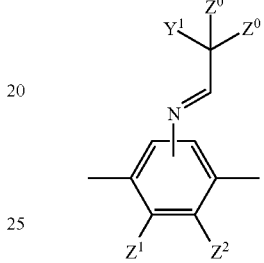
(Ar-17)
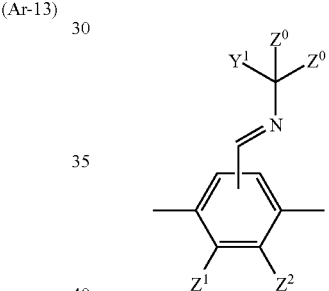
(Ar-18)
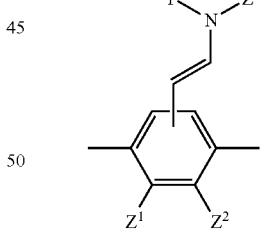
(Ar-19)
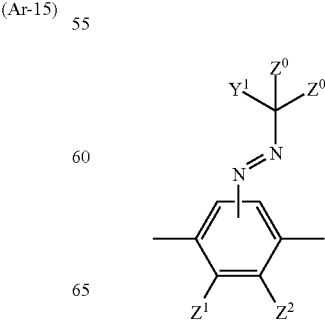
(Ar-20)

-continued

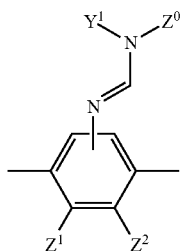
(Ar-21)

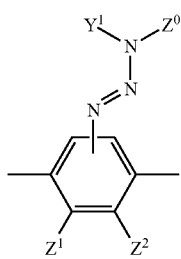
(Ar-22)

In the formulae (Ar-1) to (Ar-22), each symbol * represents a linking moiety; $Z^0$, $Z^1$s and $Z^2$s each independently represent a hydrogen atom, a halogen atom, an alkyl group having 1 to 6 carbon atoms, a cyano group, a nitro group, or an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, an N-alkylamino group having 1 to 6 carbon atoms, an N, N-dialkylamino group having 2 to 12 carbon atoms, an N-alkylsulfamoyl group having 1 to 6 carbon atoms, or an N,N-dialkylsulfamoyl group having 2 to 12 carbon atoms;

$Q^1$s, $Q^2$s and $Q^3$ each independently represent —$CR^{2'}R^{3'}$—, —S—, —$NR^{2'}$—, —CO—, or O— wherein $R^{2'}$ and $R^{3'}$ each independently represent a hydrogen atom or an alkyl group having 1 to 4 carbon atoms;

$Y^1$s, $Y^2$s and $Y^3$s each independently represent an aromatic hydrocarbon group or aromatic heterocyclic group that is optionally substituted;

$W^1$s and $W^2$s each independently represent a hydrogen atom, a cyano group, a methyl group or a halogen atom; and m's each represent an integer of from 0 to 6.

Examples of each of the above-mentioned halogen atoms include fluorine, chlorine, bromine, and iodine atoms. Preferred are fluorine, chlorine, and bromine atoms.

Examples of the alkyl group having 1 to 6 carbon atoms include methyl, ethyl, propyl, isopropyl, butyl, isobutyl, sec-butyl, tert-butyl, pentyl, and hexyl groups. Preferred is any alkyl group having 1 to 4 carbon atoms, more preferred is any alkyl group having 1 to 2 carbon atoms, and particularly preferred is a methyl group.

Examples of the alkylsulfinyl group having 1 to 6 carbon atoms include methylsulfinyl, ethylsulfinyl, propylsulfinyl, isopropylsulfinyl, butylsulfinyl, isobutylsulfinyl, sec-butylsulfinyl, tert-butylsulfinyl, pentylsulfinyl, and hexylsulfinyl groups. Preferred is any alkylsulfinyl group having 1 to 4 carbon atoms, more preferred is any alkylsulfinyl group having 1 to 2 carbon atoms, and particularly preferred is a methylsulfinyl group.

Examples of the alkylsulfonyl group having 1 to 6 carbon atoms include methylsulfonyl, ethylsulfonyl, propylsulfonyl, isopropylsulfonyl, butylsulfonyl, isobutylsulfonyl, sec-butylsulfonyl, tert-butylsulfonyl, pentylsulfonyl, and hexyl sulfonyl groups. Preferred is any alkylsulfonyl group having 1 to 4 carbon atoms, more preferred is any alkylsulfonyl group having 1 to 2, and particularly preferred is methylsulfonyl group.

Examples of the fluoroalkyl group having 1 to 6 carbon atoms include fluoromethyl, trifluoromethyl, fluoroethyl, pentafluoroethyl, heptafluoropropyl, and nonafluorobutyl groups. Preferred is any fluoroalkyl group having 1 to 4 carbon atoms, more preferred is any fluoroalkyl group having 1 to 2 carbon atoms, and particularly preferred is a trifluoromethyl group.

Examples of the alkoxy group having 1 to 6 carbon atoms include methoxy, ethoxy, butoxy, propoxy, isopropoxy, butoxy, isobutoxy, sec-butoxy, tert-butoxy, pentyloxy, and hexyloxy groups. Preferred is any alkoxy group having 1 to 4 carbon atoms, more preferred is any alkoxy group having 1 to 2 carbon atoms, and particularly preferred is a methoxy group.

Examples of the alkylthio group having 1 to 6 carbon atoms include methylthio, ethylthio, propylthio, isopropylthio, butylthio, isobutylthio, sec-butylthio, tert-butylthio, pentylthio, and hexylthio groups. Preferred is any alkylthio group having 1 to 4 carbon atom, more preferred is any alkylthio group having 1 to 2 carbon atom, and particularly preferred is a methylthio group.

Examples of the N-alkylamino group having 1 to 6 carbon atoms include N-methylamino, N-ethylamino, N-propylamino, N-isopropylamino, N-butylamino, N-isobutylamino, N-sec-butylamino, N-tert-butylamino, N-pentylamino, and N-hexylamino groups. Preferred is any N-alkylamino group having 1 to 4 carbon atoms, more preferred is any N-alkylamino group having 1 to 2 carbon atoms, and particularly preferred is an N-methylamino group.

Examples of the N,N-dialkylamino group having 2 to 12 carbon atoms include N,N-dimethylamino, N-methyl-N-ethylamino, N,N-diethylamino, N,N-dipropylamino, N,N-diisopropylamino, N,N-dibutylamino, N,N-diisobutylamino, N,N-dipentylamino, and N,N-dihexylamino groups. Preferred is any N,N-dialkylamino group having 2 to 8 carbon atoms, more preferred is any N,N-dialkylamino group having 2 to 4 carbon atoms, and particularly preferred is an N,N-dimethylamino group.

Examples of the N-alkylsulfamoyl group having 1 to 6 carbon atoms include N-methylsulfamoyl, N-ethylsulfamoyl, N-propylsulfamoyl, N-isopropylsulfamoyl, N-butylsulfamoyl, N-isobutylsulfamoyl, N-sec-butylsulfamoyl, N-tert-butylsulfamoyl, N-pentylsulfamoyl, and N-hexylsulfamoyl groups. Preferred is any N-alkylsulfamoyl group having 1 to 4 carbon atoms, more preferred is any N-alkylsulfamoyl group having 1 to 2 carbon atoms, and particularly preferred is an N-methylsulfamoyl group.

Examples of the N,N-dialkylsulfamoyl group having 2 to 12 carbon atoms include N,N-dimethylsulfamoyl, N-methyl-N-ethylsulfamoyl, N,N-diethylsulfamoyl, N,N-dipropylsulfamoyl, N,N-diisopropylsulfamoyl, N,N-dibutylsulfamoyl, N,N-diisobutylsulfamoyl, N,N-dipentylsulfamoyl, and N,N-dihexylsulfamoyl groups. Preferred is any N,N-dialkylsulfamoyl group having 2 to 8 carbon atoms, more preferred is any N,N-dialkylsulfamoyl group having 2 to 4 carbon atoms, and particularly preferred is an N,N-dimethylsulfamoyl group.

$Z^0$, $Z^1$s and $Z^2$s are each independently preferably a hydrogen or halogen atom, or a methyl, cyano, nitro, carboxyl, methylsulfonyl, trifluoromethyl, methoxy, methylthio, N-methylamino, N,N-dimethylamino, N-methylsulfamoyl, or N,N-dimethylsulfamoyl group.

Examples of the alkyl group having 1 to 4 carbon atoms as each of $R^2$'s and $R^3$' include methyl, ethyl, propyl, isopropyl, butyl, isobutyl, and tert-butyl groups. Preferred is any alkyl group having 1 to 2 carbon atoms, and more preferred is a methyl group.

$Q^1$'s and $Q^2$'s are each independently preferably —S—, —CO—, —NH—, or —N(CH$_3$)—. $Q^3$ is preferably —S— or —CO—.

Examples of the above-mentioned aromatic hydrocarbon group, as each of $Y^1$'s, $Y^2$'s and $Y^3$'s, include aromatic hydrocarbon groups having 6 to 20 carbon atoms, such as phenyl, naphthyl, anthryl, phenanthryl, and biphenyl groups. The aromatic hydrocarbon group is preferably a phenyl or naphthyl group, more preferably a phenyl group. Examples of the aromatic heterocyclic group, as the same, include aromatic heterocyclic groups containing one or more heteroatoms such as one or more nitrogen, oxygen and/or sulfur atoms, and having 4 to 20 carbon atoms, such as furyl, pyrrolyl, thienyl, pyridinyl, thiazolyl, and benzothiazolyl groups. Preferred are furyl, pyrrolyl, thienyl, pyridinyl, and thiazolyl groups.

The aromatic hydrocarbon group and the aromatic heterocyclic group may each have at least one substituent. Examples of the substituent include halogen atoms, alkyl groups having 1 to 6 carbon atoms, a cyano group, a nitro group, alkylsufinyl groups having 1 to 6 carbon atoms, alkylsulfonyl groups having 1 to 6 carbon atoms, a carboxyl group, fluoroalkyl groups having 1 to 6 carbon atoms, alkoxy groups having 1 to 6 carbon atoms, alkylthio groups having 1 to 6 carbon atoms, N-alkylamino groups having 1 to 6 carbon atoms, N,N-dialkylamino groups having 2 to 12 carbon atoms, N-alkylsulfamoyl groups having 1 to 6 carbon atoms, and N,N-dialkylsulfamoyl groups having 2 to 12 carbon atoms. Preferred are halogen atoms, alkyl groups having 1 to 2 carbon atoms, a cyano group, a nitro group, alkylsulfonyl groups having 1 to 2 carbon atoms, fluoroalkyl groups having 1 to 2 carbon atoms, alkoxy groups having 1 to 2 carbon atoms, alkylthio groups having 1 to 2 carbon atoms, N-alkylamino groups having 1 to 2 carbon atoms, N,N-dialkylamino groups having 2 to 4 carbon atoms, and alkylsulfamoyl groups having 1 to 2 carbon atoms.

Examples of the following are the same as described above: the halogen atoms, the alkyl groups having 1 to 6 carbon atoms, the cyano group, the nitro group, the alkylsufinyl groups having 1 to 6 carbon atoms, the alkylsulfonyl groups having 1 to 6 carbon atoms, the carboxyl group, the fluoroalkyl groups having 1 to 6 carbon atoms, the alkoxy groups having 1 to 6 carbon atoms, the alkylthio groups having 1 to 6 carbon atoms, the N-alkylamino groups having 1 to 6 carbon atoms, the N,N-dialkylamino groups having 2 to 12 carbon atoms, the N-alkylsulfamoyl groups having 1 to 6 carbon atoms, and the N, N-dialkylsulfamoyl groups having 2 to 12 carbon atoms.

In the formula (Ar-14), $Y^1$ may be combined with the nitrogen atom bonded to $Y^1$, and $Z^0$ to form an aromatic heterocyclic group. Examples of the group include pyrrole, imidazole, pyridine, pyrimidine, indole, quinoline, isoquinoline, purine, pyrrolidine, and piperidine rings. This aromatic heterocyclic group may have a substituent. Moreover, $Y^1$ may be combined with the nitrogen atom bonded to $Y^1$, and $Z^0$ to form a polycyclic type aromatic hydrocarbon group or polycyclic type aromatic heterocyclic group that will be detailed later and is optionally substituted.

$Y^1$'s, $Y^2$'s and $Y^3$'s may be each independently a polycyclic type aromatic hydrocarbon group or polycyclic type aromatic heterocyclic group that is optionally substituted. The polycyclic type aromatic hydrocarbon group denotes a group originating from a condensed polycyclic type hydrocarbon group, or assembled aromatic rings. The polycyclic type aromatic heterocyclic group denotes a group originating from a condensed polycyclic type aromatic heterocyclic group, or assembled aromatic rings. For example, $Y^1$, $Y^2$ and $Y^3$ are each independently preferably any of the groups represented by formulae ($Y^1$-1) to ($Y^1$-7), and more preferably any of the groups represented by formulae ($Y^1$-1) to ($Y^1$-4).

[Chem. 4]

($Y^1$-1)

($Y^1$-2)

($Y^1$-3)

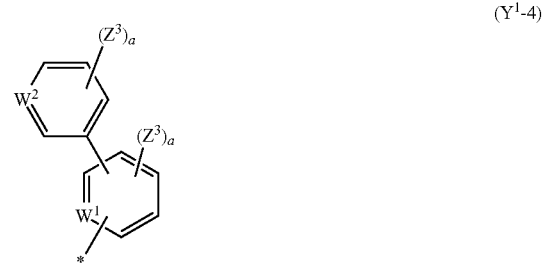

($Y^1$-4)

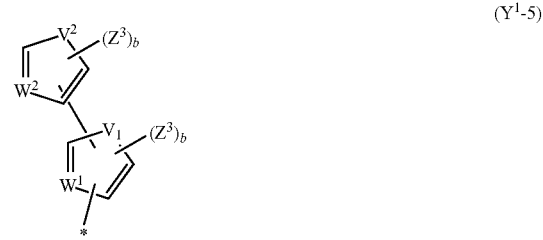

($Y^1$-5)

-continued

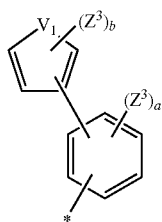
(Y¹-6)

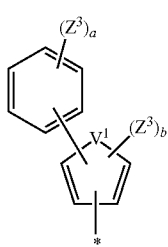
(Y¹-7)

[In formulae (Y¹-1) to (Y¹-7), * represents a linking unit, and Z³ independently represents a halogen atom, an alkyl group having 1 to 6 carbon atoms, a cyano group, a nitro group, a nitroxide group, a sulfone group, a sulfoxide group, a carboxyl group, a fluoroalkyl group having 1 to 6 carbon atoms, an alkoxy group having 1 to 6 carbon atoms, a thioalkyl group having 1 to 6 carbon atoms, an N, N-dialkylamino group having 2 to 8 carbon atoms, or an N-alkylamino group having 1 to 4 carbon atoms.

$V^1$ and $V^2$ each independently represent —CO—, —S—, —NR⁴—, —O—, —Se— or —SO₂—.

$W^1$ to $W^5$ each independently represent —C= or —N=, where at least one of $V^1$, $V^2$, and $W^1$ to $W^5$ represents a group containing S, N, O or Se.

$R^4$ represents a hydrogen atom or an alkyl group having 1 to 4 carbon atoms.

a independently represents an integer of 0 to 3.

b independently represents an integer of 0 to 2.

Any of the groups represented by formulae (Y¹-1) to (Y¹-7) is preferably any of the groups represented by formulae (Y²-1) to (Y²-16), and more preferably any of the groups represented by formulae (Y³-1) to (Y³-6), and especially preferably the group represented by formula (Y³-1) or formula (Y³-3).

In formulae (Y²-1) to (Y²-16), Z³, a, b, V¹, V² and W¹ to W⁵ are the same as defined above.

[Chem. 5]

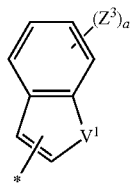
(Y²-1)

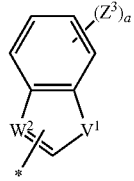
(Y²-2)

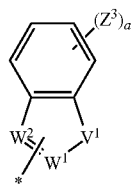
(Y²-3)

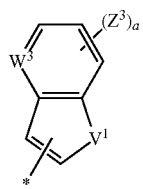
(Y²-4)

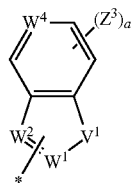
(Y²-5)

(Y²-6)

(Y²-7)

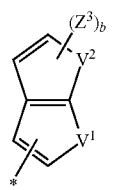
(Y²-8)

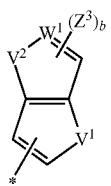 (Y²-9)
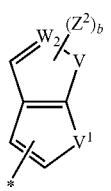 (Y²-10)
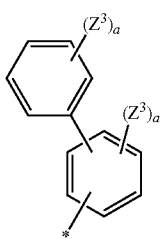 (Y²-11)
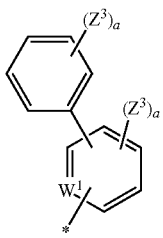 (Y²-12)
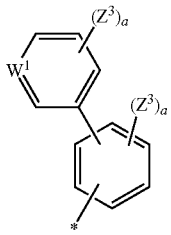 (Y²-13)
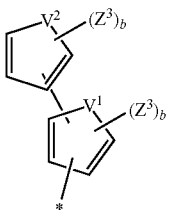 (Y²-14)
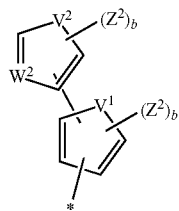 (Y²-15)
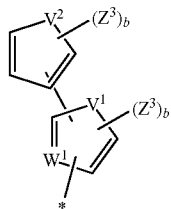 (Y²-16)
[Chem. 6]
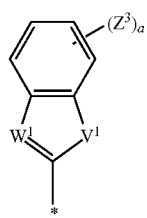 (Y³-1)
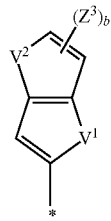 (Y³-2)
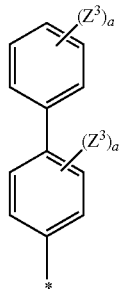 (Y³-3)
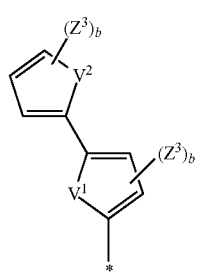 (Y³-4)

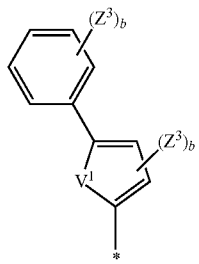
(Y³-5)

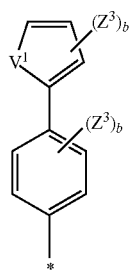
(Y³-6)

In above formulae (Y³-1) to (Y³-6), Z³, a, b, V, V² and W¹ are the same as defined above.

Examples of Z³ include a halogen atom, an alkyl group having 1 to 6 carbon atoms, a cyano group, a nitro group, an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, an N-alkylamino group having 1 to 6 carbon atoms, an N, N-dialkylamino group having 2 to 12 carbon atoms, an N-alkylsulfamoyl group having 1 to 6 carbon atoms, and an N,N-dialkylsulfamoyl group having 2 to 12 carbon atoms. Of these, a halogen atom, a methyl group, an ethyl group, an isopropyl group, a sec-butyl group, a cyano group, a nitro group, a sulfone group, a nitroxide group, a carboxyl group, a trifluoromethyl group, a methoxy group, a thiomethyl group, an N,N-dimethylamino group, and an N-methylamino group are preferable; a halogen atom, a methyl group, an ethyl group, an isopropyl group, a sec-butyl group, a cyano group, a nitro group, a trifluoromethyl group are more preferable; and a methyl group, an ethyl group, an isopropyl group, a sec-butyl group, a pentyl group, and a hexyl group are especially preferable.

Examples of the halogen atom, alkyl group having 1 to 6 carbon atoms, alkylsulfinyl group having 1 to 6 carbon atoms, alkylsulfonyl group having 1 to 6 carbon atoms, fluoroalkyl group having 1 to 6 carbon atoms, alkoxy group having 1 to 6 carbon atoms, alkylthio group having 1 to 6 carbon atoms, N-alkylamino group having 1 to 6 carbon atoms, N,N-dialkylamino group having 2 to 12 carbon atoms, N-alkylsulfamoyl group having 1 to 6 carbon atoms, and N, N-dialkylsulfamoyl group having 2 to 12 carbon atoms include the same groups as those described above.

It is preferable that V¹ and V² are each independently —S—, —NR⁴— or —O—.

It is preferable that W¹ to W⁵ are each independently —C═ or —N═.

It is preferable that at least one of V¹, V², and W¹ to W⁵ represents a group containing S, N or O.

It is preferable that a is 0 or 1. It is preferable that b is 0.

In the formula (a), G is a bivalent alicyclic hydrocarbon group. The number of carbon atoms thereof is, for example, from 3 to 30, preferably from 3 to 20, more preferably from 4 to 15, even more preferably from 5 to 10. The bivalent alicyclic hydrocarbon group is, for example, a cycloalkanediyl group. Any atom contained in the alicyclic hydrocarbon group is optionally substituted with a halogen atom, an alkyl group having 1 to 4 carbon atoms, a fluoroalkyl group having 1 to 4 carbon atoms, an alkoxy group having 1 to 4 carbon atoms, a cyano group or a nitro group. Any —CH₂— (methylene group) contained in the alicyclic hydrocarbon group is optionally substituted with —O—, —S— or NH—.

Examples of the alkyl group having 1 to 4 carbon atoms include methyl, ethyl, propyl, isopropyl, butyl, isobutyl, sec-butyl, and tert-butyl groups. Preferred is any alkyl group having 1 to 3 carbon atoms, and particularly preferred is a methyl group.

Examples of the fluoroalkyl group having 1 to 4 carbon atoms include fluoromethyl, trifluoromethyl, fluoroethyl, pentafluoroethyl, heptafluoropropyl, and nonafluorobutyl groups. Preferred is any fluoroalkyl group having 1 to 3 carbon atoms, more preferred is any fluoroalkyl group having 1 to 2 carbon atoms, and particularly preferred is a trifluoromethyl group.

Examples of the alkoxy group having 1 to 4 carbon atoms include methoxy, ethoxy, propoxy, isopropoxy, butoxy, isobutoxy, sec-butoxy, and tert-butoxy groups. Preferred is any alkoxy group having 1 to 3 carbon atoms, more preferred is any alkoxy group having 1 to 2 carbon atoms, and particularly preferred is a methoxy group.

Examples of the bivalent alicyclic hydrocarbon group include groups represented by formulae (g-1) to (g-4), respectively. Examples of the bivalent alicyclic hydrocarbon group containing a —CH₂— group substituted with —O—, —S—, or N(R⁵')— include groups represented by formulae (g-5) to (g-8), respectively. R⁵' represents a hydrogen atom or an alkyl group having 1 to 4 carbon atoms. Examples of the bivalent alicyclic hydrocarbon group containing a —CH(—)— substituted with —N(—)— include groups represented by formulae (g-9) to (g-10), respectively. The alicyclic hydrocarbon group is preferably a five-membered or six-membered alicyclic hydrocarbon group.

[Chem. 7]

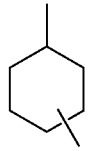
(g-1)

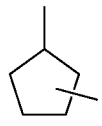
(g-2)

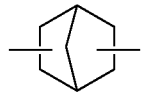
(g-3)

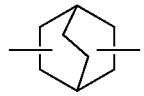
(g-4)

(g-5)
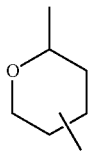

(g-6)
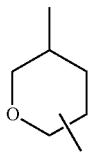

(g-7)
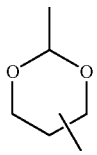

(g-8)
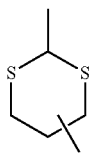

(g-9)
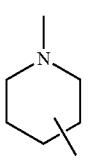

(g-10)
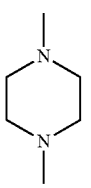

The bivalent alicyclic hydrocarbon group is preferably a group represented by the formula (g-1), more preferably a 1,4-cyclohexanediyl group, in particular preferably a trans-1,4-cyclohexanediyl group.

In the formula (a), B(s) is/are (each) a single bond or a bivalent linking group. Examples of the bivalent linking group include —O—, —S—, —CO—O—, —O—CO—, —C(=S)—O—, —O—C(=S)—, —CR$^{6'}$R$^{7'}$—, —CR$^{6'}$R$^{7'}$—CR$^{8'}$R$^{9'}$—, —O—CR$^{6'}$R$^{7'}$—, —CR$^{6'}$R$^{7'}$—O—, —CR$^{6'}$R$^{7'}$—O—CR$^{8'}$R$^{9'}$—, —CR$^{6'}$R$^{7'}$—O—CO—, —O—CO—CR$^{6'}$R$^{7'}$—, —CR$^{6'}$R$^{7'}$—O—CO—CR$^{8'}$R$^{9'}$—, —CR$^{6'}$R$^{7'}$—CO—O—CR$^{8'}$R$^{9'}$—, —NR$^{10'}$—CR$^{6'}$R$^{7'}$—, —CR$^{6'}$R$^{7'}$—NR$^{10'}$—, —CO—NR$^{10'}$—, —NR$^{10'}$—CO—, —O—, —S—, —NR$^{10'}$—, and —CR$^{6'}$=CR$^{7'}$—. R$^{6'}$s, R$^{7'}$s, R$^{8'}$s and R$^{9'}$s each independently represent a hydrogen atom, a fluorine atom, or an alkyl group having 1 to 4 carbon atoms. R$^{10'}$s each represent a hydrogen atom or an alkyl group having 1 to 4 carbon atoms.

B(s) is/are (each) preferably —O—, —S—, —O—CO—, —O—C(=S)—, —O—CR$^{6'}$R$^{7'}$—, —NR$^{10'}$—CR$^{6'}$R$^{7'}$— or NR$^{10'}$—CO—. D$^1$ and D$^2$ are each preferably —O—, —S—, —O—CO—, —O—C(=S)—, or NR$^{10'}$—CO—. R$^{6'}$s, R$^{7'}$s, R$^{8'}$s, and R$^{9'}$s are each independently preferably a hydrogen atom or an alkyl group having 1 to 4 carbon atoms, more preferably a hydrogen atom, or a methyl or ethyl group. R$^{10'}$s are each preferably a hydrogen atom, or a methyl or ethyl group.

In the formula (a), A(s) (each) represent(s) a bivalent alicyclic hydrocarbon group having 3 to 20 carbon atoms, or a bivalent aromatic hydrocarbon group having 6 to 20 carbon atoms, preferably a bivalent alicyclic hydrocarbon group having 4 to 15 carbon atoms, or a bivalent aromatic hydrocarbon group having 6 to 15 carbon atoms, more preferably a bivalent alicyclic hydrocarbon group having 5 to 12 carbon atoms, or a bivalent aromatic hydrocarbon group having 6 to 12 carbon atoms, even more preferably a bivalent alicyclic hydrocarbon group having 6 to 10 carbon atoms, or a bivalent aromatic hydrocarbon group having 6 to 10 carbon atoms. The alicyclic hydrocarbon group is preferably a five-membered or six-membered alicyclic hydrocarbon group.

Any hydrogen contained in each of the alicyclic hydrocarbon group and the aromatic hydrocarbon group is optionally substituted with a halogen atom such as a fluorine, chlorine, bromine or iodine atom; an alkyl group having 1 to 4 carbon atoms, such as a methyl, ethyl, isopropyl, or tert-butyl group; a fluoroalkyl group having 1 to 4 carbon atoms, such as a trifluoromethyl group; a cyano group; or a nitro group. Any —CH$_2$-contained in the alicyclic hydrocarbon group is optionally substituted with —O—, —S— or NR$^{11'}$—. Any —CH(—)— contained in the alicyclic hydrocarbon group is optionally substituted with —N(—)—. R$^{11'}$ represents an alkyl group having 1 to 4 carbon atoms.

Examples of the bivalent alicyclic hydrocarbon group include groups represented by the formulae (g-1) to (g-10), respectively.

The bivalent alicyclic hydrocarbon group is preferably a group represented by the formula (g-1), more preferably a 1,4-cyclohexanediyl group, in particular preferably a trans-1,4-cyclohexanediyl group.

Examples of the bivalent aromatic hydrocarbon group include groups represented by formulae (a-1) to (a-8), respectively.

[Chem. 8]

(a-1)
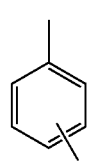

(a-2)
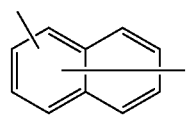

(a-3)
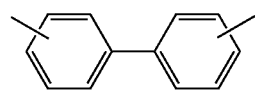

(a-4)
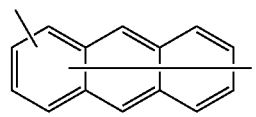

-continued

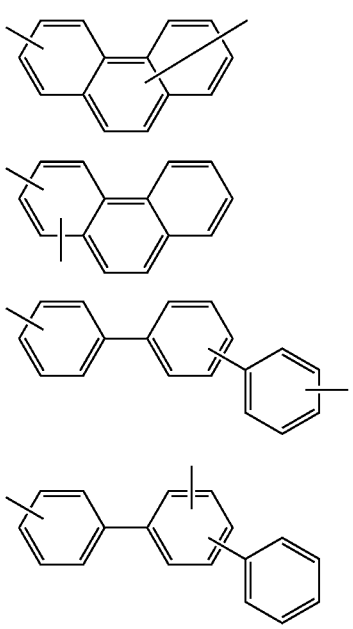

(a-5)

(a-6)

(a-7)

(a-8)

The bivalent aromatic hydrocarbon group is preferably a 1,4-phenylene group.

In the formula (a), k's each represent an integer of 0 to 3, preferably 1 or 2, more preferably 1. When k's are each an integer of 2 or more, plural As, as well as plural Bs, may be the same as or different from each other. The plural As, as well as plural Bs, are preferably the same as each other since the polymerizable liquid crystal compound represented by the formula (a) is industrially obtained with ease.

In the formula (a), Es each represent an alkanediyl group having 1 to 17 carbon atoms, preferably 2 to 15 carbon atoms, more preferably 3 to 12 carbon atoms, even more preferably 4 to 10 carbon atoms. Any hydrogen contained in the alkanediyl group is optionally substituted with a halogen atom. Any —CH$_2$-contained in the alkanediyl group is optionally substituted with —O—, or CO—.

Examples of the polymerizable liquid crystal compound represented by the formula (a) include compounds illustrated below. These polymerizable liquid crystal compounds may be used singly or in any combination of two or more thereof.

[Chem. 9]

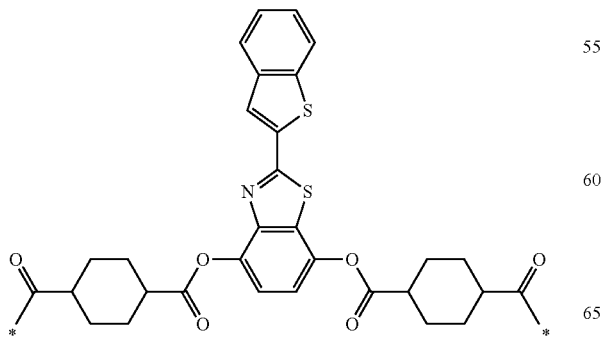

-continued

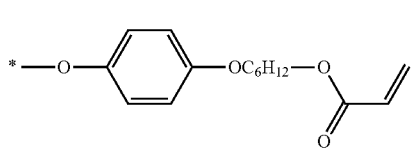
(A1-1)

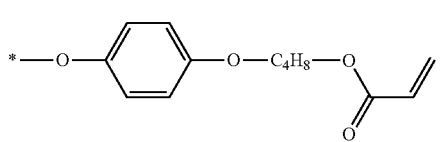
(A1-2)

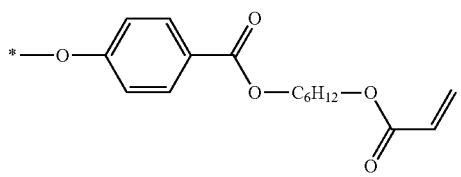
(A1-3)

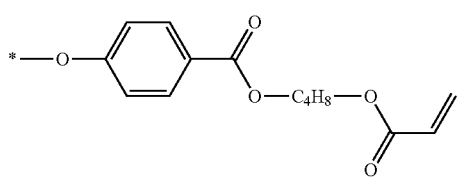
(A1-4)

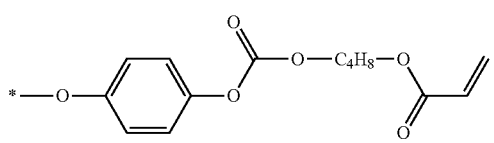
(A1-5)

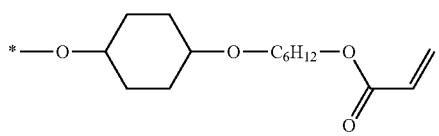
(A1-6)

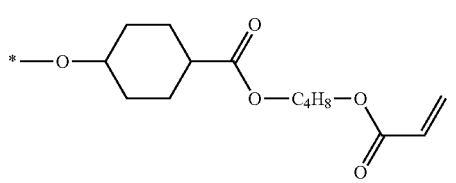
(A1-7)

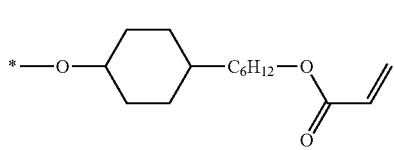
(A1-8)

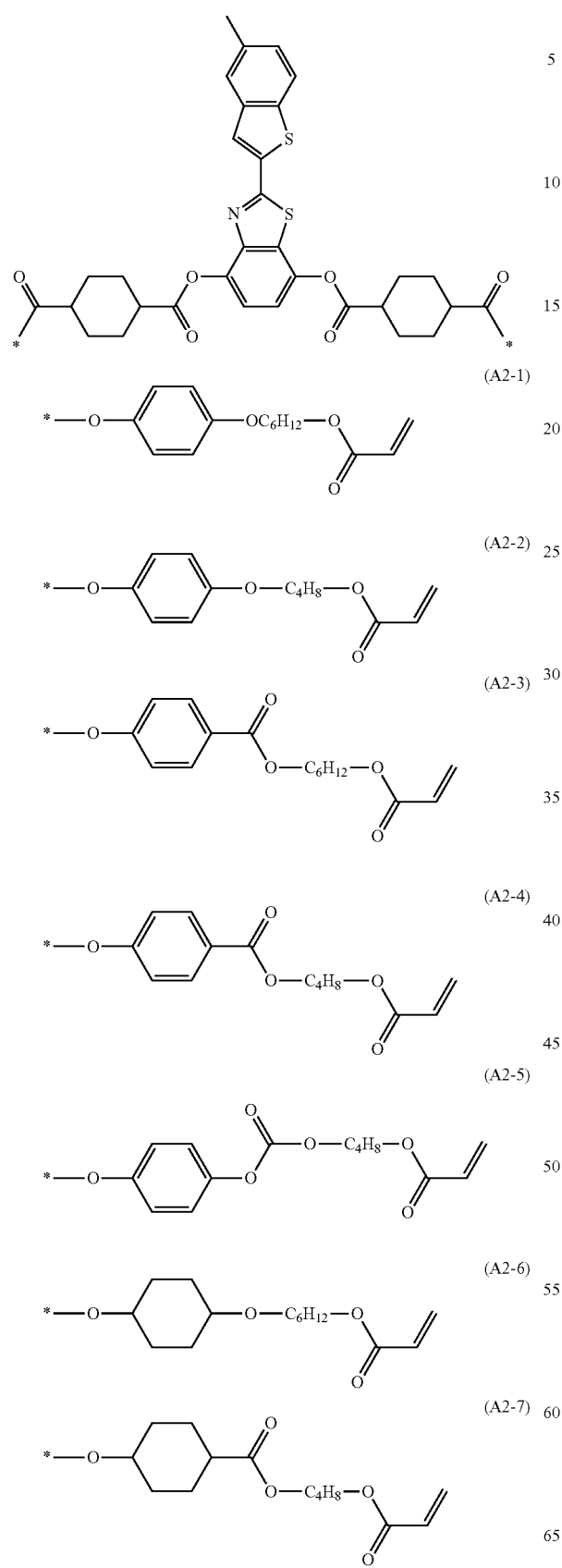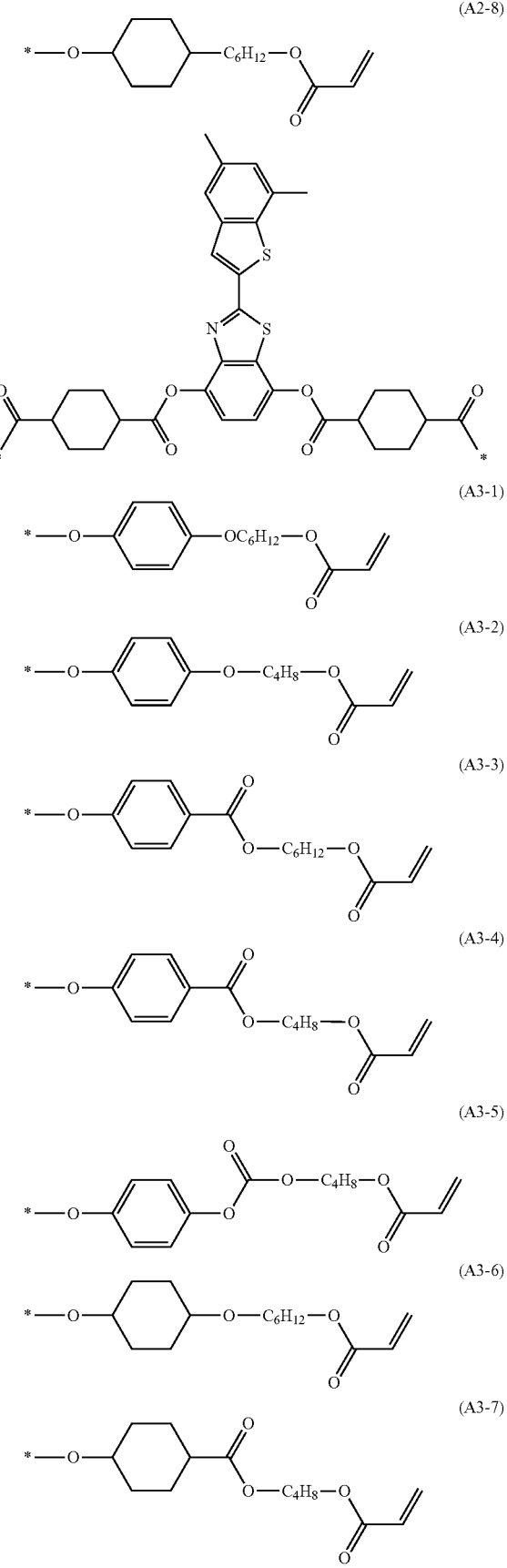

-continued
(A3-8)
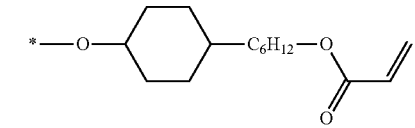
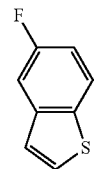
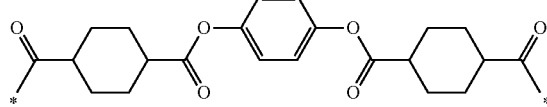
(A4-1)
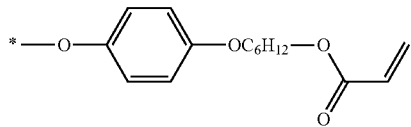
(A4-2)
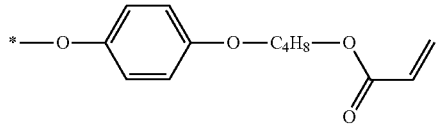
(A4-3)
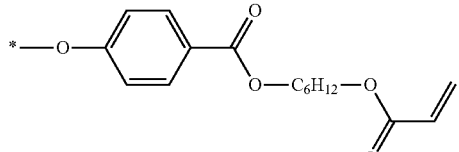
(A4-4)
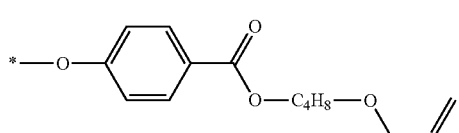
(A4-5)
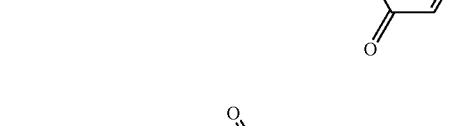
(A4-6)
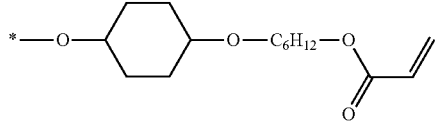
(A4-7)
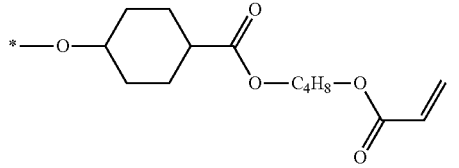
-continued
(A4-8)
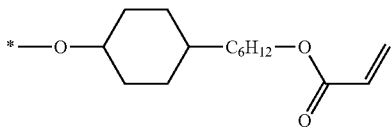
[Chem. 11]
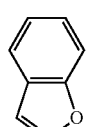
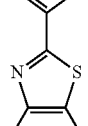
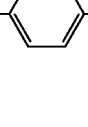
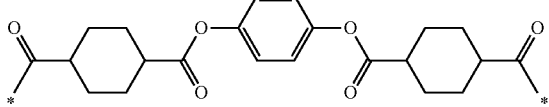
(A5-1)
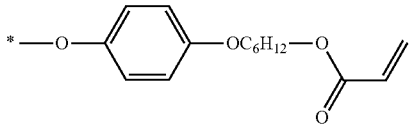
(A5-2)
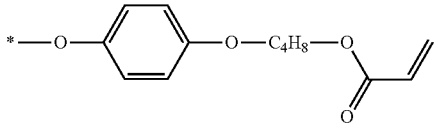
(A5-3)
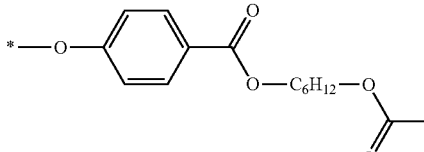
(A5-4)
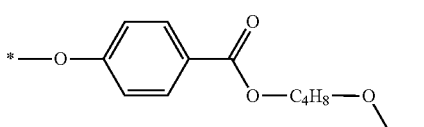
(A5-5)
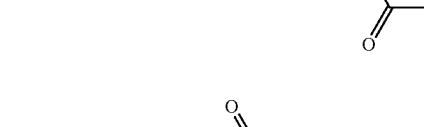
(A5-6)
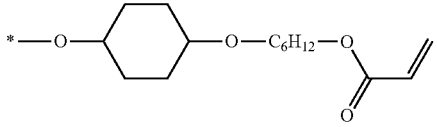
(A5-7)

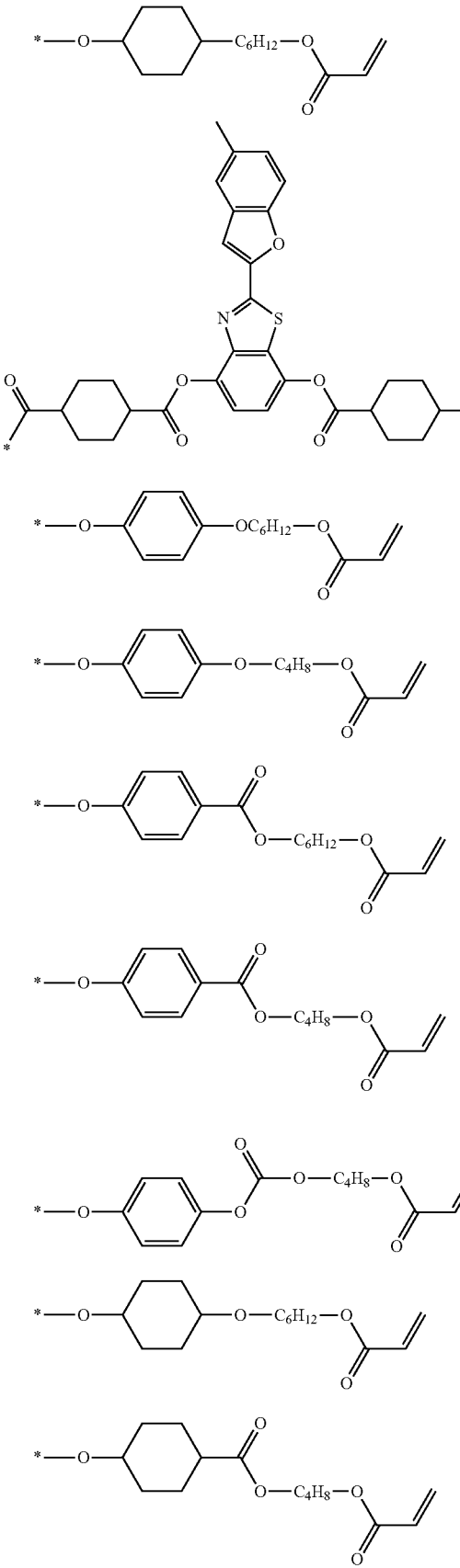
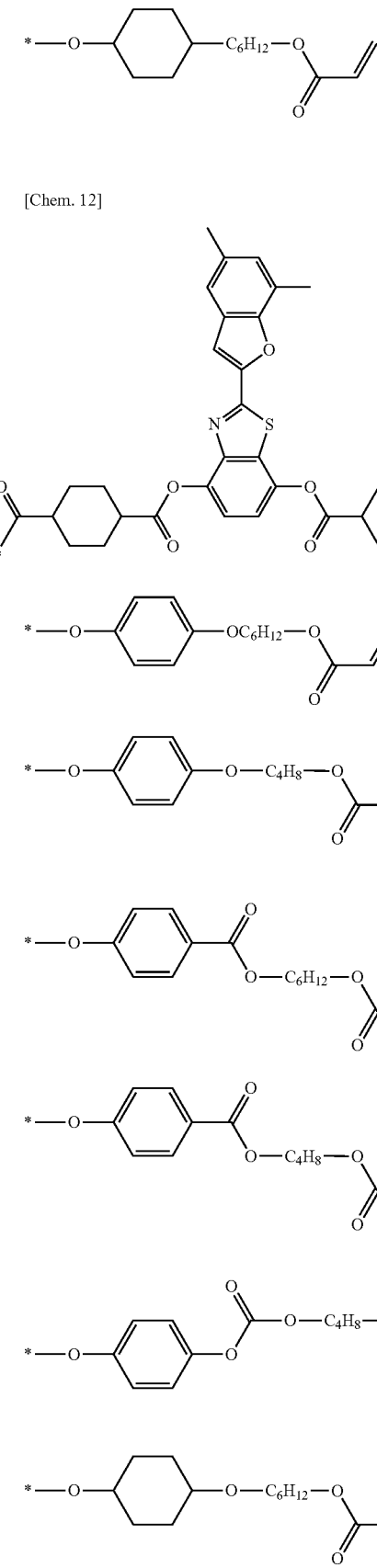
[Chem. 12]

-continued
(A7-7)
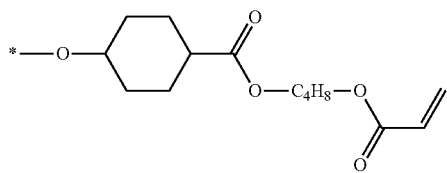
(A7-8)
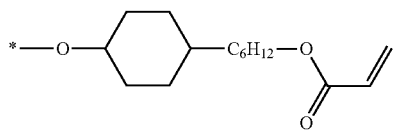
[Chem. 13]
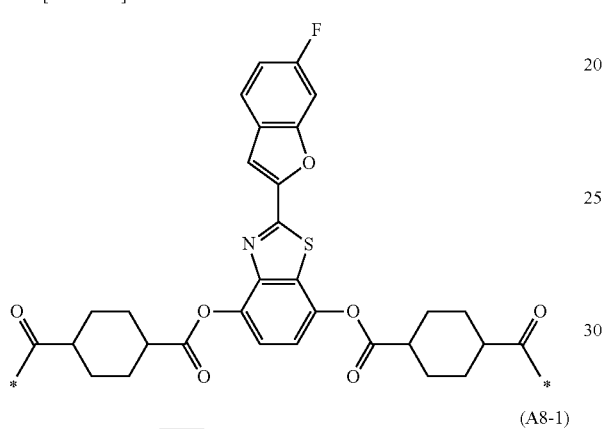
(A8-1)
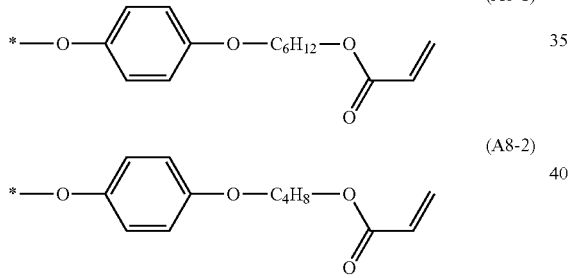
(A8-2)
(A8-3)
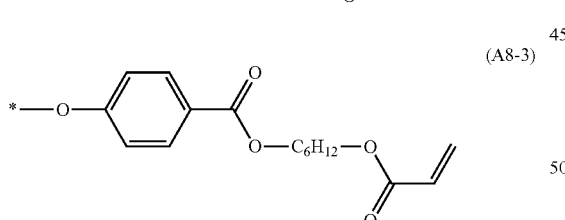
(A8-4)
(A8-5)
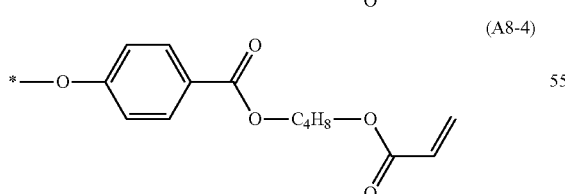
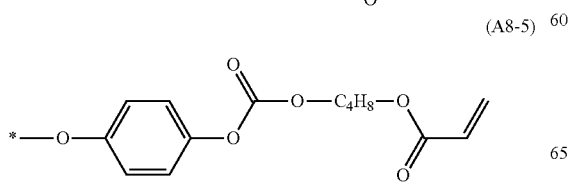
-continued
(A8-6)
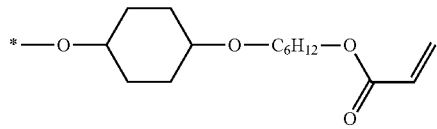
(A8-7)
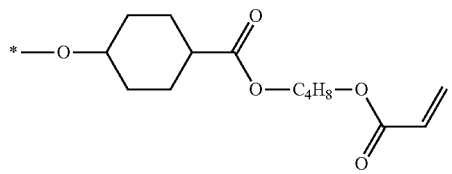
(A8-8)
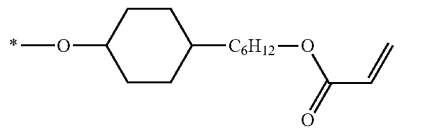
[Chem. 14]
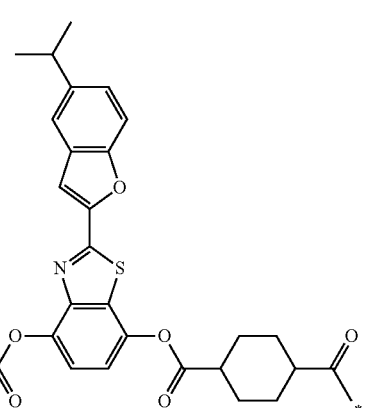
(A9-1)
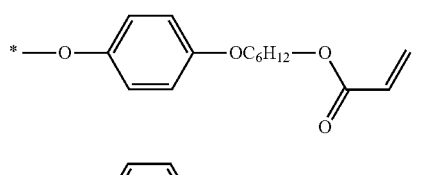
(A9-2)
(A9-3)
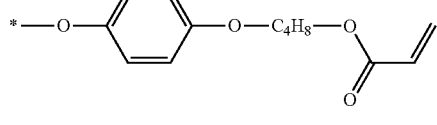
(A9-4)
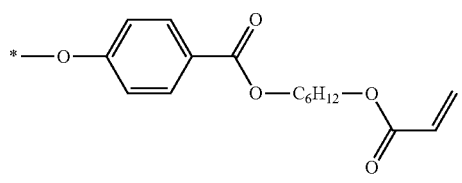

(A9-5) 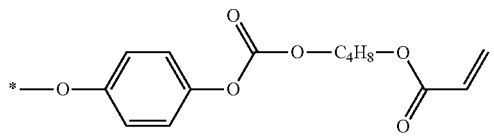
(A9-6) 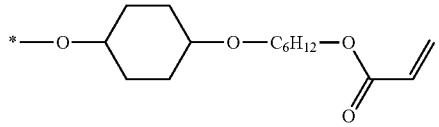
(A9-7) 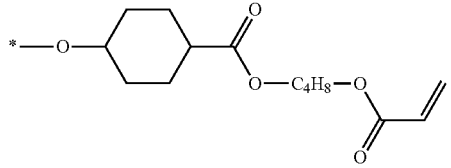
(A9-8) 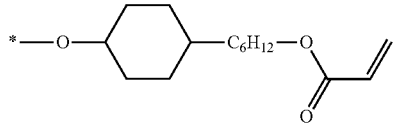
[Chem. 15]
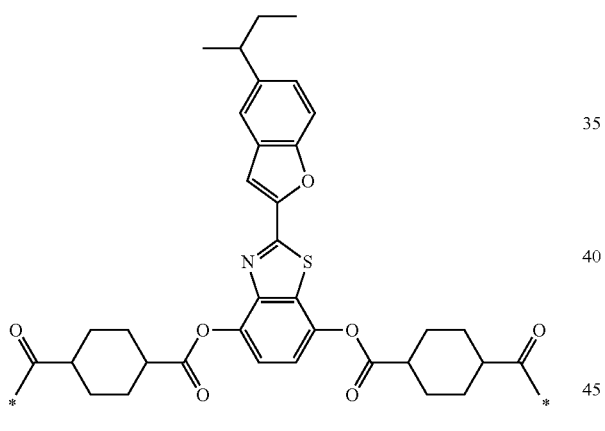
(A10-1) 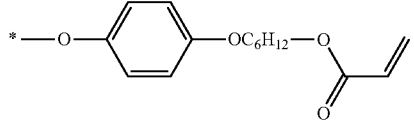
(A10-2) 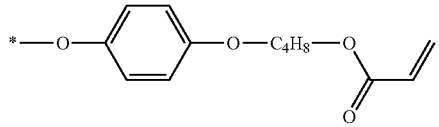
(A10-3) 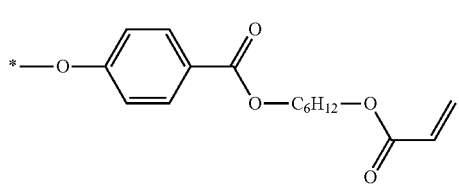
(A10-4) 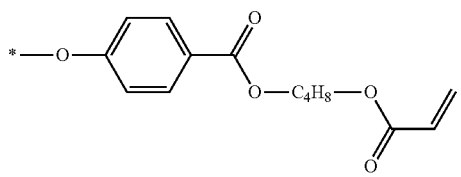
(A10-5) 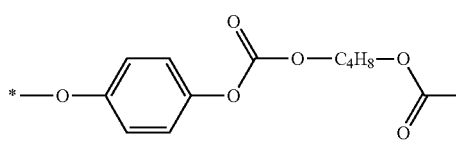
(A10-6) 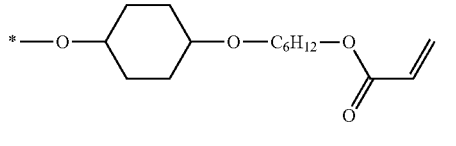
(A10-7) 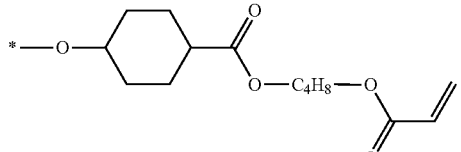
(A10-8) 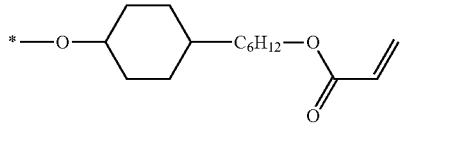
[Chem. 16]
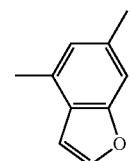
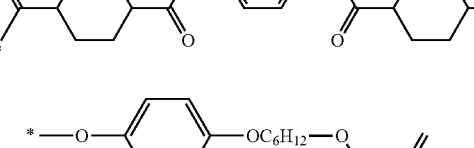
(A11-1) 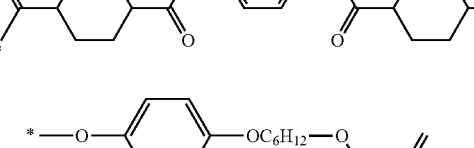
(A11-2) 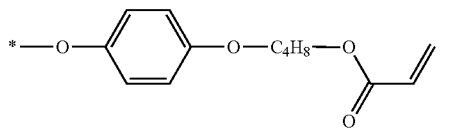

(A11-3)
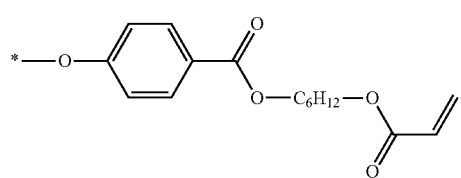
(A11-4)
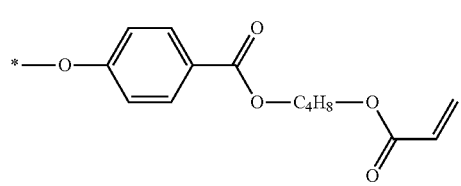
(A11-5)
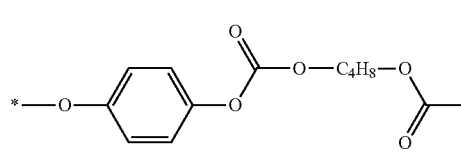
(A11-6)
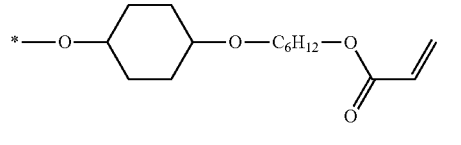
(A11-7)
(A11-8)
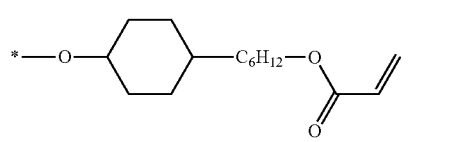
[Chem. 17]
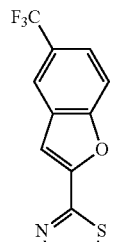
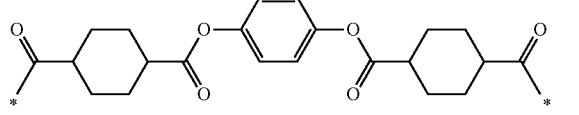
(A12-1)
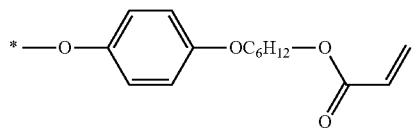
(A12-2)
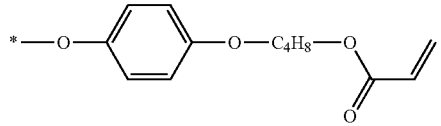
(A12-3)
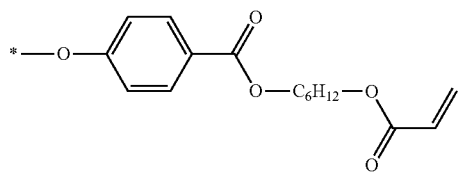
(A12-4)
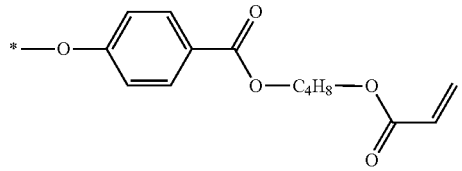
(A12-5)
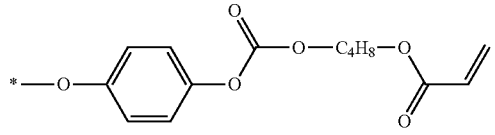
(A12-6)
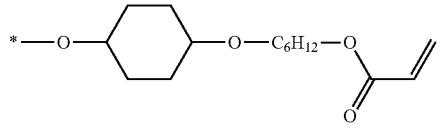
(A12-7)
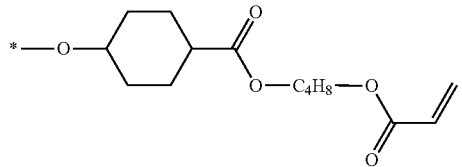
(A12-8)
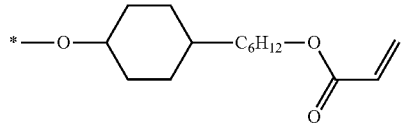

[Chem. 18]

(A13-1)
(A13-2)
(A13-3)
(A13-4)
(A13-5)
(A13-6)
(A13-7)
(A13-8)

[Chem. 19]

(A14-1)
(A14-2)
(A14-3)
(A14-4)
(A14-5)

(A14-6) 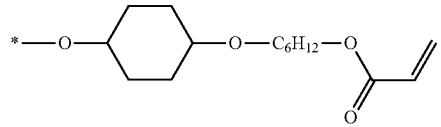
(A14-7) 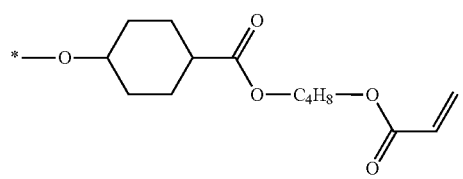
(A14-8) 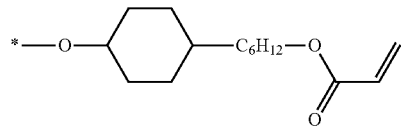
[Chem. 20]
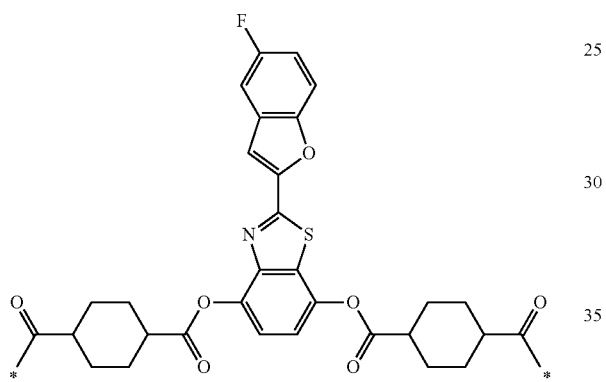
(A15-1) 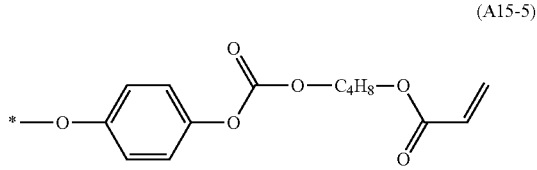
(A15-2) 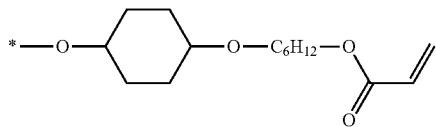
(A15-3) 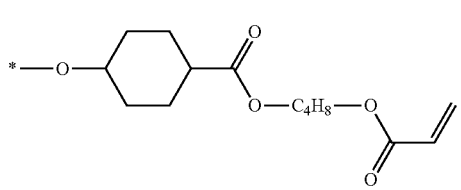
(A15-4) 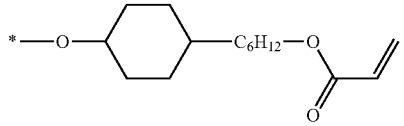
(A15-5) 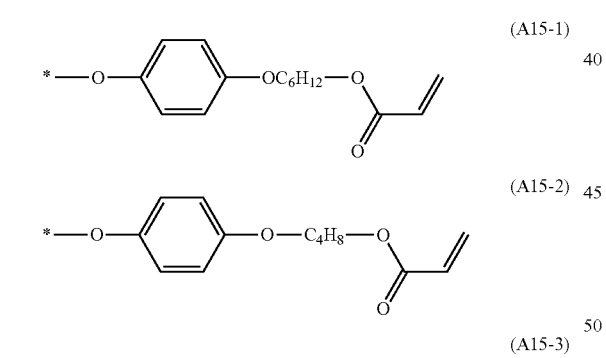
(A15-6) 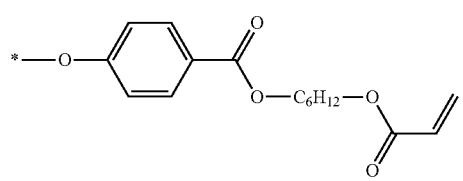
(A15-7) 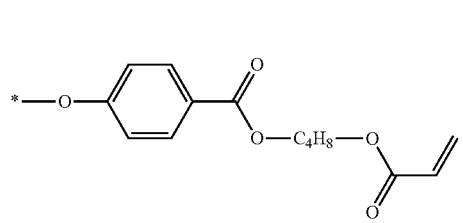
(A15-8) 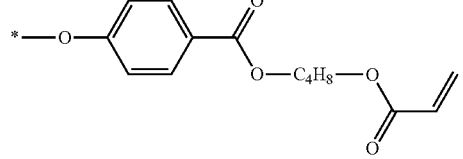
[Chem. 21]
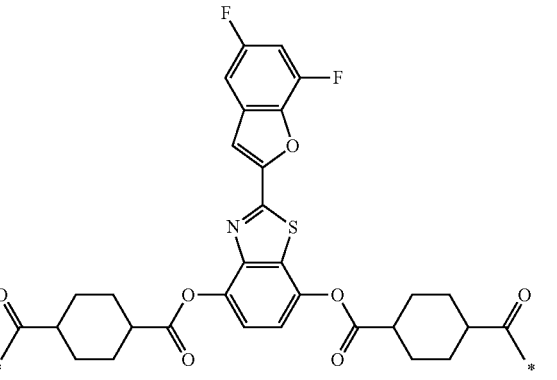
(A16-1) 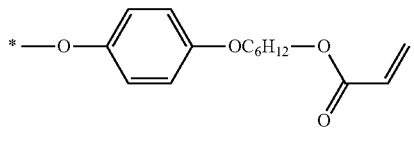
(A16-2) 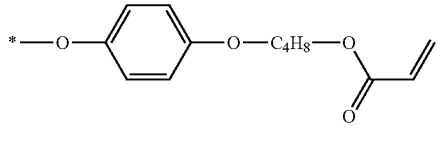
(A16-3) 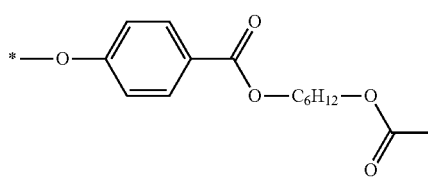

(A16-4)
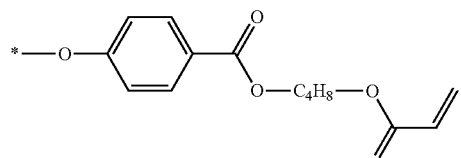
(A16-5)
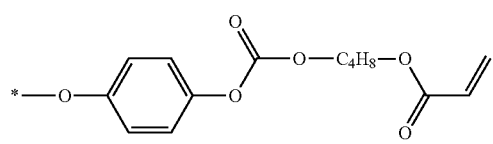
(A16-6)
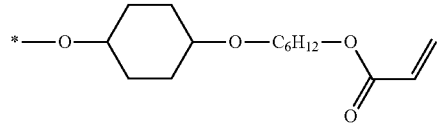
(A16-7)
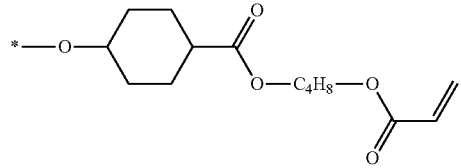
(A16-8)
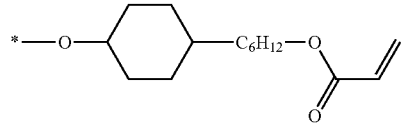
[Chem. 22]
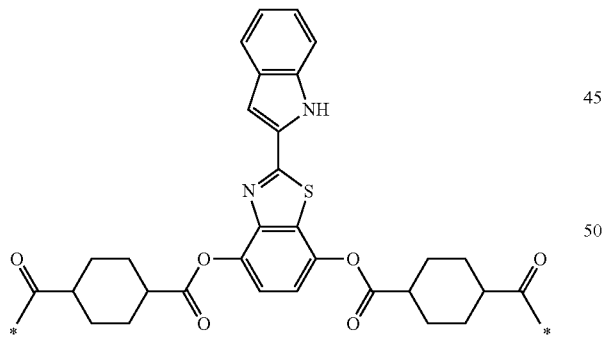
(A17-1)
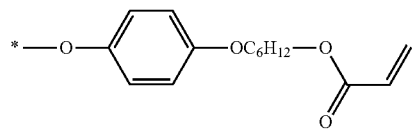
(A17-2)
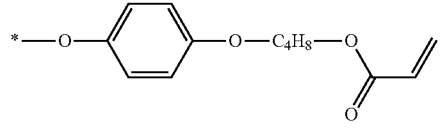
(A17-3)
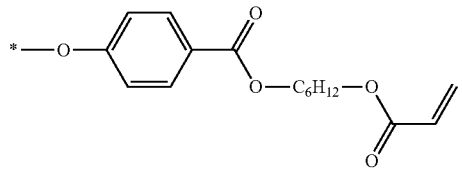
(A17-4)
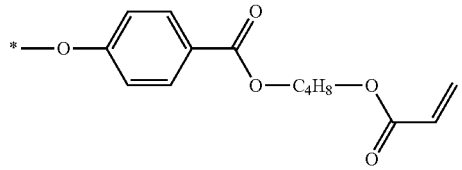
(A17-5)
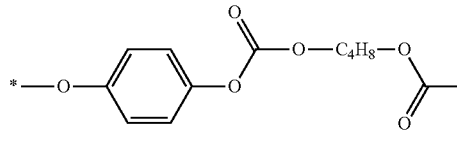
(A17-6)
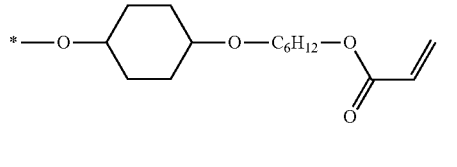
(A17-7)
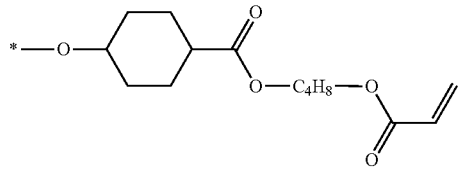
(A17-8)
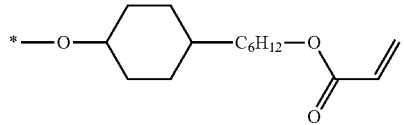
[Chem. 23]
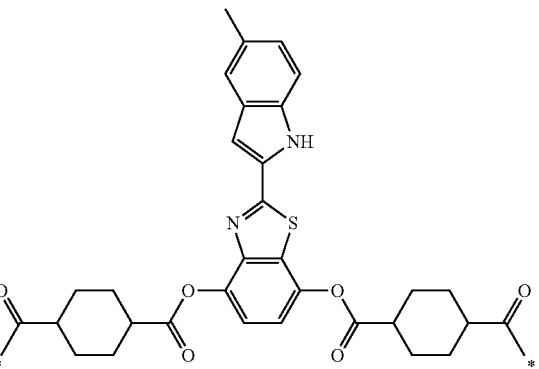
(A18-1)
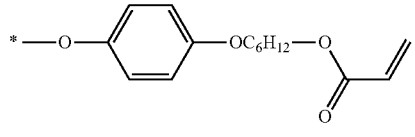

-continued
(A18-2)
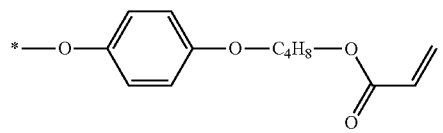
(A18-3)
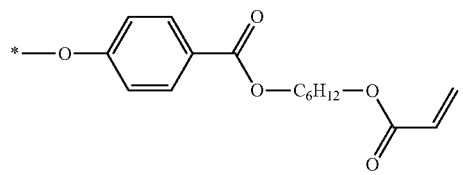
(A18-4)
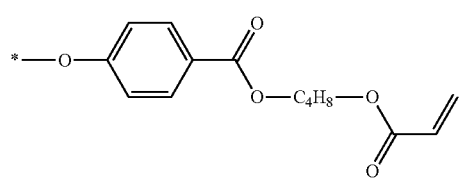
(A18-5)
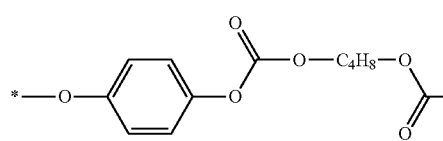
(A18-6)
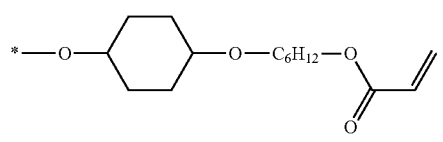
(A18-7)
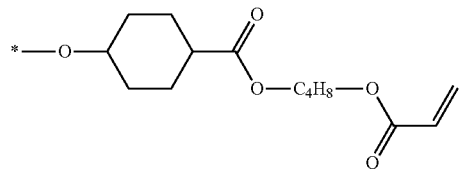
(A18-8)
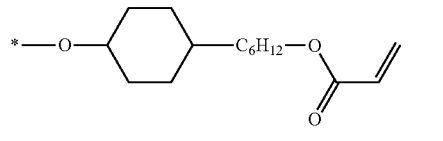
[Chem. 24]
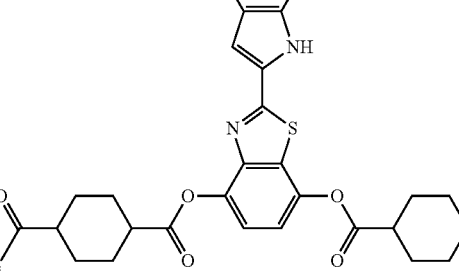
-continued
(A19-1)
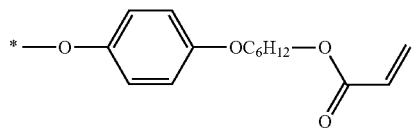
(A19-2)
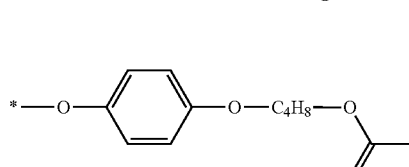
(A19-3)
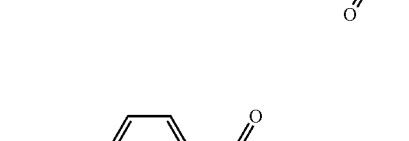
(A19-4)
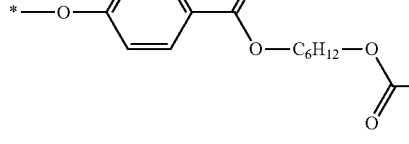
(A19-5)
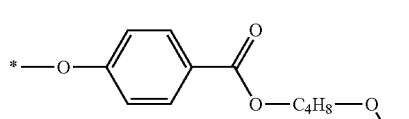
(A19-6)
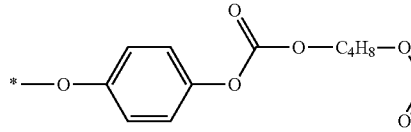
(A19-7)
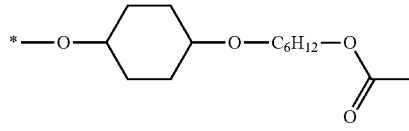
(A19-8)
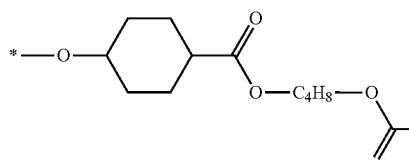

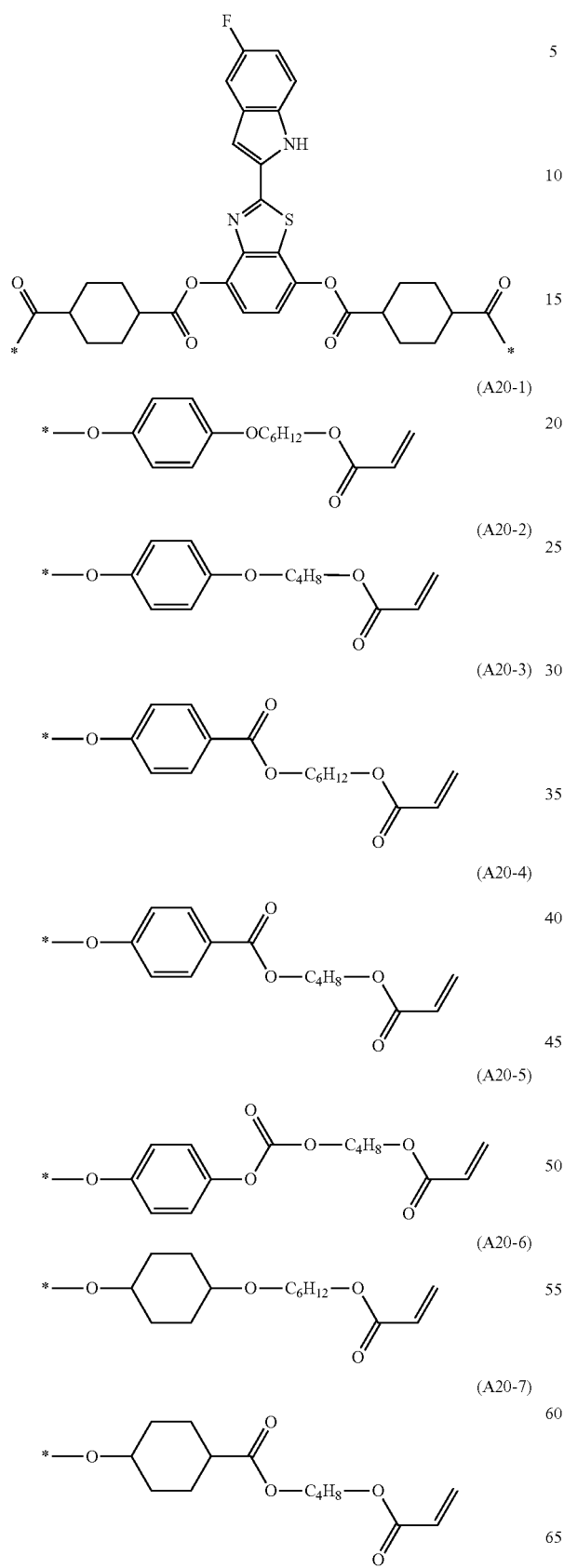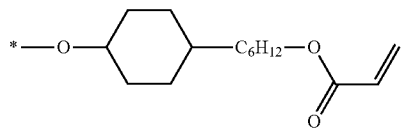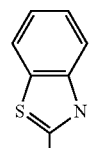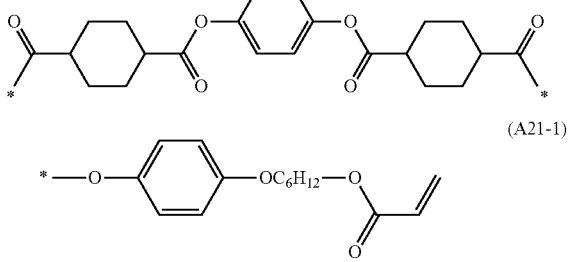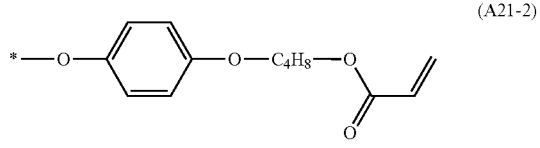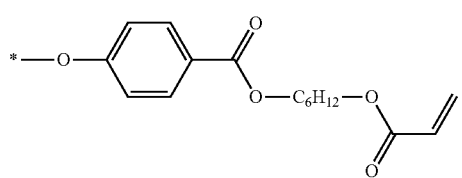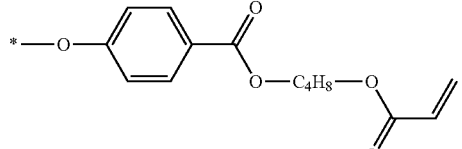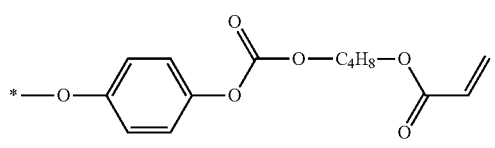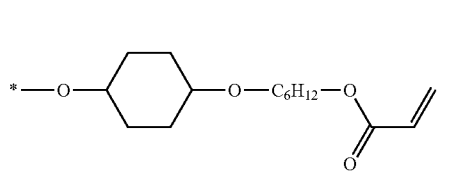

(A21-7)
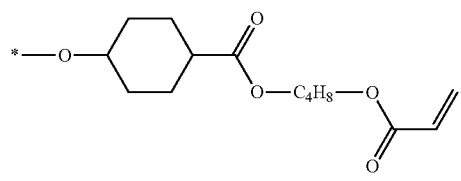
(A21-8)
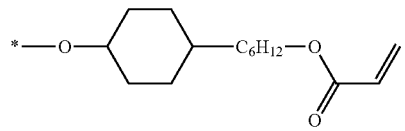
[Chem. 27]
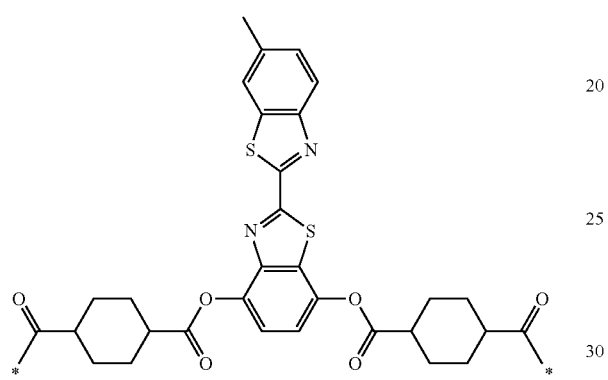
(A22-1)
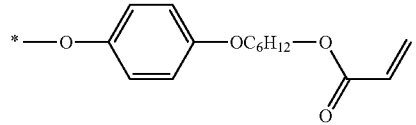
(A22-2)
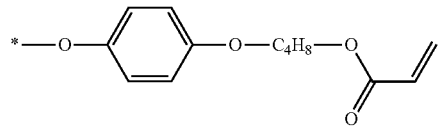
(A22-3)
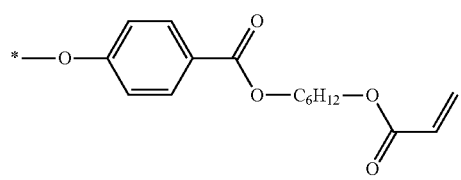
(A22-4)
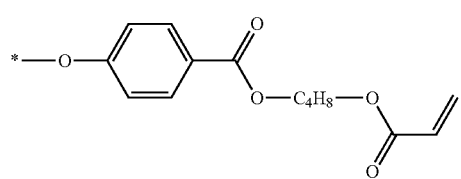
(A22-5)
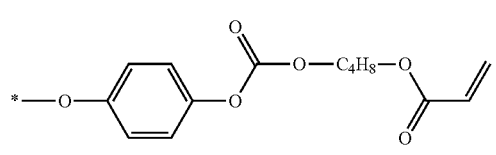
(A22-6)
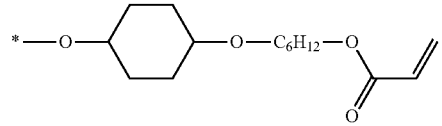
(A22-7)
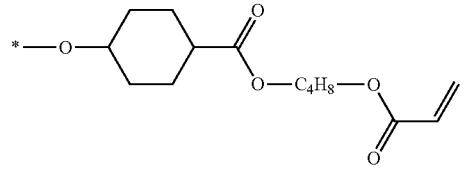
(A22-8)
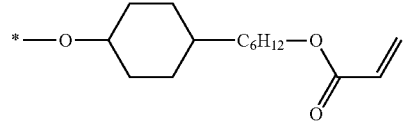
[Chem. 28]
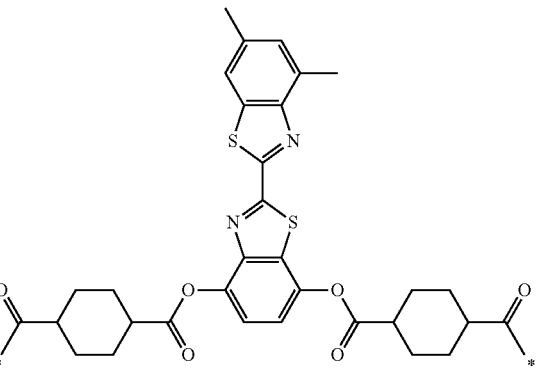
(A23-1)
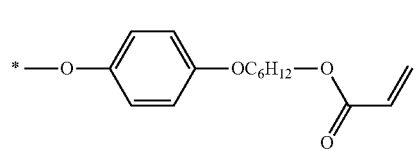
(A23-2)
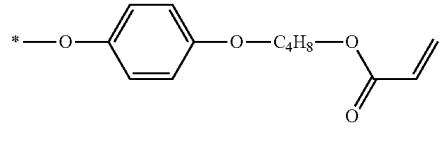
(A23-3)
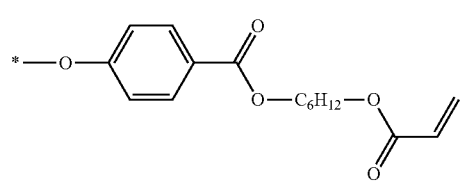
(A23-4)
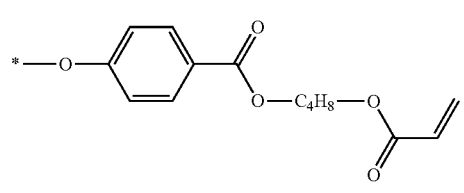

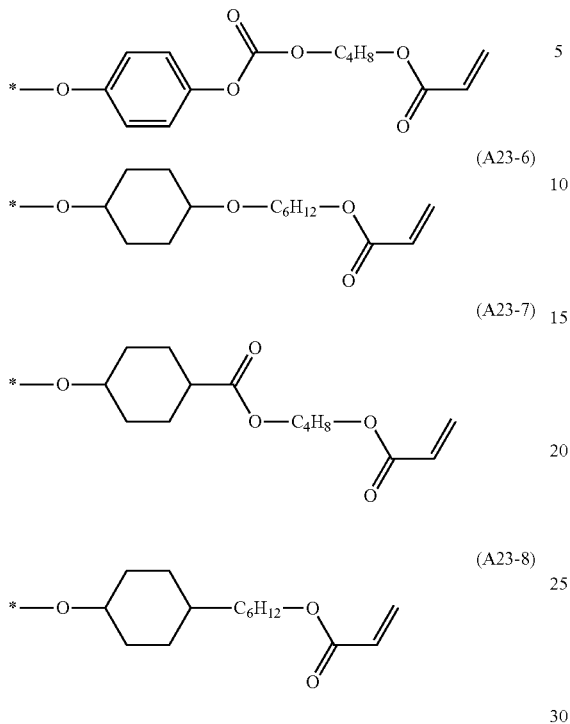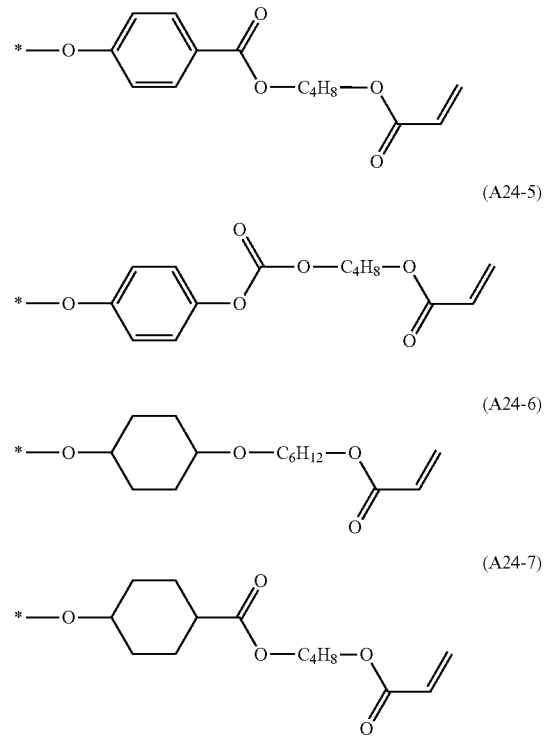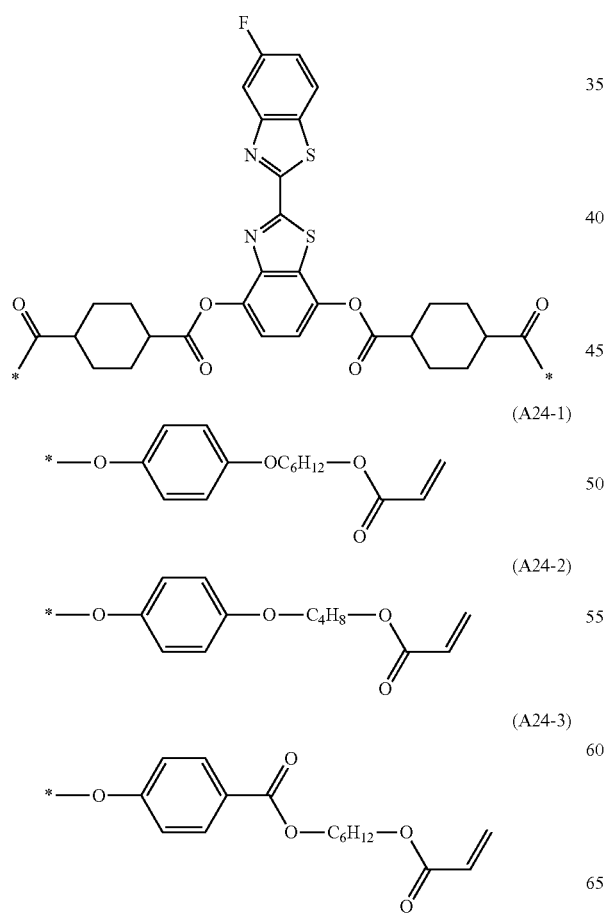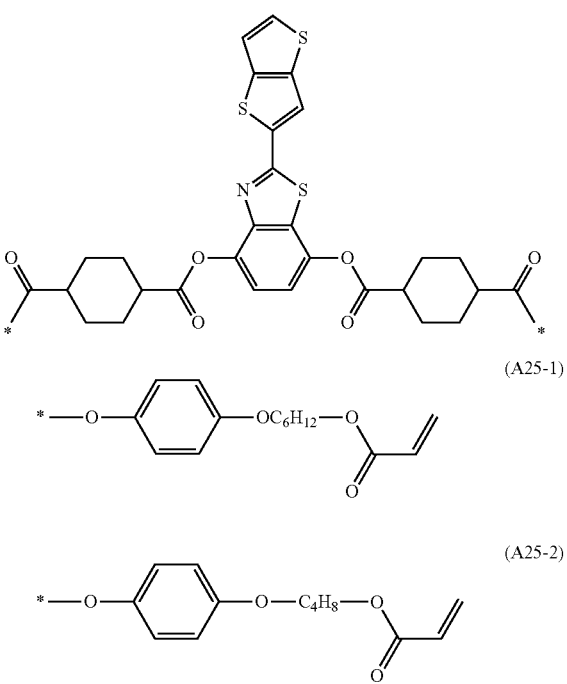

(A25-3)
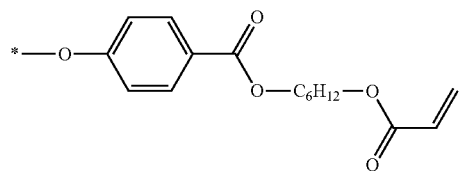
(A25-4)
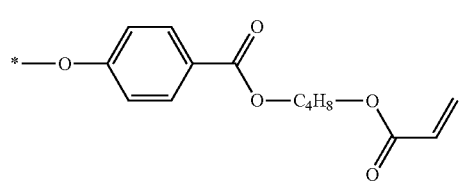
(A25-5)
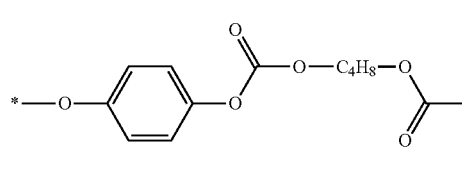
(A25-6)
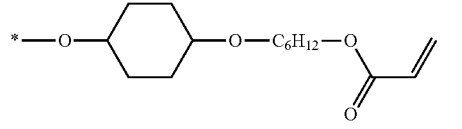
(A25-7)
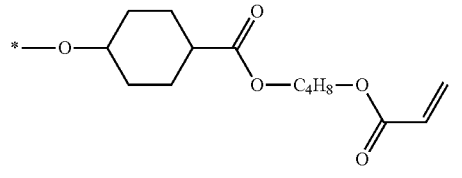
(A25-8)
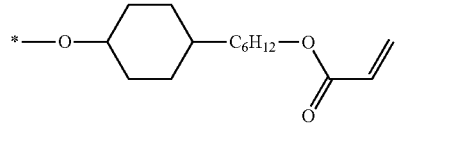
[Chem. 31]
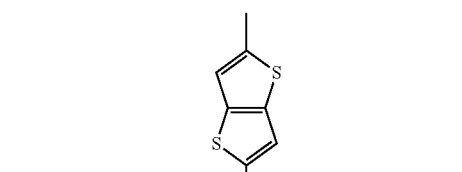
(A26-1)
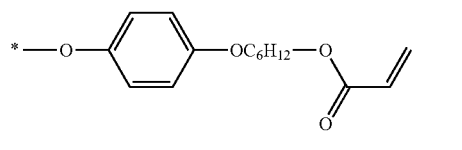
(A26-2)
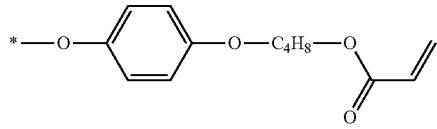
(A26-3)
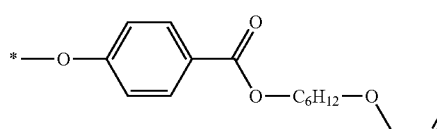
(A26-4)
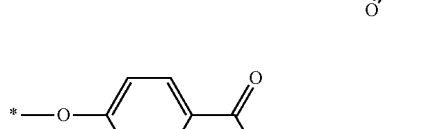
(A26-5)
(A26-6)
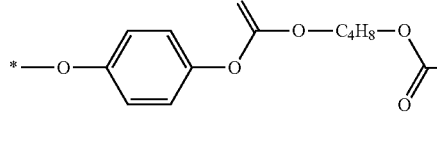
(A26-7)
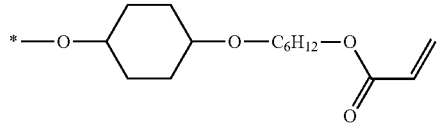
(A26-8)
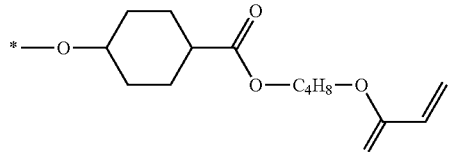
[Chem. 32]
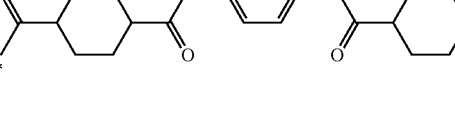

(A27-1) 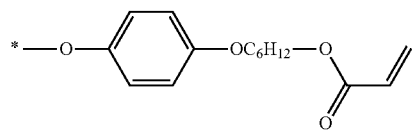
(A27-2) 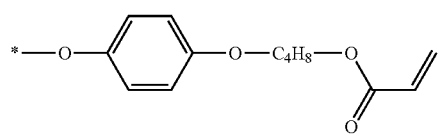
(A27-3) 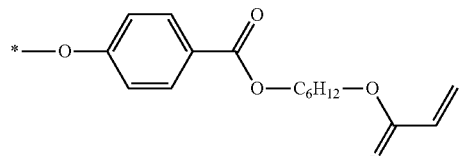
(A27-4) 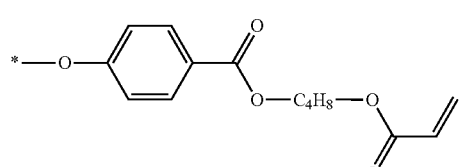
(A27-5) 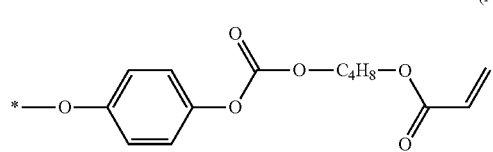
(A27-6) 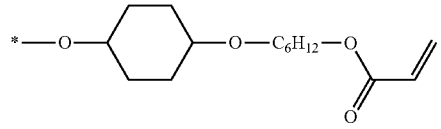
(A27-7) 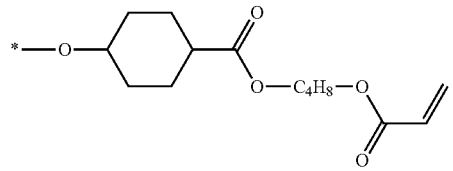
(A27-8) 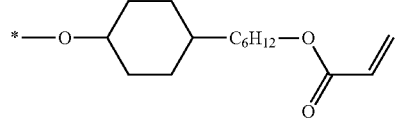
[Chem. 33]
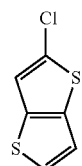
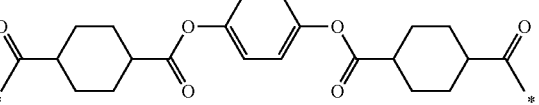
(A28-1) 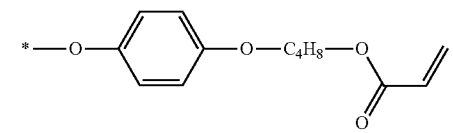
(A28-2) 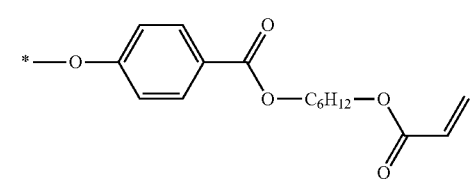
(A28-3) 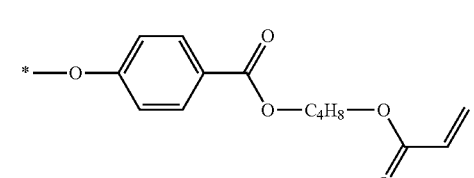
(A28-4) 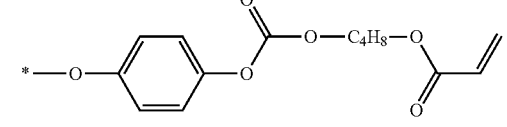
(A28-5) 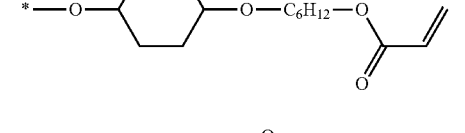
(A28-6) 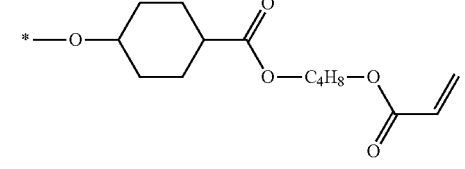
(A28-7)

(A28-8)
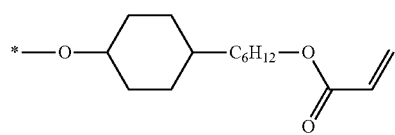
[Chem. 34]
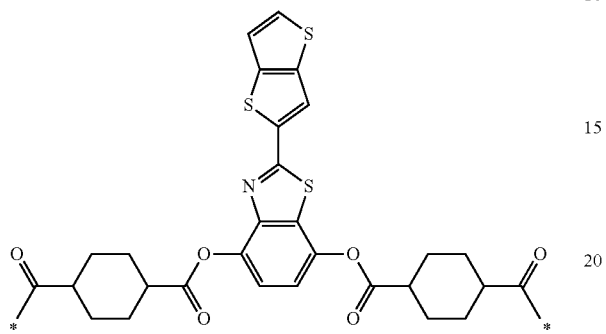
(A29-1)
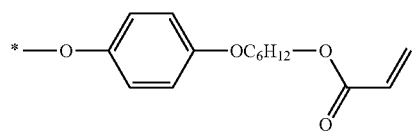
(A29-2)
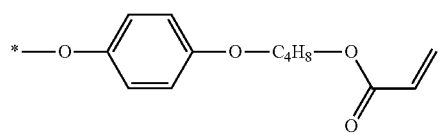
(A29-3)
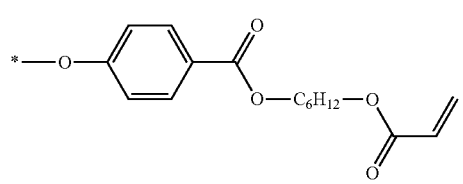
(A29-4)
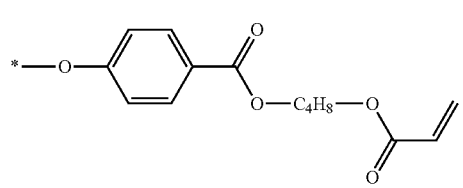
(A29-5)
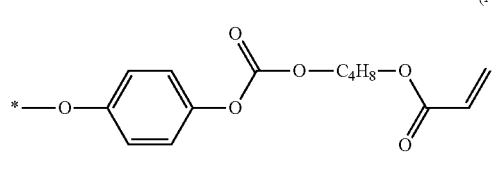
(A29-6)
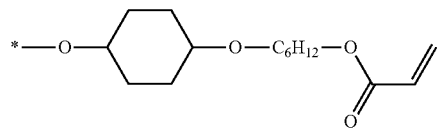
(A29-7)
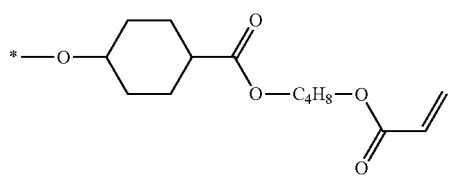
(A29-8)
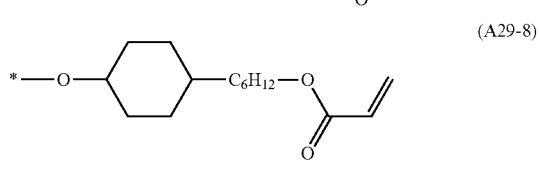
[Chem. 35]
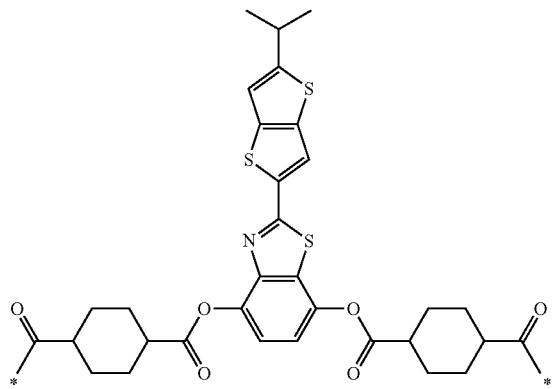
(A30-1)
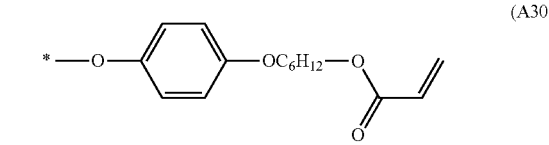
(A30-2)
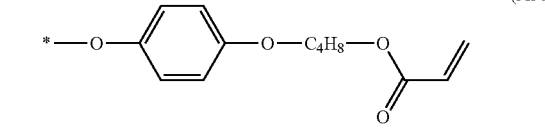
(A30-3)
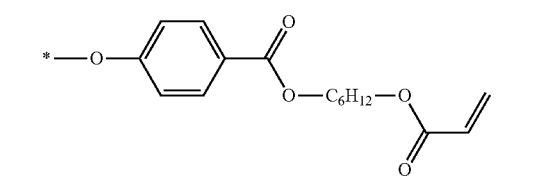
(A30-4)
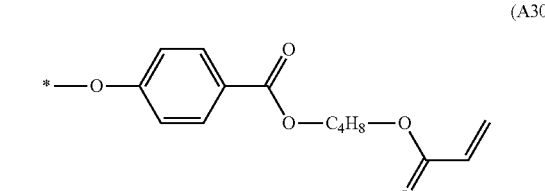
(A30-5)
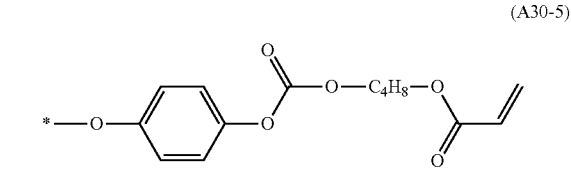

(A30-6)
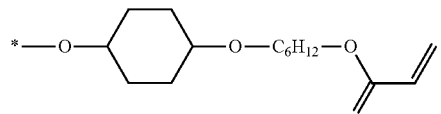
(A30-7)
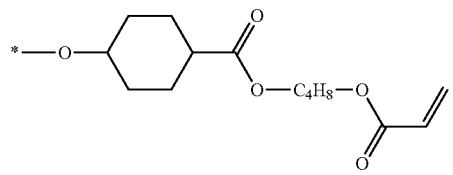
(A30-8)
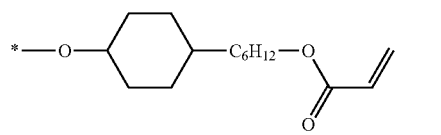
[Chem. 36]
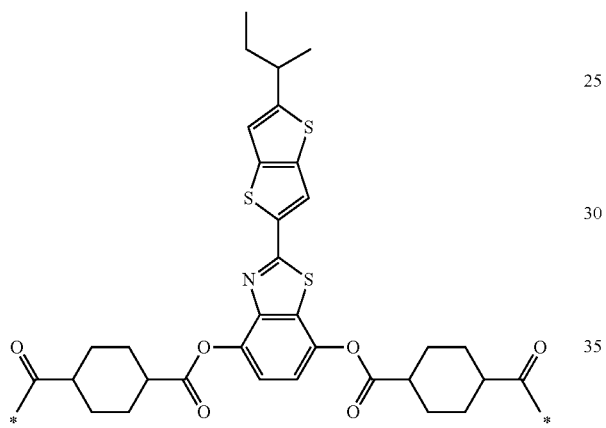
(A31-1)
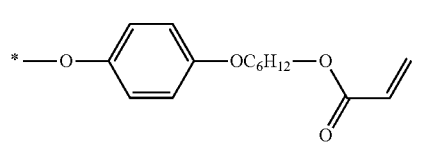
(A31-2)
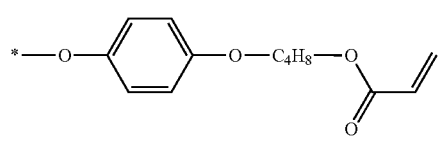
(A31-3)
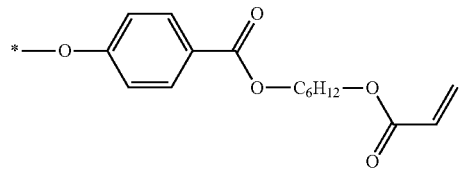
(A31-4)
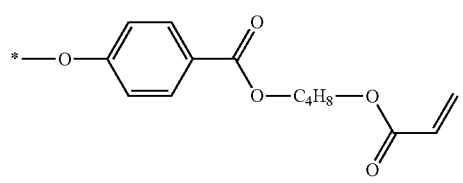
(A31-5)
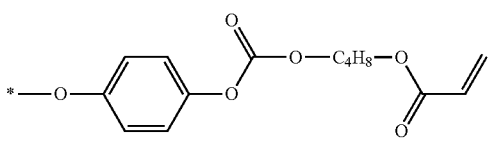
(A31-6)
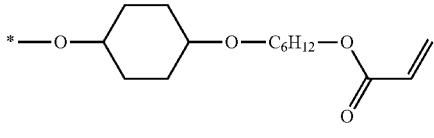
(A31-7)
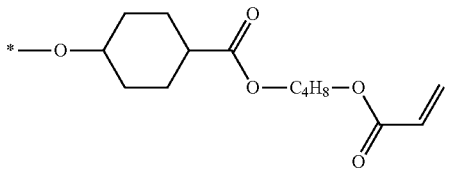
(A31-8)
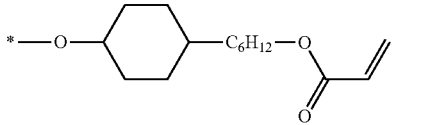
[Chem. 37]
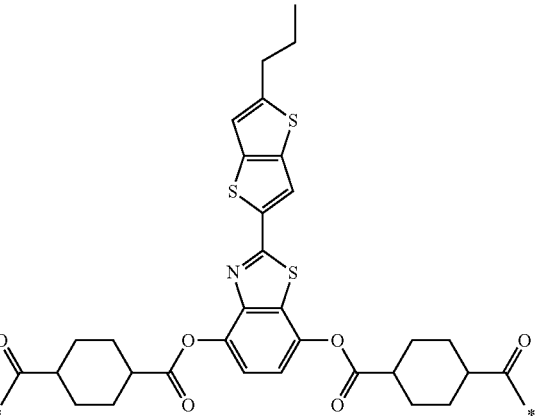
(A32-1)
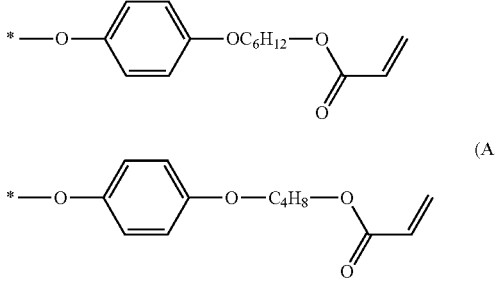
(A32-2)
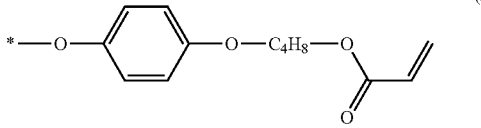
(A32-3)
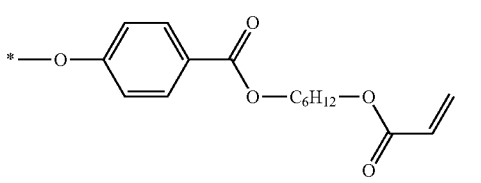

(A32-4)
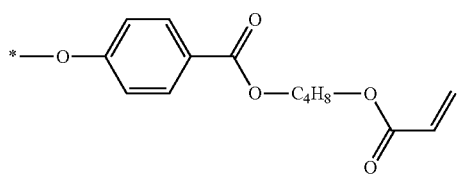
(A32-5)
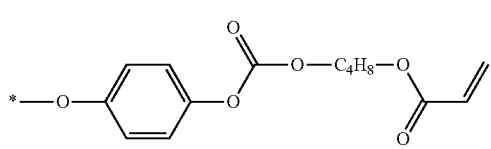
(A32-6)
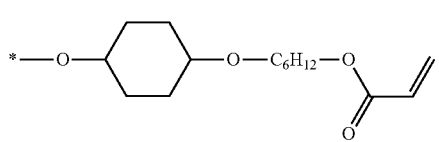
(A32-7)
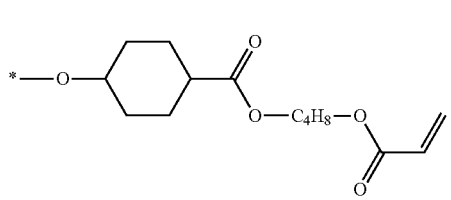
(A32-8)
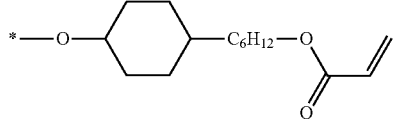
[Chem. 38]
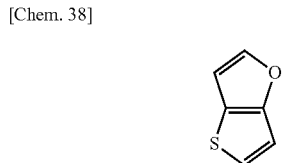
(A33-1)
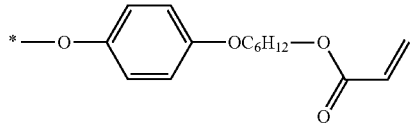
(A33-2)
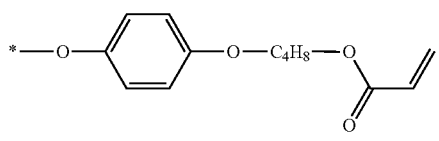
(A33-3)
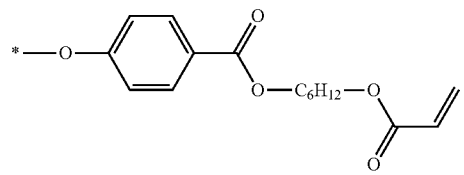
(A33-4)
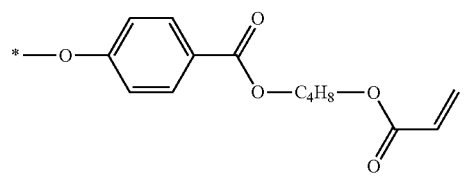
(A33-5)
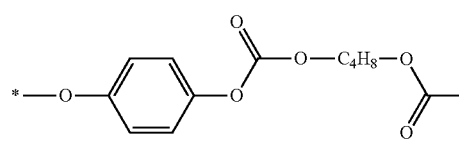
(A33-6)
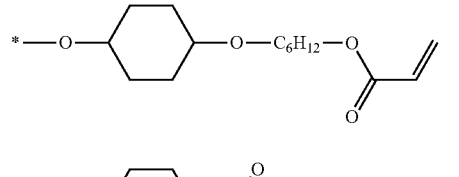
(A33-7)
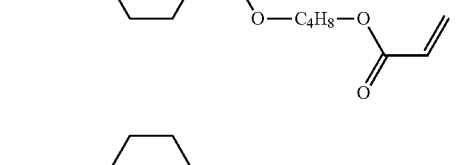
(A33-8)
[Chem. 39]
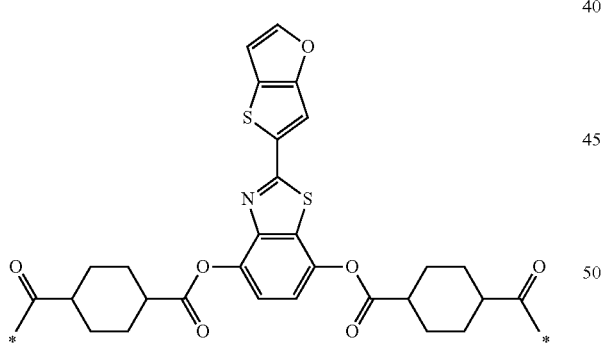
(A34-1)
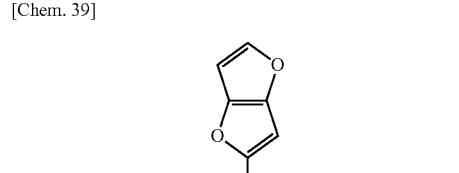

(A34-2) 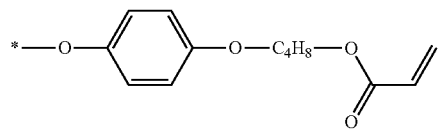
(A34-3) 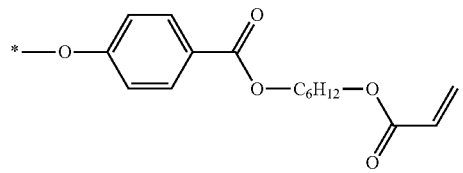
(A34-4) 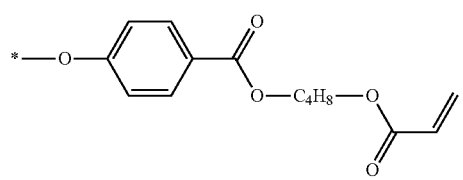
(A34-5) 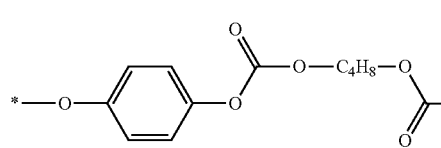
(A34-6) 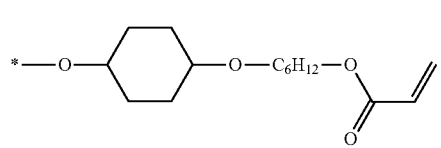
(A34-7) 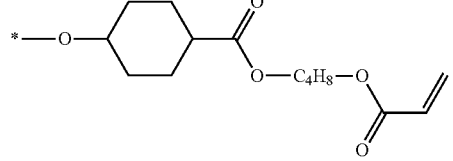
(A34-8) 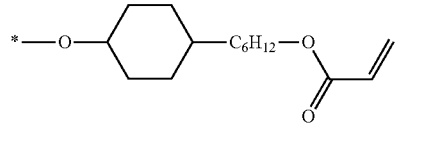
[Chem. 40]
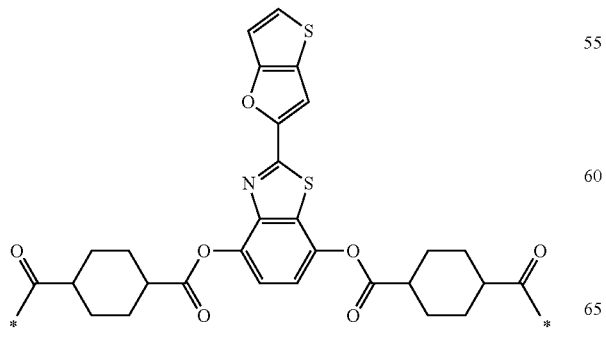
(A35-1) 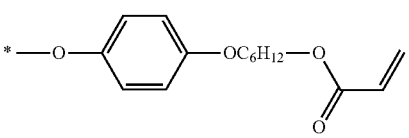
(A35-2) 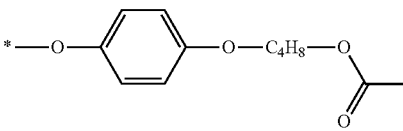
(A35-3) 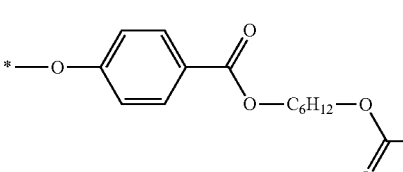
(A35-4) 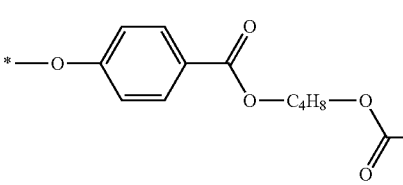
(A35-5) 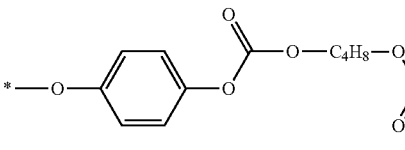
(A35-6) 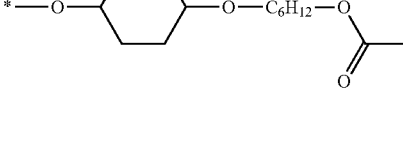
(A35-7) 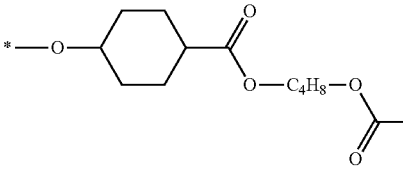
(A35-8) 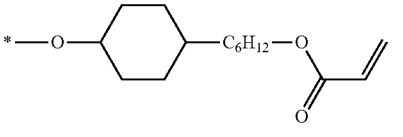

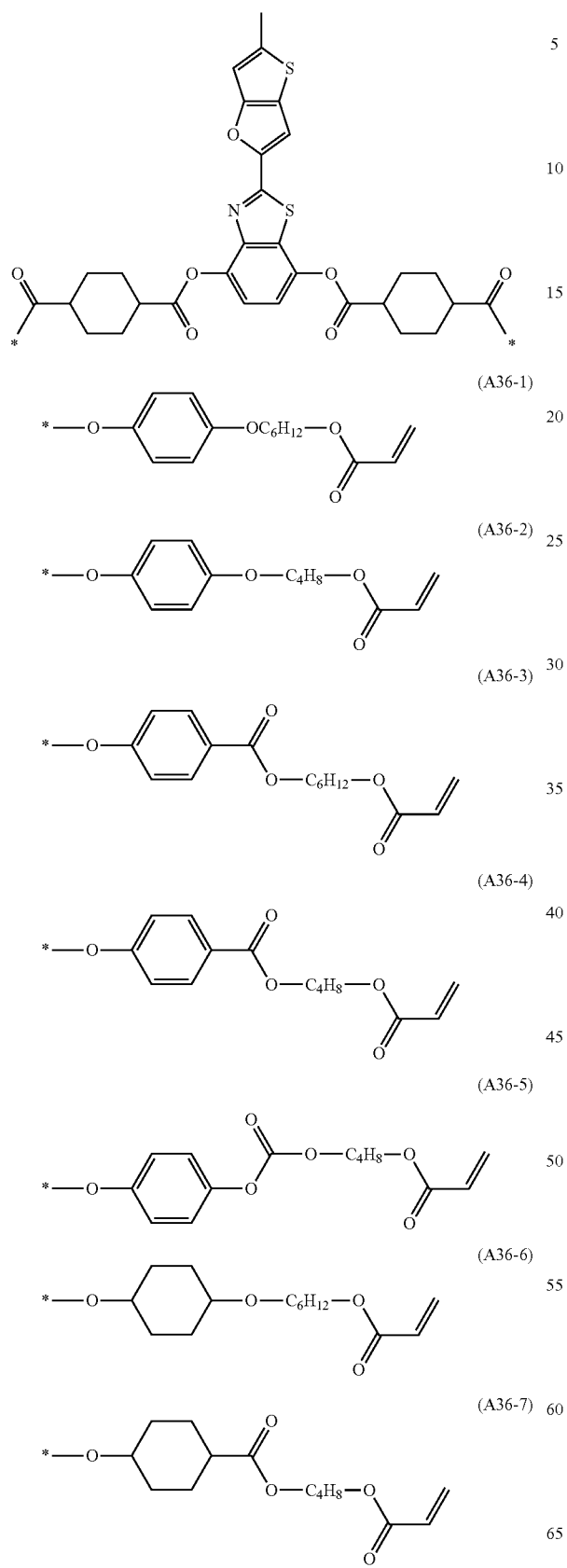
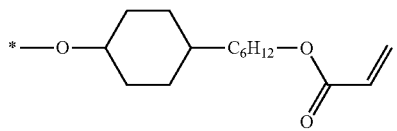
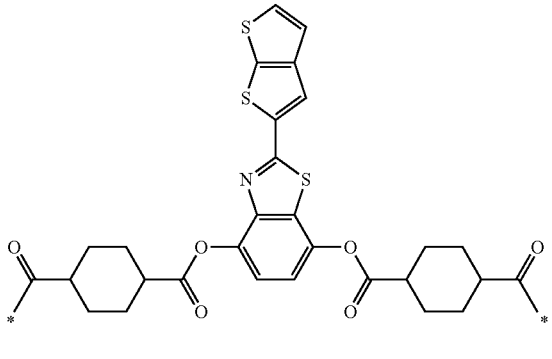

(A37-7)
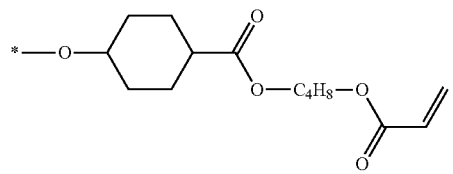
(A37-8)
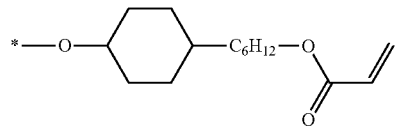
[Chem. 43]
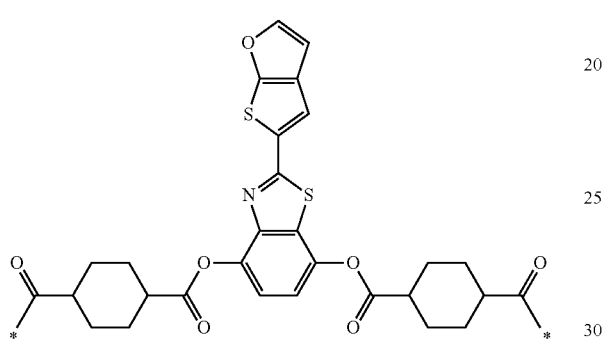
(A38-1)
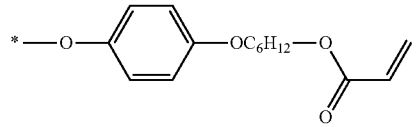
(A38-2)
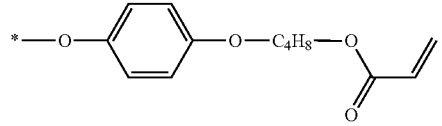
(A38-3)
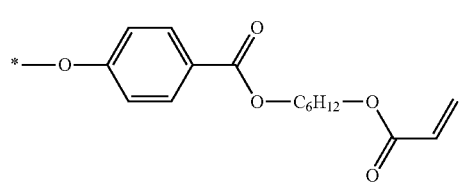
(A38-4)
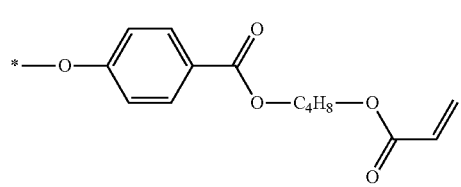
(A38-5)
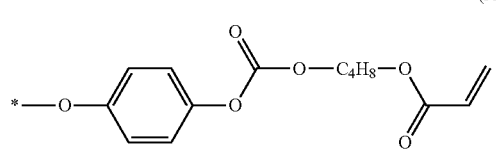
(A38-6)
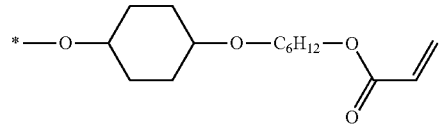
(A38-7)
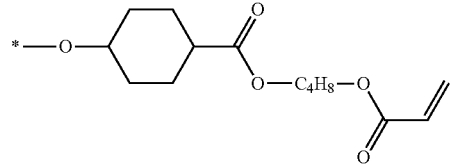
(A38-8)
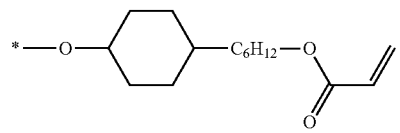
[Chem. 44]
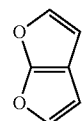
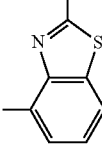
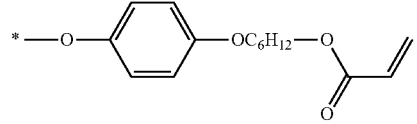
(A39-1)
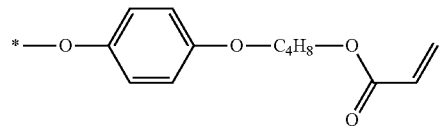
(A39-2)
(A39-3)
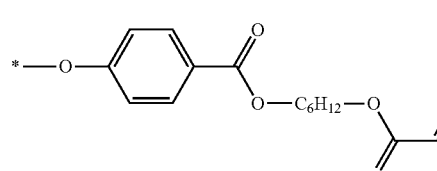
(A39-4)
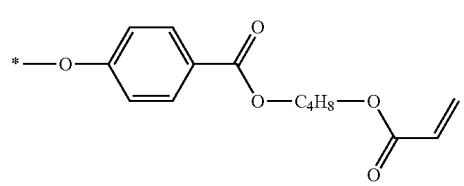

(A39-5) 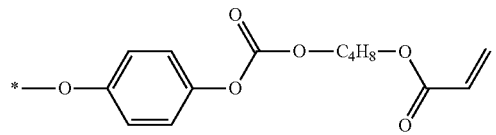
(A39-6) 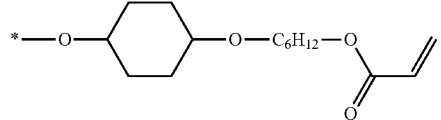
(A39-7) 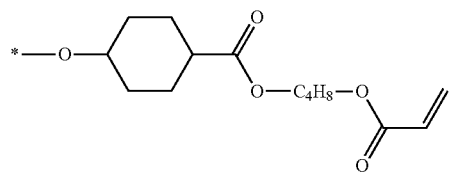
(A39-8) 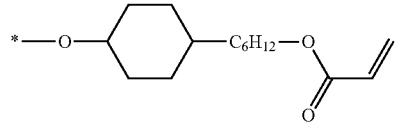
[Chem. 45]
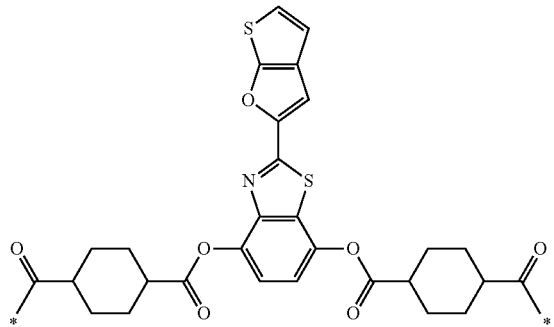
(A40-1) 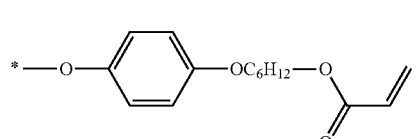
(A40-2) 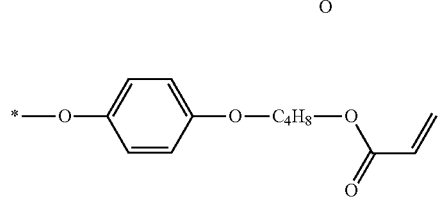
(A40-3) 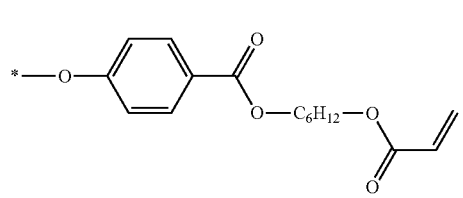
(A40-4) 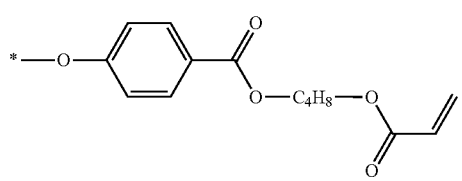
(A40-5) 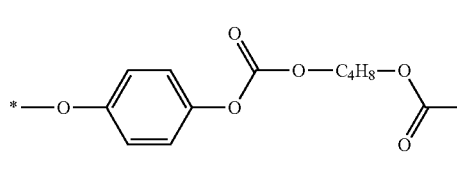
(A40-6) 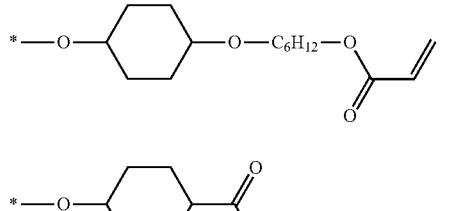
(A40-7) 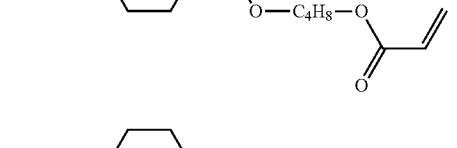
(A40-8) 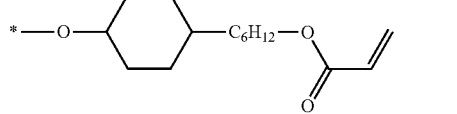
[Chem. 46]
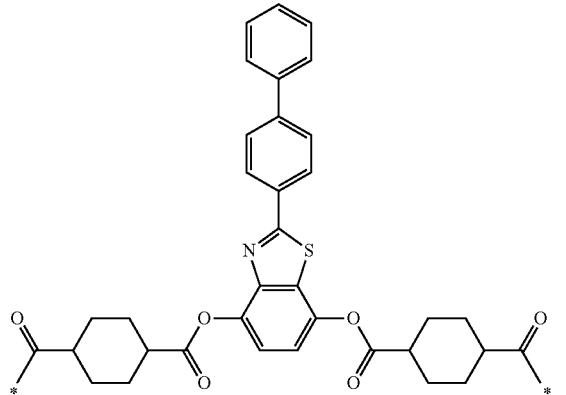
(A41-1) 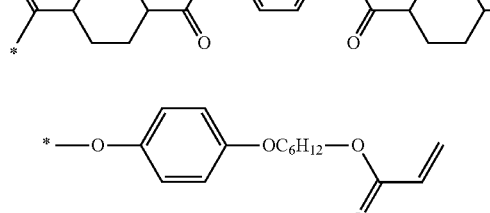
(A41-2) 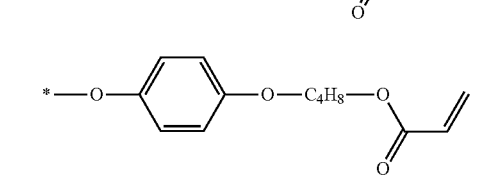

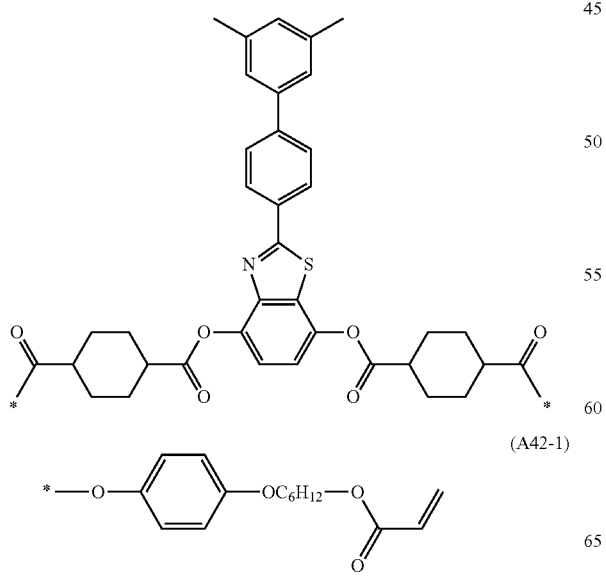
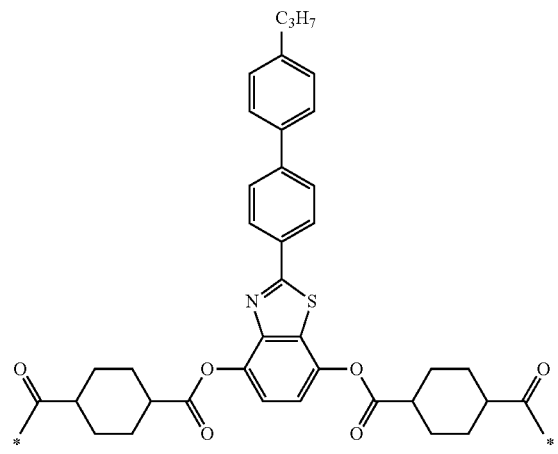

-continued
(A43-1)
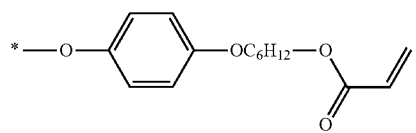
(A43-2)
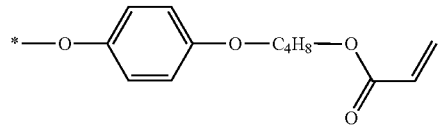
(A43-3)
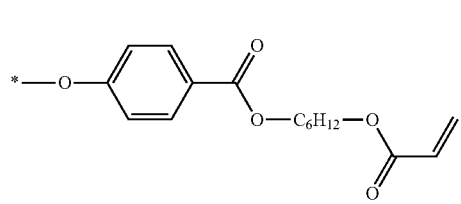
(A43-4)
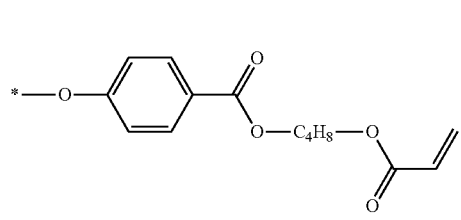
(A43-5)
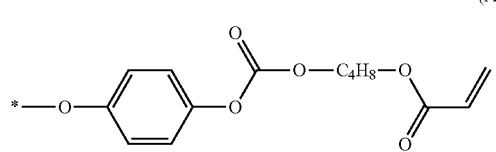
(A43-6)
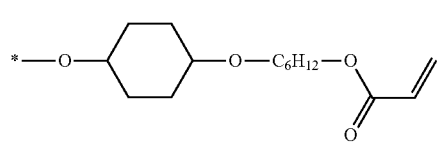
(A43-7)
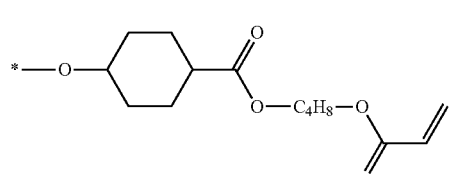
(A43-8)
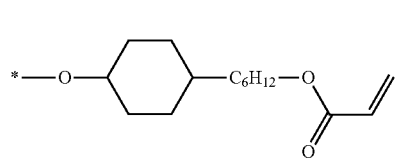
-continued
[Chem. 49]
(A44-1)
(A44-2)
(A44-3)
(A44-4)
(A44-5)
(A44-6)
(A44-7)

(A44-8) 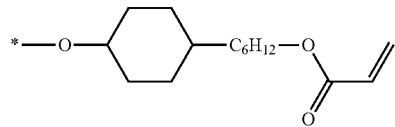
[Chem. 50]
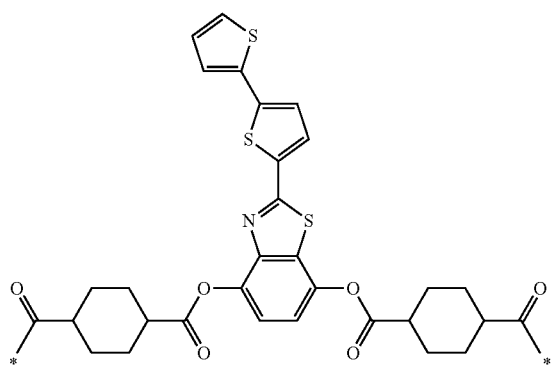
(A45-1) *—O—⟨⟩—OC₆H₁₂—O—C(=O)—CH=CH₂
(A45-2) *—O—⟨⟩—O—C₄H₈—O—C(=O)—CH=CH₂
(A45-3) *—O—⟨⟩—C(=O)—O—C₆H₁₂—O—C(=O)—CH=CH₂
(A45-4) *—O—⟨⟩—C(=O)—O—C₄H₈—O—C(=O)—CH=CH₂
(A45-5) *—O—⟨⟩—O—C(=O)—O—C₄H₈—O—C(=O)—CH=CH₂
(A45-6) *—O—⟨⟩—O—C₆H₁₂—O—C(=O)—CH=CH₂
(A45-7) 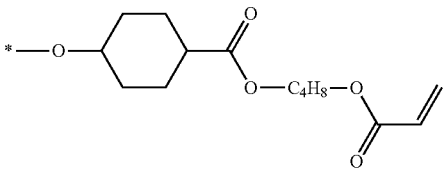
(A45-8) 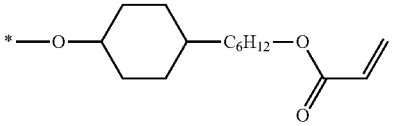
[Chem. 51]
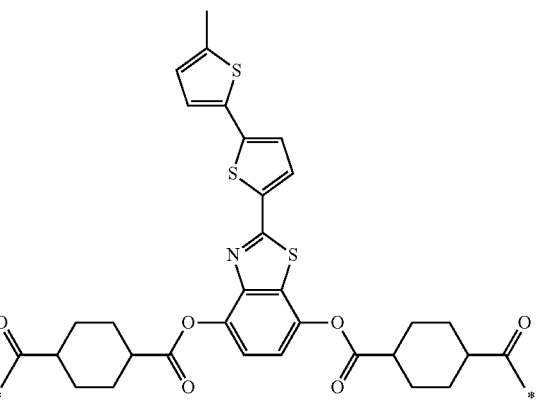
(A46-1) 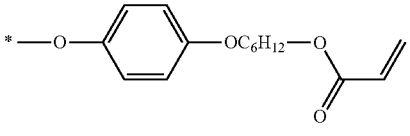
(A46-2) 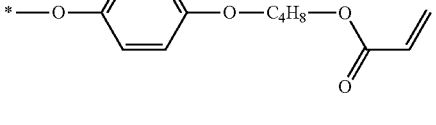
(A46-3) 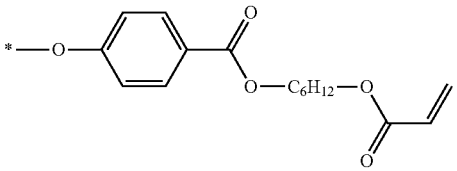
(A46-4) 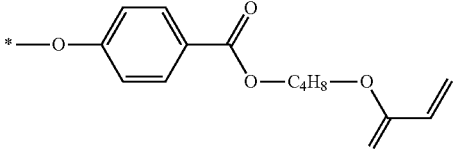
(A46-5) 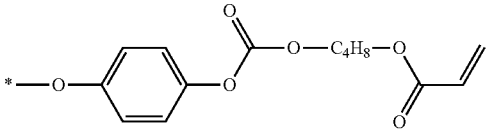

-continued
(A46-6)
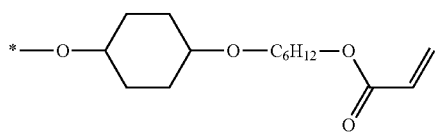
(A46-7)
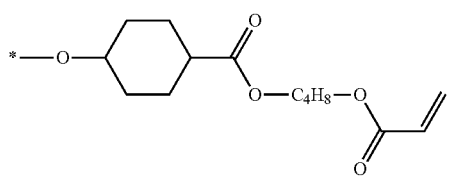
(A46-8)
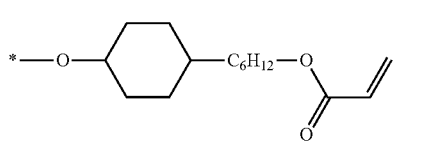
[Chem. 52]
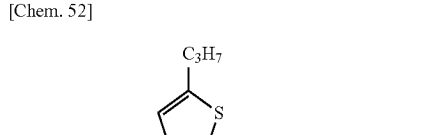
(A47-1)
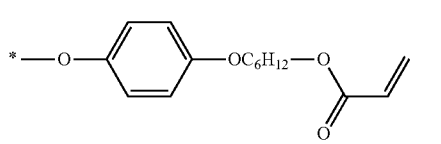
(A47-2)
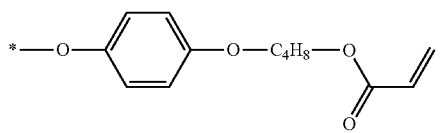
(A47-3)
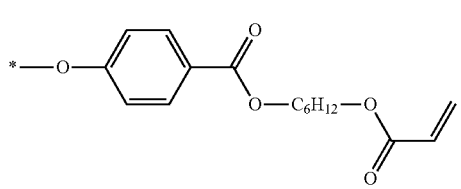
(A47-4)
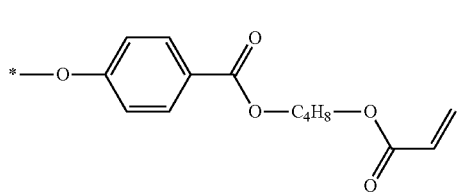
-continued
(A47-5)
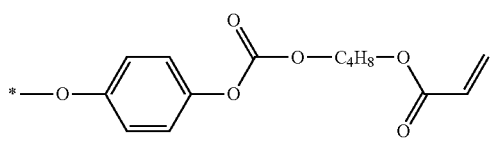
(A47-6)
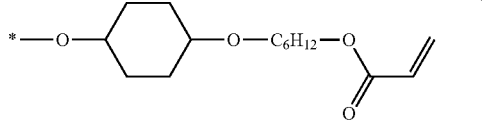
(A47-7)
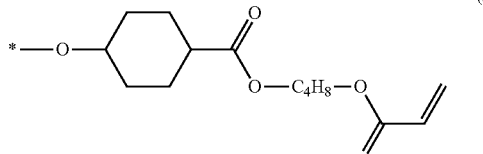
(A47-8)
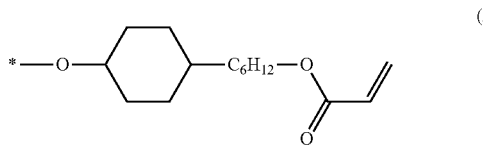
[Chem. 53]
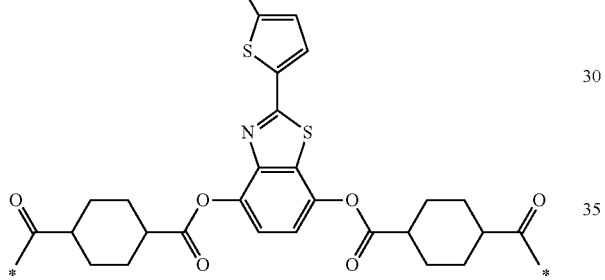
(A48-1)
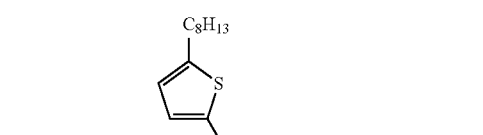
(A48-2)
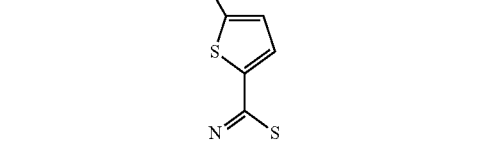
(A48-3)
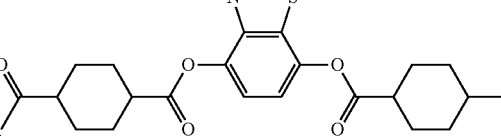
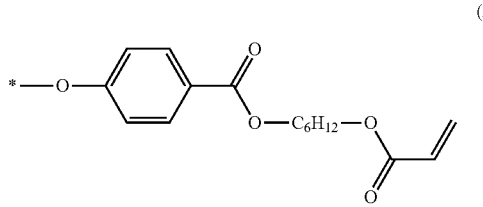

(A48-4)
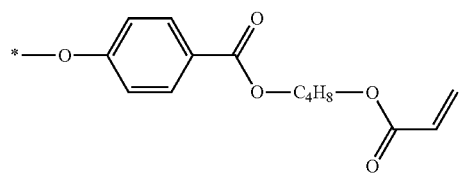
(A48-5)
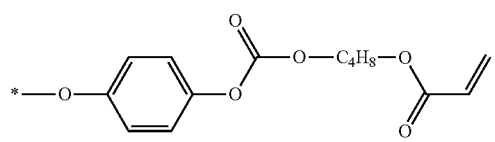
(A48-6)
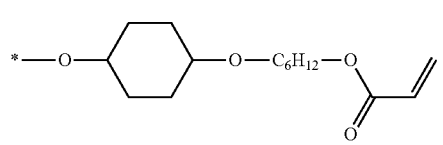
(A48-7)
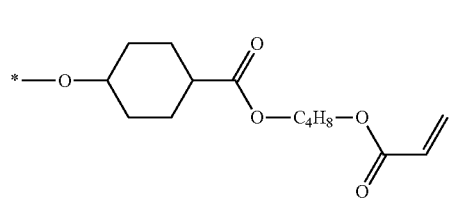
(A48-8)
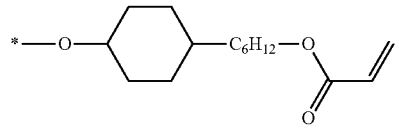
[Chem. 54]
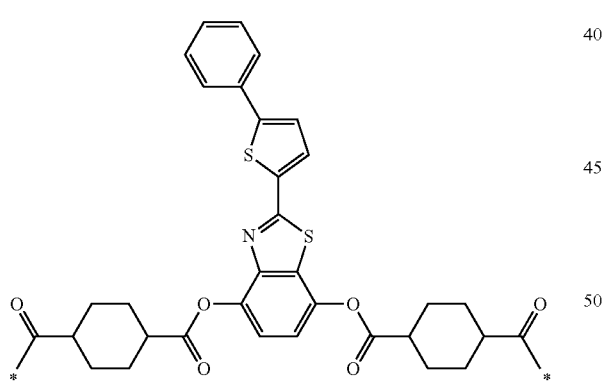
(A49-1)
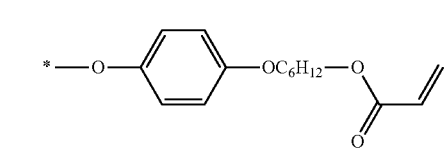
(A49-2)
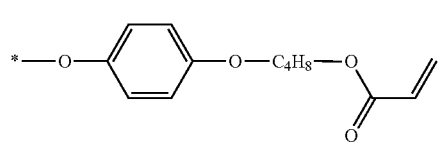
(A49-3)
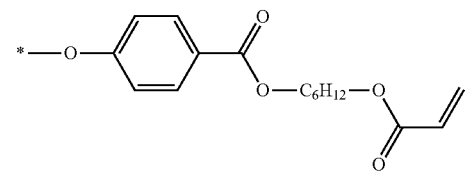
(A49-4)
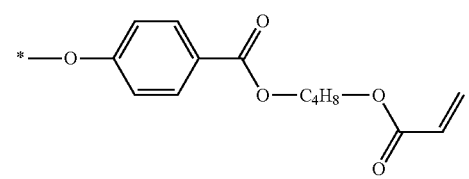
(A49-5)
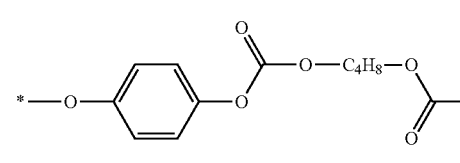
(A49-6)
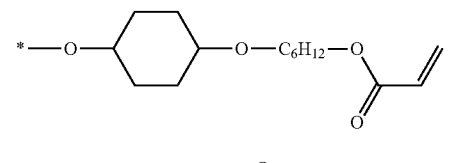
(A49-7)
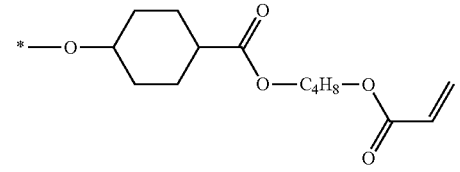
(A49-8)
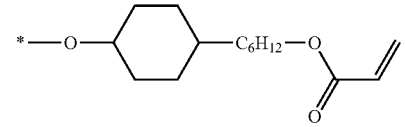
[Chem. 55]
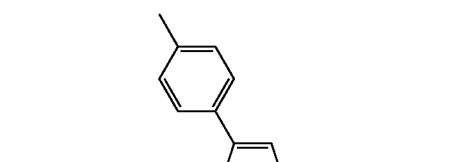
(A50-1)
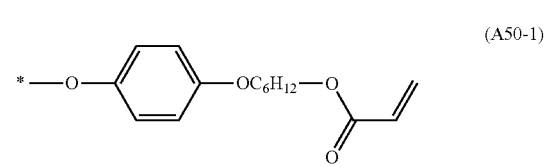

(A50-2)
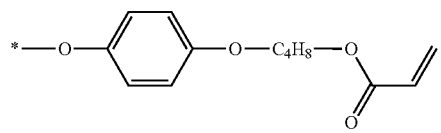
(A50-3)
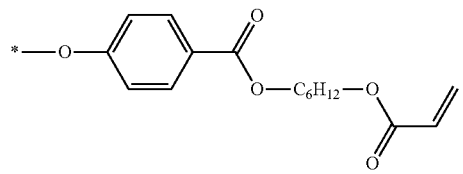
(A50-4)
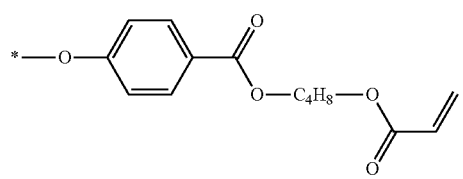
(A50-5)
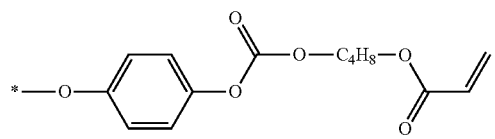
(A50-6)
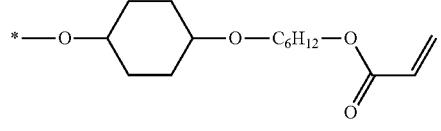
(A50-7)
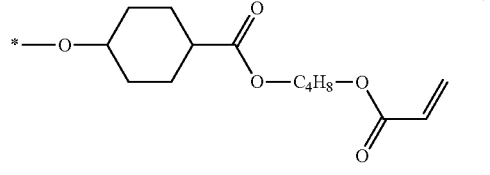
(A50-8)
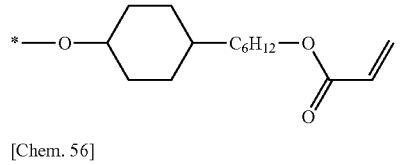
[Chem. 56]
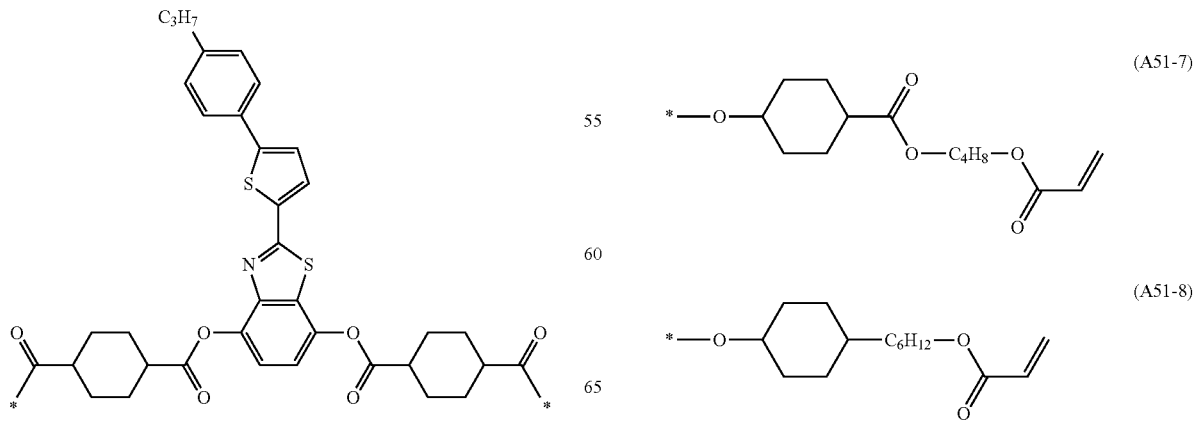
(A51-1)
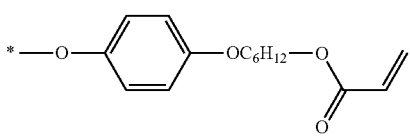
(A51-2)
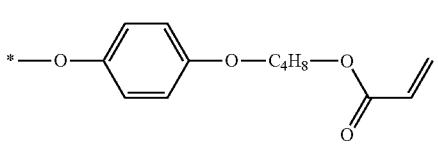
(A51-3)
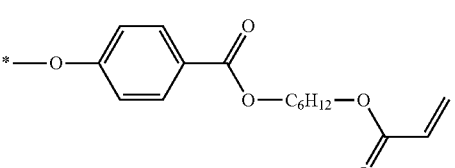
(A51-4)
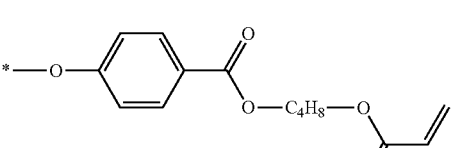
(A51-5)
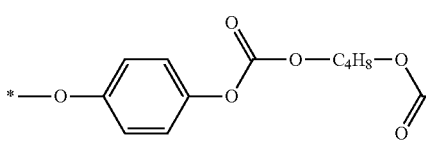
(A51-6)
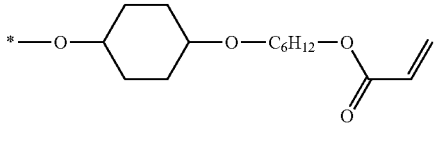
(A51-7)
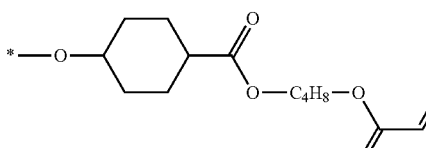
(A51-8)
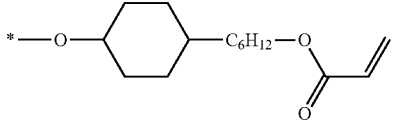

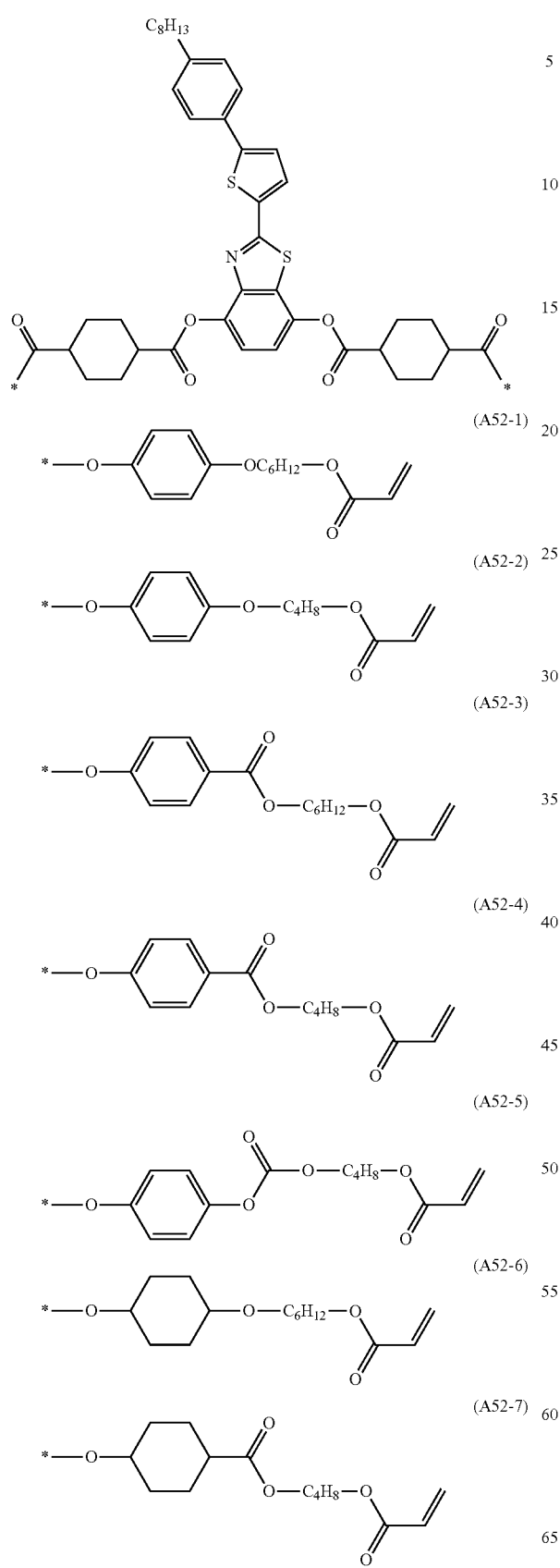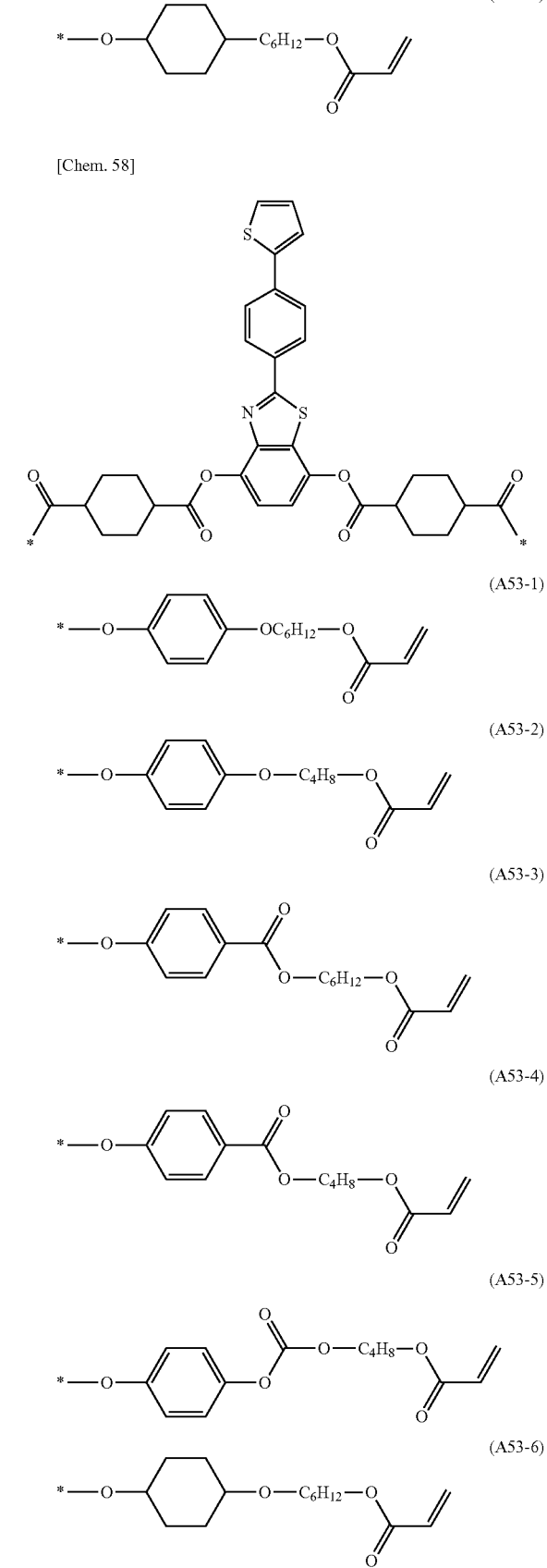

(A53-7)
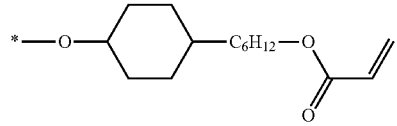
(A53-8)
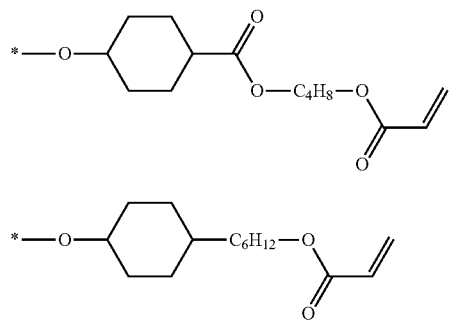
[Chem. 59]
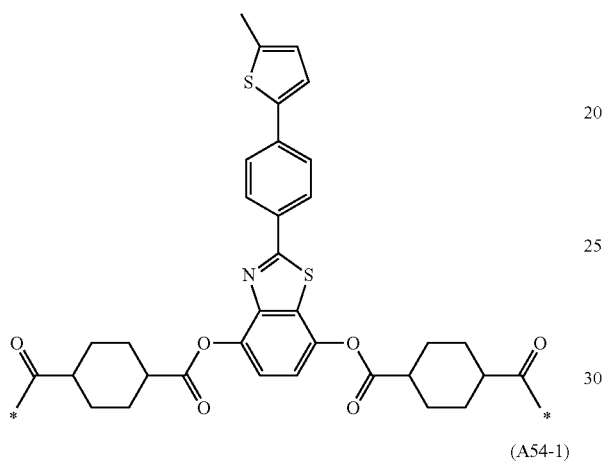
(A54-1)
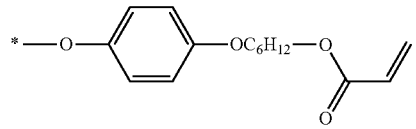
(A54-2)
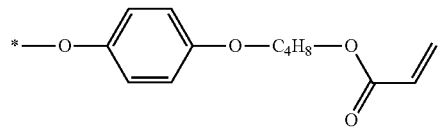
(A54-3)
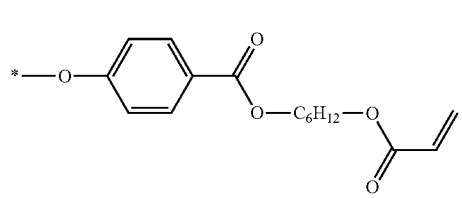
(A54-4)
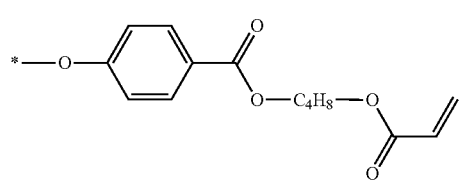
(A54-5)
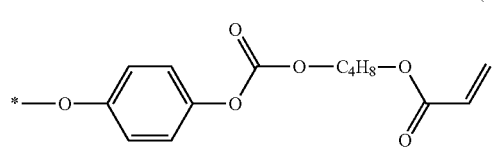
(A54-6)
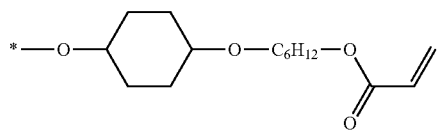
(A54-7)
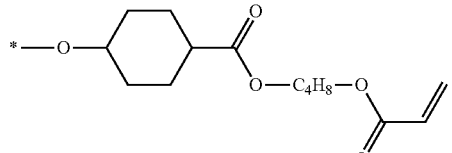
(A54-8)
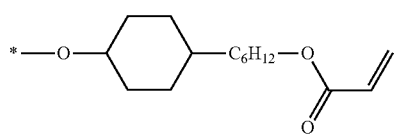
[Chem. 60]
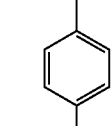
(A55-1)
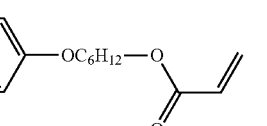
(A55-2)
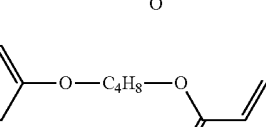
(A55-3)
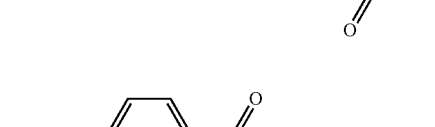
(A55-4)
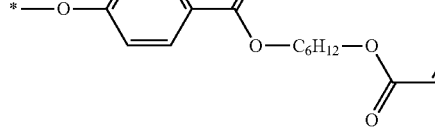

(A55-5) 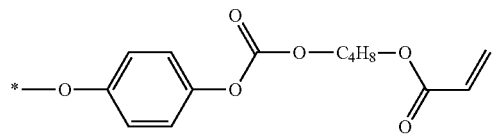
(A55-6) 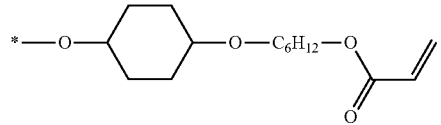
(A55-7) 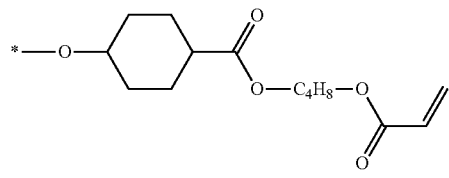
(A55-8) 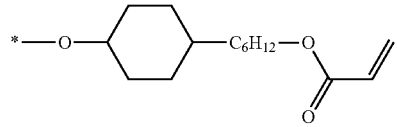
[Chem. 61]
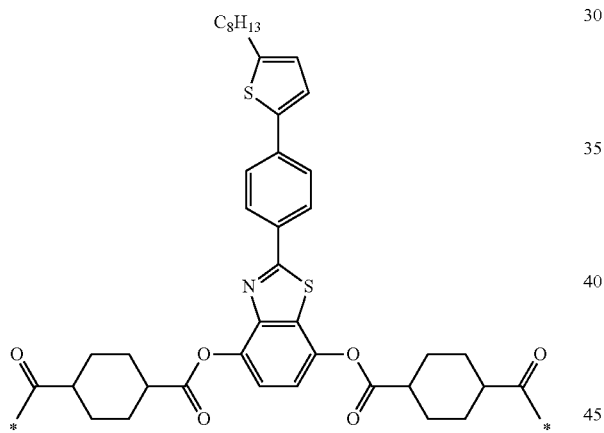
(A56-1) 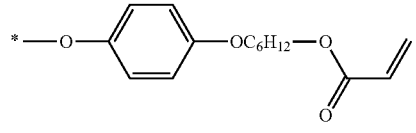
(A56-2) 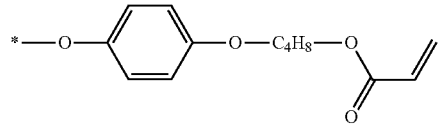
(A56-3) 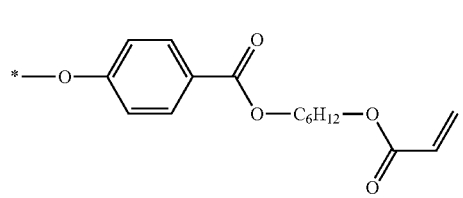
(A56-4) 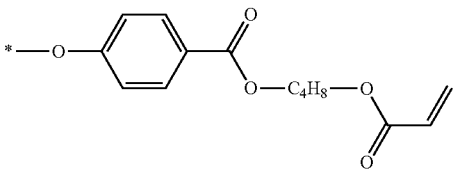
(A56-5) 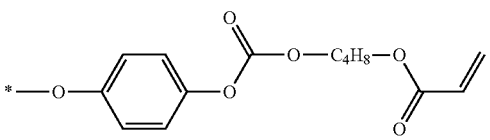
(A56-6) 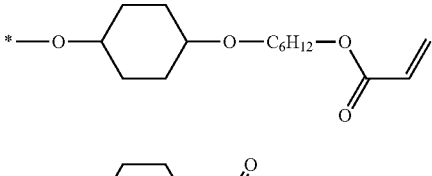
(A56-7) 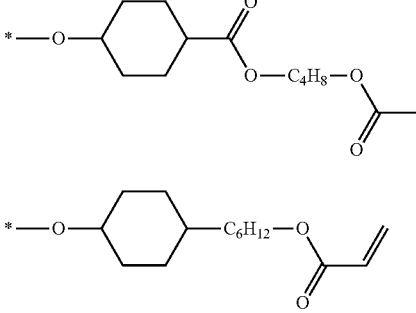
(A56-8) 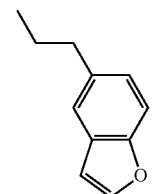
[Chem. 62]
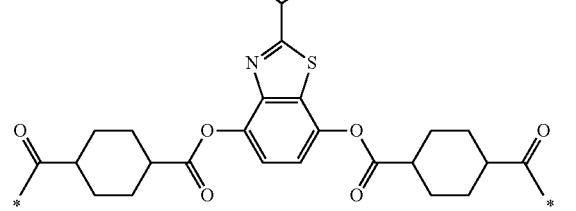
(A57-1) 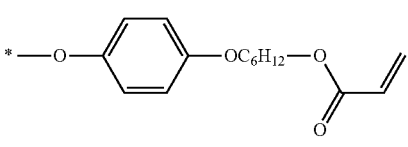
(A57-2) 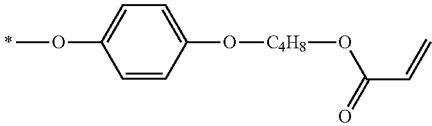

(A57-3)
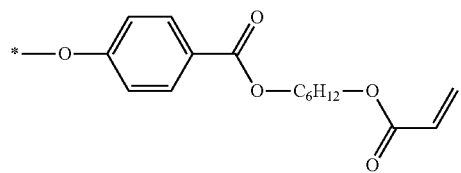
(A57-4)
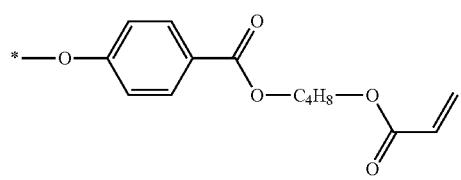
(A57-5)
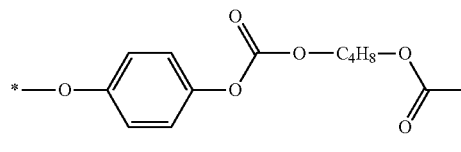
(A57-6)
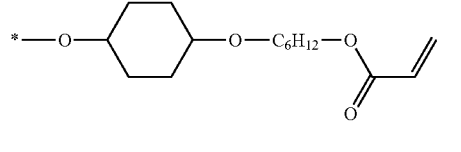
(A57-7)
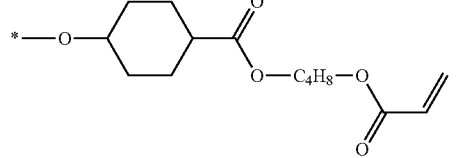
(A57-8)
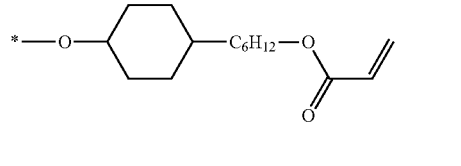
[Chem. 63]
(A58-2)
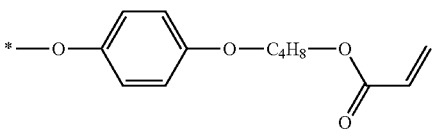
(A58-3)
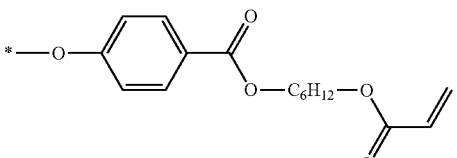
(A58-4)
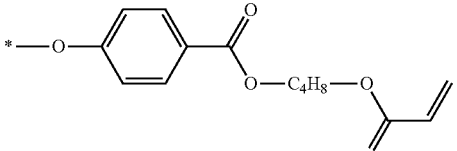
(A58-5)
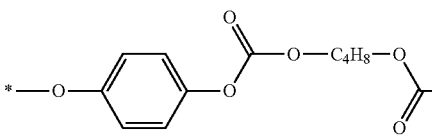
(A58-6)
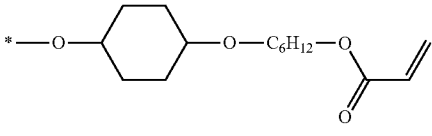
(A58-7)
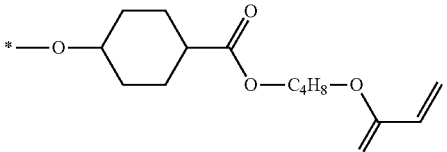
(A58-8)
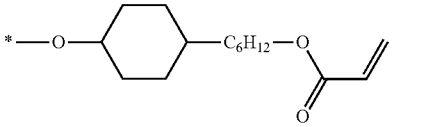
[Chem. 64]
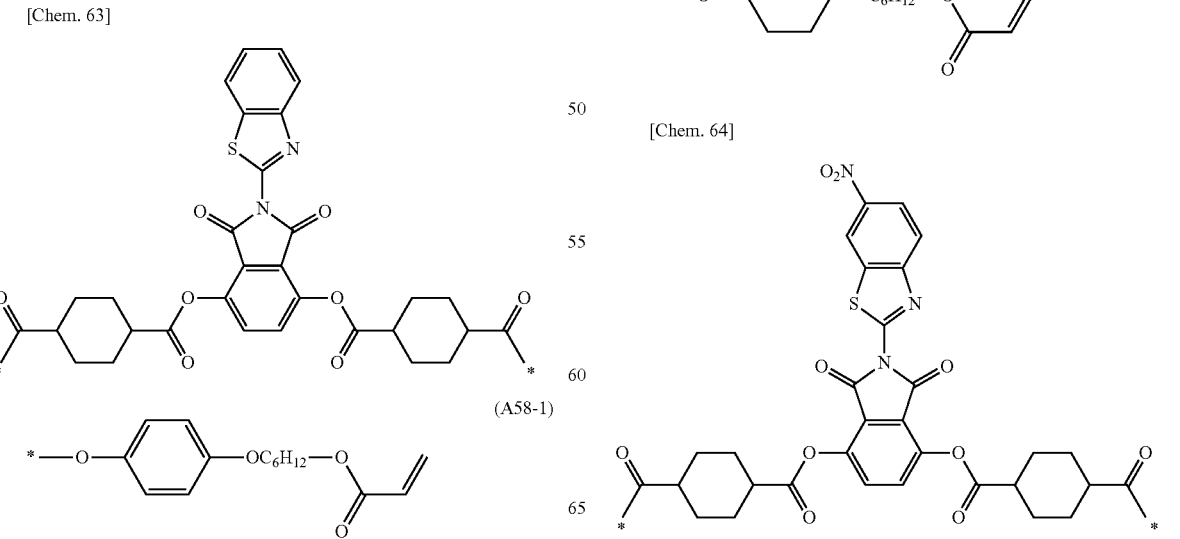
(A58-1)
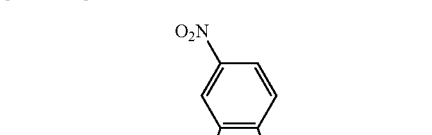

(A59-1)
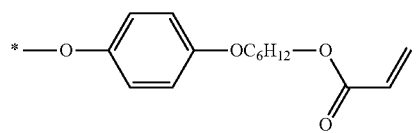
(A59-2)
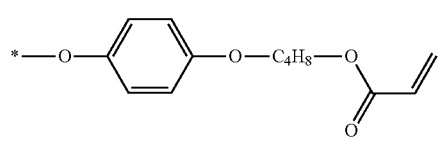
(A59-3)
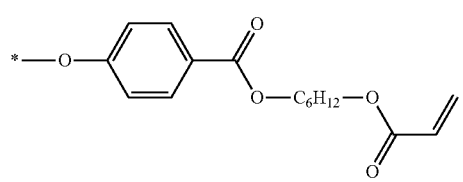
(A59-4)
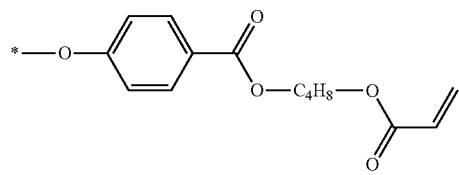
(A59-5)
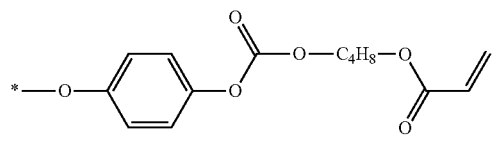
(A59-6)
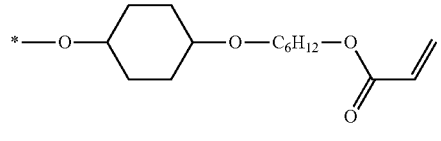
(A59-7)
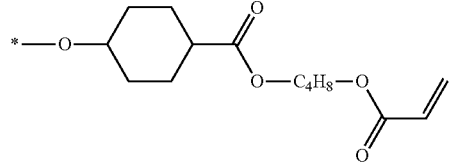
(A59-8)
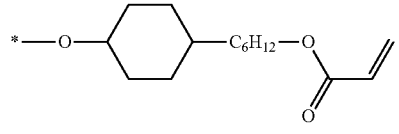
[Chem. 65]
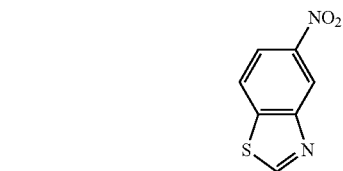
(A60-1)
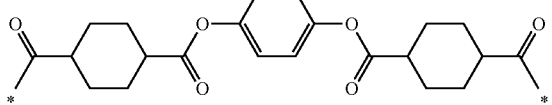
(A60-2)
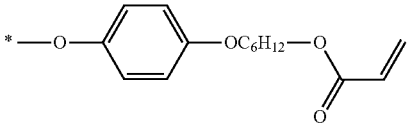
(A60-3)
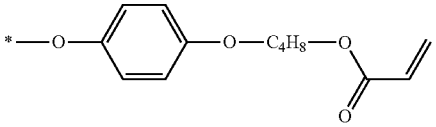
(A60-4)
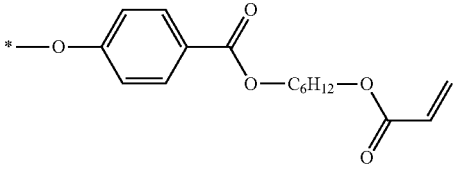
(A60-5)
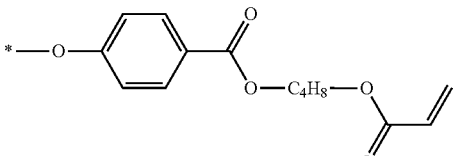
(A60-6)
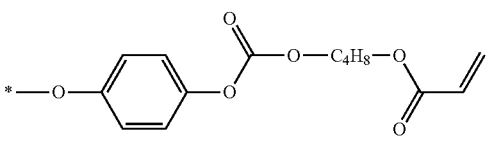
(A60-7)
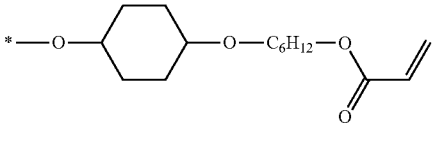

(A60-8)
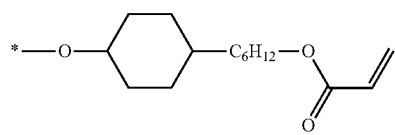
[Chem. 66]
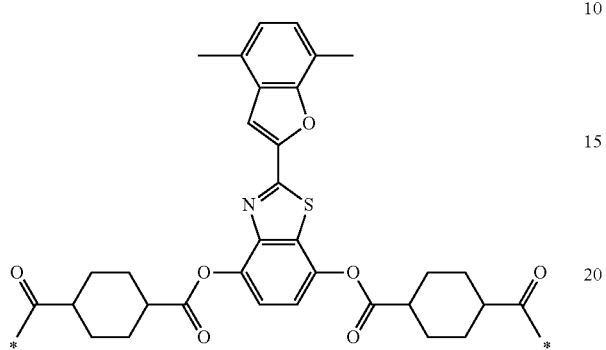
(A61-1)
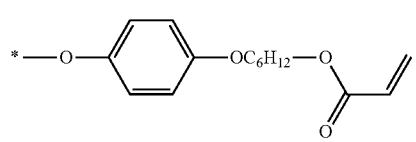
(A61-2)
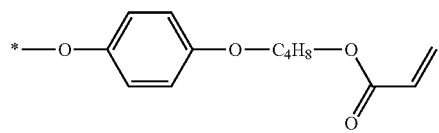
(A61-3)
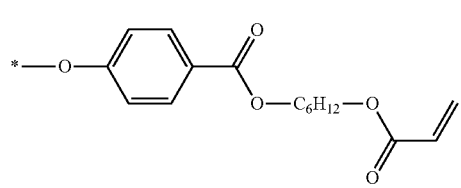
(A61-4)
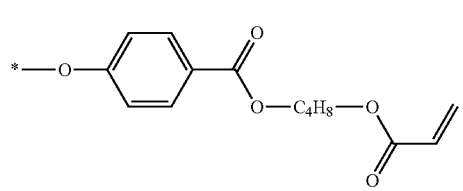
(A61-5)
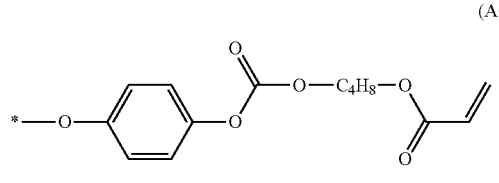
(A61-6)
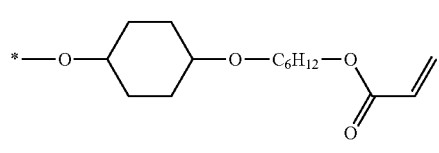
(A61-7)
(A61-8)
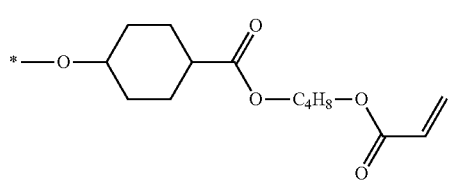
[Chem. 67]
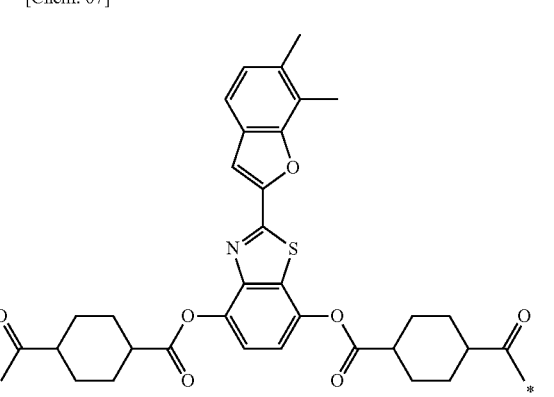
(A62-1)
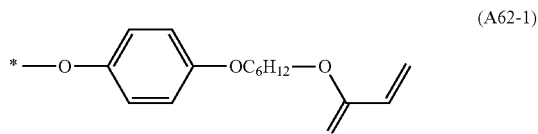
(A62-2)
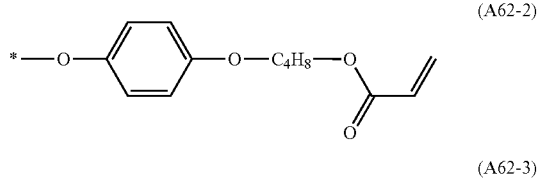
(A62-3)
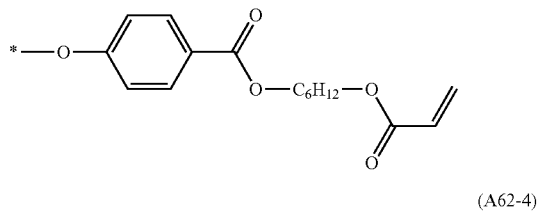
(A62-4)
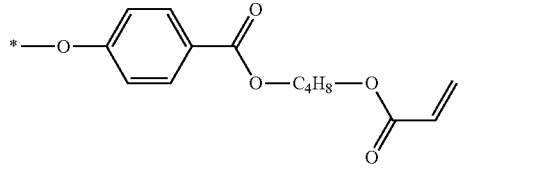
(A62-5)
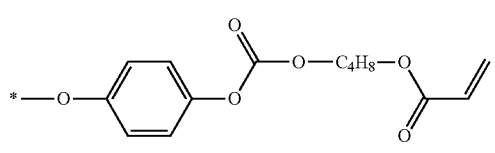

(A62-6)
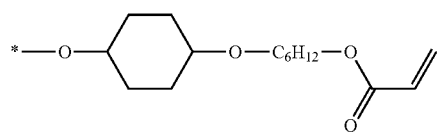
(A62-7)
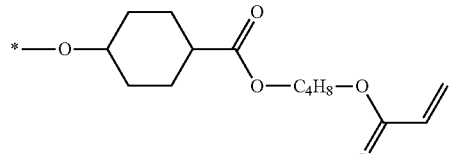
(A62-8)
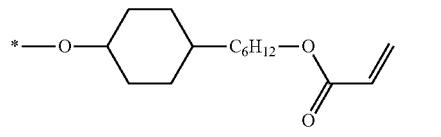
[Chem. 68]
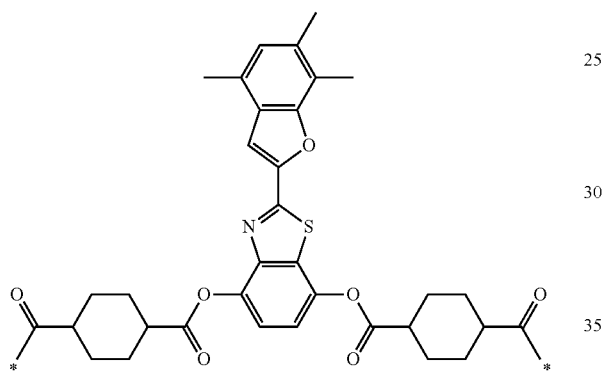
(A63-1)
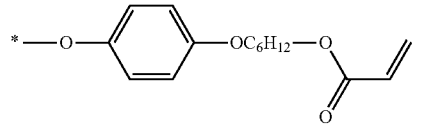
(A63-2)
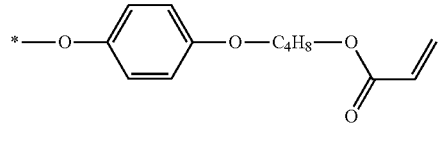
(A63-3)
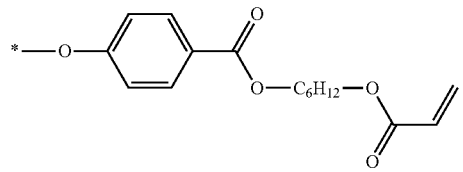
(A63-4)
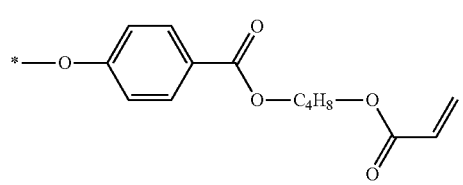
(A63-5)
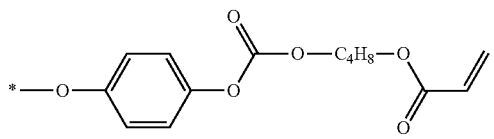
(A63-6)
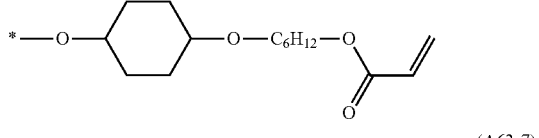
(A63-7)
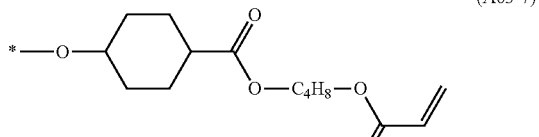
(A63-8)
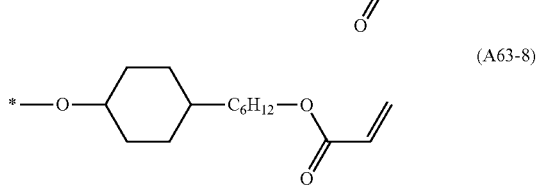
[Chem. 69]
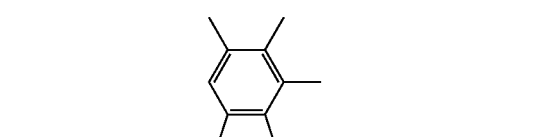
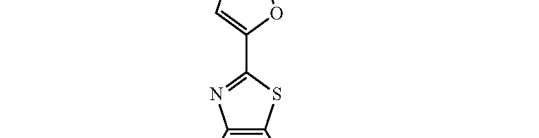
(A64-1)
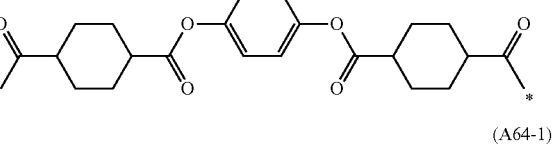
(A64-2)
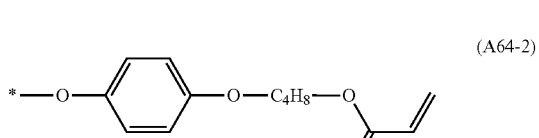
(A64-3)
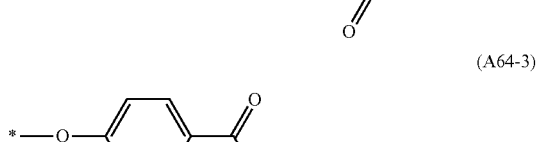

(A64-4)
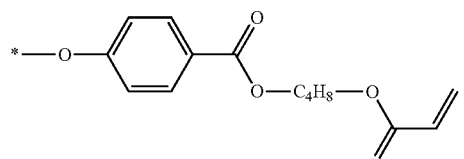
(A64-5)
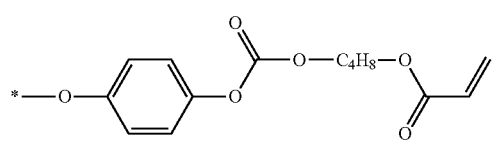
(A64-6)
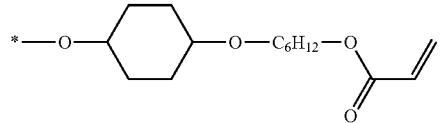
(A64-7)
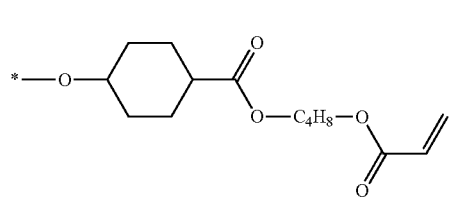
(A64-8)
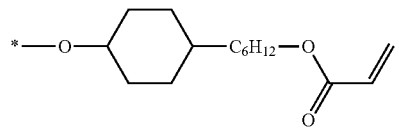
[Chem. 70]
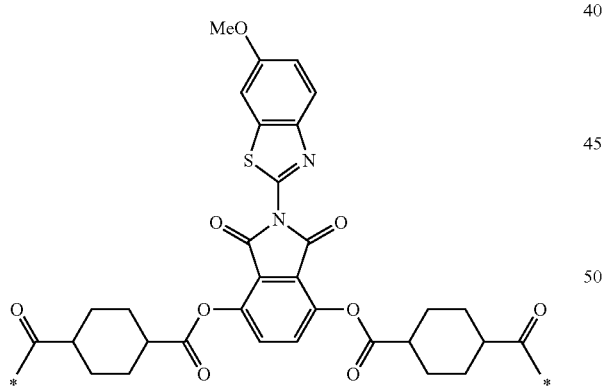
(A66-1)
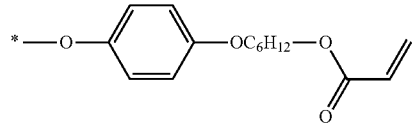
(A66-2)
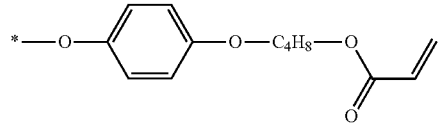
(A66-3)
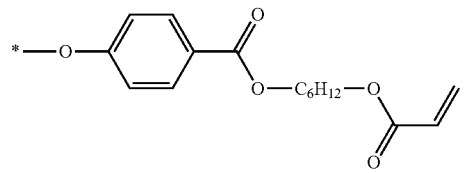
(A66-4)
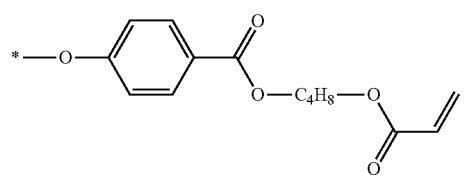
(A66-5)
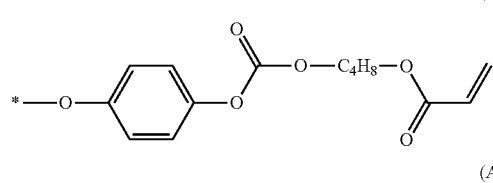
(A66-6)
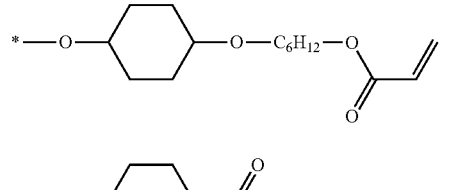
(A66-7)
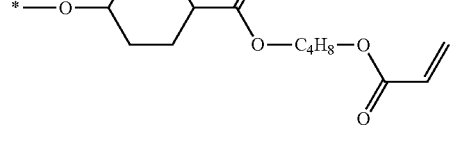
(A66-8)
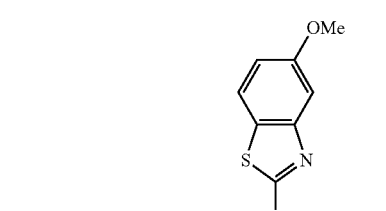
[Chem. 71]
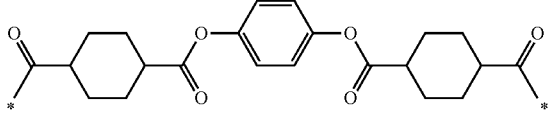
(A67-1)

-continued
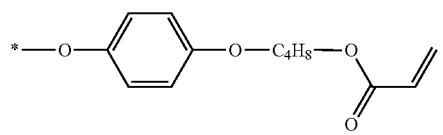
(A67-2)
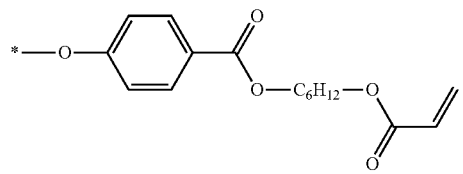
(A67-3)
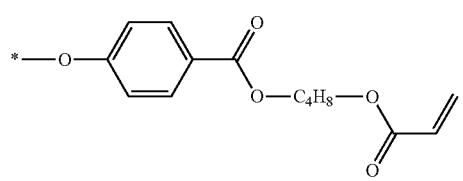
(A67-4)
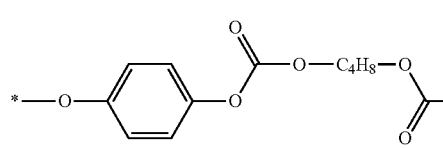
(A67-5)
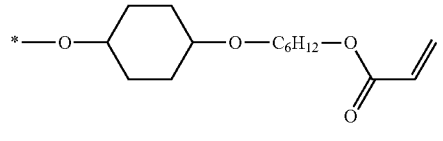
(A67-6)
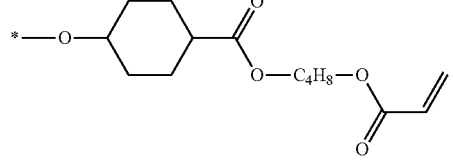
(A67-7)
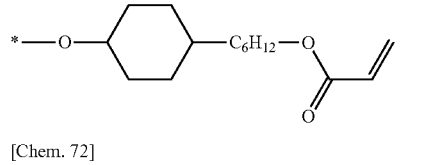
(A67-8)
[Chem. 72]
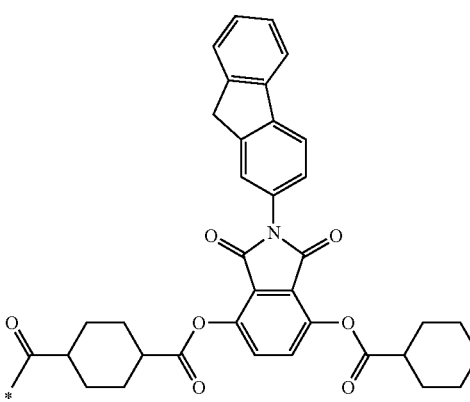
-continued
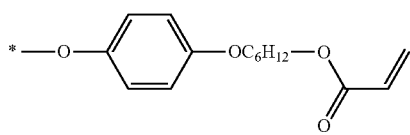
(A68-1)
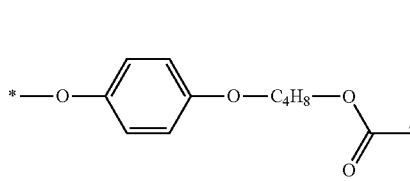
(A68-2)
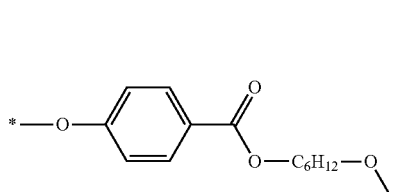
(A68-3)
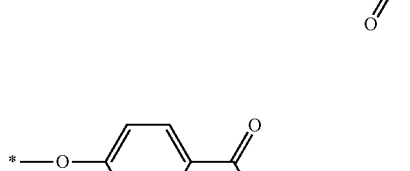
(A68-4)
(A68-5)
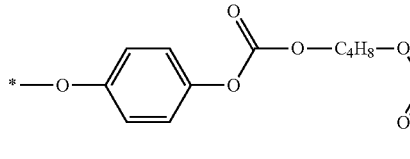
(A68-6)
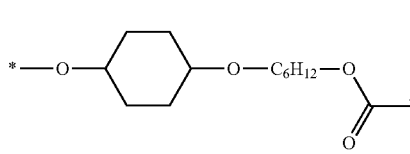
(A67-7)
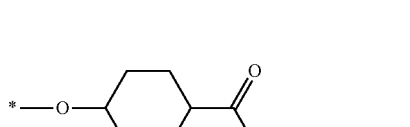
(A67-8)

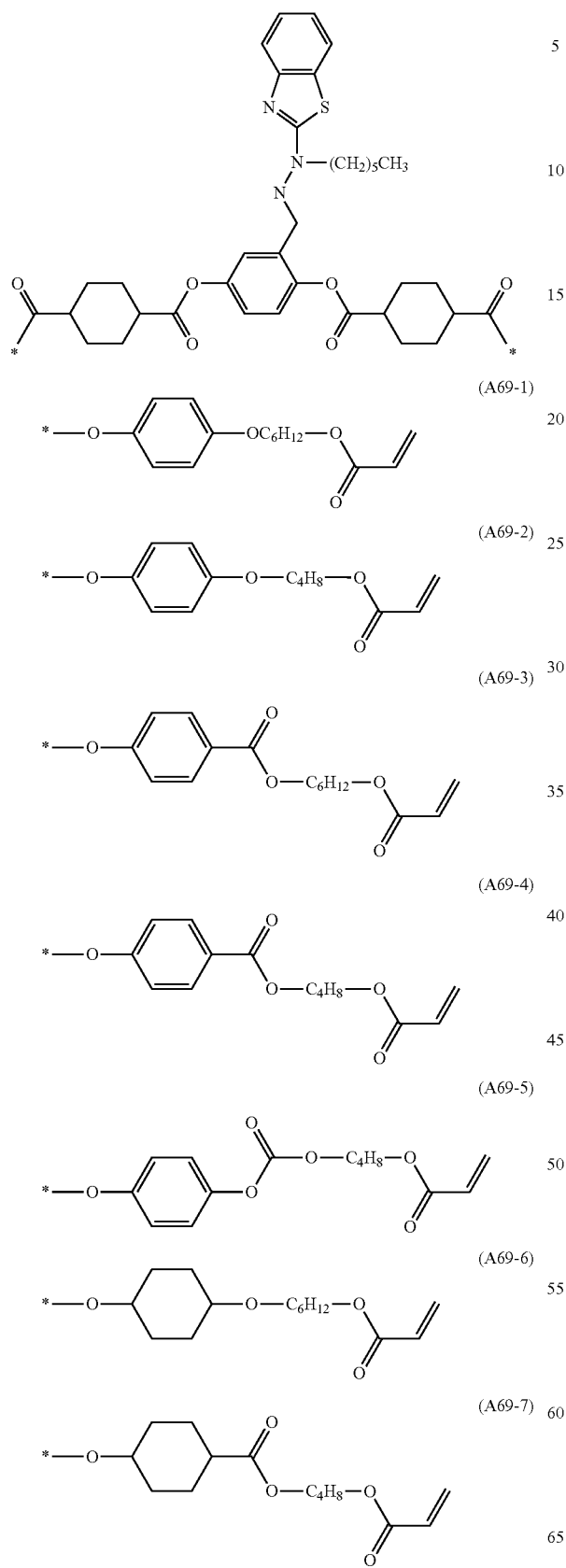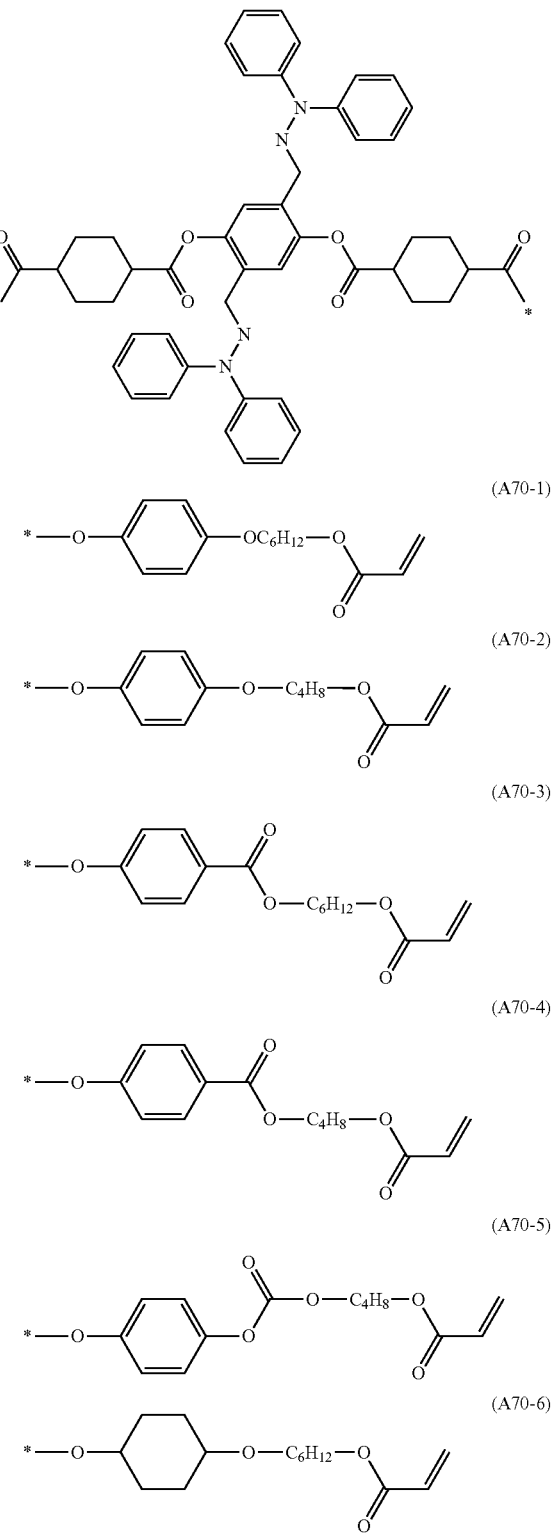

-continued

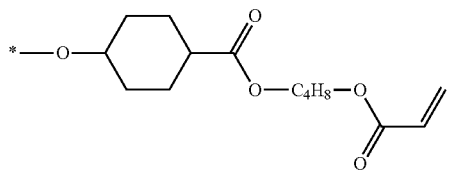
(A70-7)

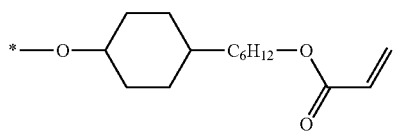
(A70-8)

[Chem. 75]

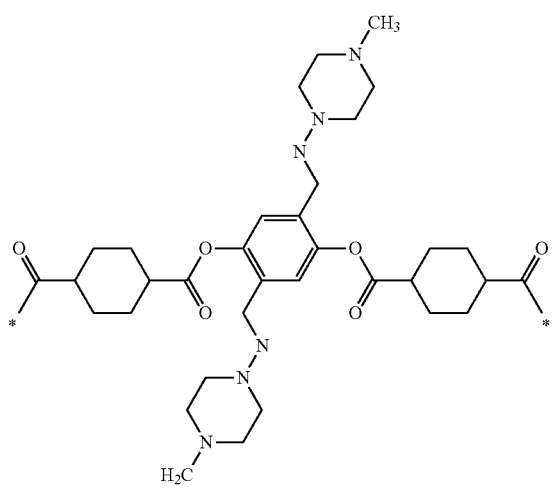

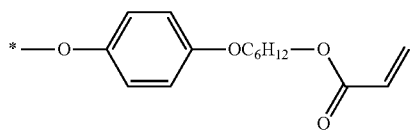
(A71-1)

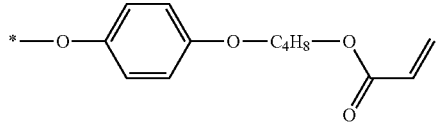
(A71-2)

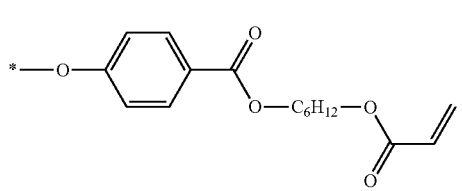
(A71-3)

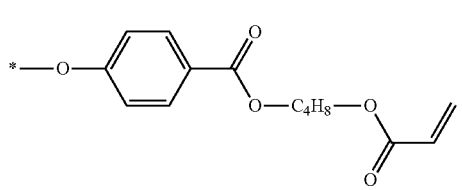
(A71-4)

-continued

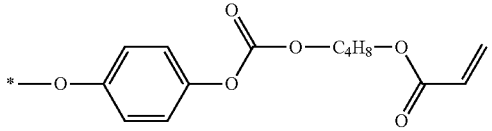
(A71-5)

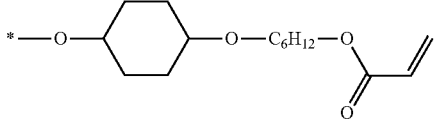
(A71-6)

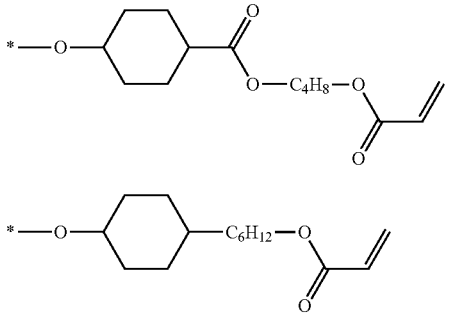
(A71-7)

(A71-8)

When a polymer is produced which is made from the polymerizable liquid crystal compound in an orientation state, a composition containing the polymerizable liquid crystal compound, this compound being optionally diluted with a solvent (hereinafter, the composition will be referred to as the "composition for forming optically anisotropic layer"), is applied onto a substrate or an orientation layer formed on a substrate, and optionally the solvent is volatilized. Thereafter, the compound is polymerized to yield the polymer, which is made from the orientation-state polymerizable liquid crystal compound. By polymerizing the polymerizable liquid crystal compound while keeping the orientation state thereof, a liquid crystal cured layer can be obtained in the state of keeping the orientation state. This liquid crystal cured layer constitutes a retardation film.

In order to heighten the orientation of the polymerizable liquid crystal compound, the content of the polymerizable liquid crystal compound in the composition for forming optically anisotropic layer is usually from 70 to 99.5 parts by mass, preferably from 80 to 99 parts by mass, more preferably from 80 to 94 parts by mass, even more preferably from 80 to 90 parts by mass for 100 parts by mass of solid in the composition for forming optically anisotropic layer. In the present specification, the word "solid" denotes the whole of one or more components caused to remain by removing the solvent from the composition for forming optically anisotropic layer.

The composition for forming optically anisotropic layer may contain, besides the polymerizable liquid crystal compound, known components such as a solvent, a photopolymerization initiator, a polymerization inhibitor, a photosensitizer and a levelling agent.

[Solvent]

The solvent is preferably a solvent in which the polymerizable liquid crystal compound, and other constituent components constituting the composition for forming optically anisotropic layer are soluble, and is more preferably a solvent which is inactive to polymerization reaction of the polymerizable liquid crystal compound, and which is a solvent in which the polymerizable liquid crystal compound and the other constituent components constituting the composition for forming optically anisotropic layer are soluble. Specific examples thereof include water; alcohol solvents such as methanol, ethanol, ethylene glycol, isopropyl alcohol, propylene glycol, methylcellosolve, butylcellosolve, propylene glycol monomethyl ether, and phenol; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-chlorinated aliphatic hydrocarbon solvents such as pentane, hexane and heptane; non-chlorinated aromatic hydrocarbon solvents such as toluene and xylene; nitrile solvents such as acetonitrile; ether solvents such as tetrahydrofuran, and dimethoxyethane; and chlorinated hydrocarbon solvents such as chloroform, and chlorobenzene. Two or more organic solvents may be used in combination. Out of these examples, preferred are alcohol, ester, ketone, non-chlorinated aliphatic hydrocarbon, and non-chlorinated aromatic hydrocarbon solvents.

The content of the solvent(s) is preferably from 10 to 10000 parts by mass, more preferably from 100 to 5000 parts by mass for 100 parts by mass of the solid in the composition for forming optically anisotropic layer. The concentration of the solid in the composition for forming optically anisotropic layer is preferably from 2 to 50% by mass, more preferably from 5 to 50% by mass. The word "solid" denotes the whole of the component(s) caused to remain by removing the solvent(s) from the composition for forming optically anisotropic layer.

[Photopolymerization Initiator]

The photopolymerization initiator is preferably an initiator which is irradiated with light to generate radicals. Examples of the photopolymerization initiator include benzoin compounds, benzophenone compounds, benzyl ketal compounds, α-hydroxyketone compounds, α-aminoketone compounds, α-acetophenone compounds, triazine compounds, iodonium salts, and sulfonium salts. Specific examples thereof include IRGACUREs (registered trademark) 907, 184, 651, 819, 250, and 369 (each manufactured by BASF Japan Ltd.); SEIKUOLs (registered trademark) BZ, Z, and BEE (each manufactured by Seiko Chemical Co., Ltd.), KAYACURE (registered trademark) BP100 (manufactured by Nippon Kayaku Co., Ltd.), KAYACURE UVI-6992 (manufactured by the Dow Chemical Co.), ADEKA-OPTOMERs (registered trademark) SP-152 and SP-170 (each manufactured by Adeka Corp.), TAZ-A, and TAZ-PP (each manufactured by Nihon SiberHegner K.K.), and TAZ-104 (manufactured by Sanwa Chemical Co., Ltd.). Out of these examples, preferred are α-acetophenone compounds. Examples of the α-acetophenone compounds include 2-methyl-2-morpholino-1-(4-methylsulfanylphenyl)propane-1-one, 2-dimethylamino-1-(4-morpholinophenyl)-2-benzylbutane-1-one, and 2-dimethylamino-1-(4-morpholinophenyl)-2-(4-methylphenylmethyl)butane-1-one. More preferred are 2-methyl-2-morpholino-1-(4-methylsulfanylphenyl)propane-1-one, and 2-dimethylamino-1-(4-morpholinophenyl)-2-benzylbutane-1-one. Examples of commercially available products of the α-acetophenone compounds include IRGACUREs 369, 379EG, and 907 (each manufactured by BASF Japan Ltd.), and SEIKUOL BEE (Seiko Chemical Co., Ltd.).

About the photopolymerization initiator, the maximum absorption wavelength thereof is preferably from 300 to 380 nm, more preferably from 300 to 360 nm since the initiator can make sufficient use of energy emitted from a light source to give an excellent producing performance.

The content of the polymerization initiator is usually from 0.1 to 30 parts by mass, preferably from 0.5 to 10 parts by mass for 100 parts by mass of the polymerizable liquid crystal compound to cause the polymerizable liquid crystal compound to be polymerized without disturbing the orientation of the polymerizable liquid crystal compound.

[Polymerization Inhibitor]

The polymerization inhibitor makes it possible to control polymerization reaction of the polymerizable liquid crystal compound.

Examples of the polymerization inhibitor include hydroquinone, and hydroquinones each having a substituent such as an alkyl ether; catechols each having a substituent such as an alkyl ether, such as butylcatechol; pyrrogallols; radical capturing agents, such as a 2,2,6,6-tetramethyl-1-piperidinyloxy radical; thiophenols; and β-naphthylamine and β-naphthols. The content of the polymerization inhibitor is usually from 0.1 to 30 parts by mass, preferably from 0.5 to 10 parts by mass for 100 parts by mass of the polymerizable liquid crystal compound to polymerize the polymerizable liquid crystal compound without disturbing the orientation of this compound.

[Photosensitizer]

Examples of the photosensitizer include xanthones such as xanthone, and thioxanthone; anthracene, and anthracenes each having a substituent such as an alkyl ether group; phenothiazine; and rubrene.

The use of the photosensitizer makes it possible to heighten the photopolymerization initiator in sensitivity. The content of the photosensitizer is usually from 0.1 to 30 parts by mass, preferably from 0.5 to 10 parts by mass for 100 parts by mass of the polymerizable liquid crystal compound.

[Leveling Agent]

Examples of the leveling agent include organic modified silicone oil type, polyacrylate type, and perfluoroalkyl type levelling agents. Specific examples thereof include DC3PA, SH7PA, DC11PA, SH28PA, SH29PA, SH30PA, ST80PA, ST86PA, SH8400, SH8700, and FZ2123 (each manufactured by manufactured by Dow Corning Toray Co., Ltd.), KP321, KP323, KP324, KP326, KP340, KP341, X22-161A, and KF6001 (each manufactured by Shin-Etsu Chemical Co., Ltd., TSF400, TSF401, TSF410, TSF4300, TSF4440, TSF4445, TSF-4446, TSF4452, and TSF4460 (each manufactured by Momentive Performance Materials Japan LLC, FLUORINERTs (registered trademark) FC-72, FC-40, FC-43, and FC-3283 (each manufactured by Sumitomo 3M Ltd.), MEGAFACs (registered trademark) R-08, R-30, R-90, F-410, F-411, F-443, F-445, F-470, F-477, F-479, F-482, and F-483 (each manufactured by DIC Corp.), Eftops (trade name) EF301, EF303, EF351, and EF352 (each manufactured by Mitsubishi Materials Electronic Chemicals Co., Ltd., SURFLONs (registered trademark) S-381, S-382, S-383, S-393, SC-101, SC-105, KH-40, and SA-100 (each manufactured by AGC Seimi Chemical Co., Ltd.), products E1830 and E5844 (trade names, manufactured by Daikin Fine Chemical Kenkyusho, K.K.), and products BM-1000, BM-1100, BYK-352, BYK-353, and BYK-361N (trade names, manufactured by a company BM Chemie). Two or more leveling agents may be used in any combination.

The use of the leveling agent makes it possible to form a flat and smooth optically anisotropic layer. The use also makes it possible to control the fluidity of the composition for forming optically anisotropic layer in the step of producing an optical film having the optically anisotropic layer, and adjust the crosslinkage density of the retardation film.

The content of the levelling agent is usually from 0.01 to 40 parts by mass, preferably from 0.1 to 30 parts by mass, more preferably from 0.1 to 10 parts by mass for 100 parts by mass of the polymerizable liquid crystal compound.

<Application of Composition for Forming Optically Anisotropic Layer>

When a polymer made from the polymerizable liquid crystal compound in an orientation state is produced, the composition for forming optically anisotropic layer is applied onto a substrate or an orientation layer formed on a substrate. The substrate is preferably a resin substrate. The resin substrate is usually a transparent resin substrate. The transparent resin substrate means a substrate having a translucency permitting the substrate to transmit light, particularly, visible rays. The translucency denotes a property of showing a transmittance of 80% or more to light rays having wavelengths of 380 to 780 nm. The resin substrate may be usually a film-form substrate, and is preferably a rolled film roll.

[Substrate]

Examples of the resin included in the substrate include polyolefins such as polyethylene, polypropylene, and norbornene polymers; polyvinyl alcohol; polyethylene terephthalate; polymethacrylic esters; polyacrylic esters; cellulose esters; polyethylene naphthalate; polycarbonates; polysulfones; polyethersulfones; polyetherketones; polyphenylene sulfides; and polyphenylene oxides. Out of these examples, preferred are polyolefins such as polyethylene, polypropylene, and norbornene polymers.

The thickness of the substrate is usually from 5 to 300 µm, preferably from 20 to 200 µm.

An effect of making the retardation layer even thinner can be obtained by peeling off the substrate from the substrate-integrated polymer, this polymer being made from the orientation-state polymerizable liquid crystal compound, and then transferring only the polymer to an appropriate member.

[Orientation Layer]

An orientation layer may be formed on a surface of the substrate to which the composition for forming optically anisotropic layer is to be applied. The orientation layer is a film having an orientation regulating force for orienting the polymerizable liquid crystal compound into a desired direction.

The orientation layer is preferably an orientation layer which has a solvent resistance not permitting this film to be dissolved by, e.g., the application of the composition for forming optically anisotropic layer, and which has a heat resistance against heating treatment for removing the solvent, and for the orientation of the polymerizable liquid crystal compound, the orientation being to be detailed later. Examples of the orientation layer include an orientation layer including an orienting polymer, a photo-orientation layer, and a groove-orientation layer having, in a surface thereof, a pattern of irregularities or plural grooves.

The orientation layer makes the orientation of the polymerizable liquid crystal compound easy. In accordance with the species of the orientation layer or rubbing conditions therefor, the orientation can be controlled into various forms, such as horizontal orientation, vertical orientation, hybrid orientation, and inclined orientation forms. When a rod liquid crystal compound is horizontally oriented, or a disc liquid crystal compound is vertically oriented, the front retardation value of the retardation film is controllable.

The thickness of the orientation layer is usually from 10 to 10000 nm, preferably from 10 to 1000 nm, more preferably from 50 to 200 nm.

[Orientation Layer Including Orienting Polymer]

Examples of the orienting polymer include polyamides and gelatins each having amide bonds, polyimides having imide bonds, polyamic acids, which are hydrolyzates of the polyimides, polyvinyl alcohol, alkyl-modified polyvinyl alcohol, polyacrylamide, polyoxazole, polyethyleneimine, polystyrene, polyvinylpyrrolidone, polyacrylic acid, and polyacrylic acid esters. Out of these examples, polyvinyl alcohol is preferred. Two or more orienting polymers may be used in any combination.

The orientation layer including the orienting polymer is usually formed by applying, onto a substrate, an orienting polymer composition in which the orienting polymer is dissolved in a solvent, and then removing the solvent to form a coating layer as the orientation layer. Alternatively, the orientation layer is obtained by applying the orienting polymer composition onto a substrate, removing the solvent to form a coating layer, and then rubbing the coating layer.

It is sufficient for the concentration of the orienting polymer in the orienting polymer composition to permit the orienting polymer to be completely dissolved in the solvent. The content of the orienting polymer in the orienting polymer composition is preferably from 0.1 to 20% by mass, more preferably from 0.1 to 10% by mass.

The orienting polymer composition is commercially available. Examples of the commercially available orienting polymer composition include SUNEVER (registered trademark, manufactured by Nissan Chemical Industries, Ltd.), and OPTOMER (registered trademark, manufactured by JSR Corp.).

The method for applying the orienting polymer composition onto the substrate may be equivalent to a method that will be detailed below for applying the composition for forming optically anisotropic layer onto the substrate. Examples of the method for removing the solvent contained in the orienting polymer composition include a natural drying method, a draught drying method, a heating drying method, and a reduced-pressure drying method.

The coating film made from the orienting polymer composition may be subjected to rubbing treatment. The rubbing treatment can give orientation regulating force to the coating film.

The method for the rubbing treatment may be a method of bringing the coating film into contact with a rubbing roll onto which a rubbing cloth is wound while this roll is rotated. By applying masking to the coating film at the time of conducting the rubbing treatment, plural regions different from each other in orientation direction (i.e., a pattern) can be formed in the orientation layer.

[Photo-Orientation Layer]

The optical orientation layer is usually yielded by applying, onto a substrate, a composition for forming photo-orientation layer containing a polymer or monomer having an optically reactive group, removing the solvent, and then radiating polarized light (preferably, polarized UV) to the workpiece. About the optical orientation layer, the direction of the orientation regulating force thereof is controllable at will by selecting the polarization direction of the polarized light to be radiated.

The optically reactive group denotes a group that is irradiated with light to generate orienting power. Specifically, this group may be a group related to an optical reaction from which orientating power is originated, an example of this reaction being an orientation inducing reaction, isomerizing reaction, optical dimerization reaction, optical cross-linking reaction or optical decomposition reaction of molecules that is generated by irradiation with light. The optically reactive group is preferably a group having an unsaturated group, particularly, a double bond, and is in particular preferably a group having at least one selected from the group consisting of a carbon-carbon double bond (C=C bond), a carbon-nitrogen double bond (C=N bond), a nitrogen-nitrogen double bond (N=N bond), and a carbon-oxygen double bond (C=O bond).

Examples of the optically reactive group having a C=C bond include vinyl, polyene, stilbene, stilbazole, stilbazolium, chalcone, and cinnamoyl groups. Examples of the optically reactive group having a C=N bond include groups each having, e.g., an aromatic Schiff's base or aromatic hydrazone structure. Examples of the optically reactive group having an N=N bond include azobenzene, azonaphthalene, aromatic heterocyclic azo, bisazo and formazan groups, and a group having an azoxybenzene structure. Examples of the optically reactive group having a C=O bond include benzophenone, coumarin, anthraquinone, and maleimide groups. These groups may have a substituent, such as an alkyl, alkoxy, aryl, allyloxy, cyano, alkoxycarbonyl, hydroxyl, sulfonate, or halogenated alkyl group.

The optically reactive group is preferably a group related to optical dimerization reaction or optical crosslinking reaction since the group gives an excellent orientation. Particularly preferred is the group related to optical dimerization reaction. Cinnamoyl and chalcone groups are preferred since the groups easily give an optical orientation layer which is relatively small in polarized light radiation dose necessary for orientation and which is further excellent in thermal stability and stability overtime. The polymer having an optically reactive group is in particular preferably a polymer having a cinnamoyl group, which permits a terminal moiety of a side chain of the polymer to come to have a cinnamic acid structure.

The polymer or monomer having an optically reactive group in the composition for forming photo-orientation layer is adjustable in accordance with the species of the polymer or monomer, or the thickness of a target optical orientation layer, and is preferably 0.2% by mass or more, more preferably from 0.3 to 10% by mass. As far as the properties of the optical orientation layer are not remarkably lost, the composition for forming photo-orientation layer may contain a polymeric material such as polyvinyl alcohol or polyimide, or a photosensitizer.

The method for applying the composition for forming photo-orientation layer onto the substrate may be a method equivalent to the method, which will be detailed later, for applying the composition for forming optically anisotropic layer onto the substrate. The method for removing the solvent from the applied composition for forming photo-orientation layer may be a method equivalent to the method for removing the solvent from the orienting polymer composition.

In order to radiate the polarized light onto the workpiece for the optical orientation layer, it is allowable to adopt the manner of radiating the polarized light directly onto the workpiece, in which the solvent has been removed from the composition for forming photo-orientation layer applied onto the substrate, or the manner of radiating the polarized light to the workpiece from the substrate-side thereof to cause the polarized light to penetrate into the substrate. The polarized light is preferably composed of substantially parallel rays. The wavelengths of the polarized light to be radiated are preferably the following wavelengths in connection with the polymer or monomer having an optically reactive group: wavelengths at which the optically reactive group can absorb optical energy based on these wavelengths. Specifically, the polarized light is in particular preferably composed of UV rays (ultraviolet rays) having a wavelength range from 250 to 400 nm. Examples of a light source for radiating the polarized light include a xenon lamp, a high-pressure mercury lamp, a super-high-pressure mercury lamp, a metal halide lamp, and an ultraviolet ray laser such as a KrF or ArF laser. Out of these examples, preferred are high-pressure mercury, super-high-pressure mercury, and metal halide lamps since these lamps are large in emission intensity of an ultraviolet ray having a wavelength of 313 nm. By causing light from any one of these light sources to pass through an appropriate polarizing layer to be radiated to the composition for forming photo-orientation layer, a polarized UV ray can be radiated to the workpiece. The polarizing layer may be a polarizing filter, a polarizing prism such as a Glan-Thompson prism or a Glan-Taylor prism, or a polarizing layer of a wire grid type.

By applying masking to the workpiece at the time of the radiation of the polarized light, plural regions different from each other in orientation direction (i.e., a pattern) can be formed in the orientation layer.

<Application of Composition for Forming Optically Anisotropic Layer>

The composition for forming optically anisotropic layer is applied on to the substrate or the orientation layer. Examples of the method for applying the composition for forming optically anisotropic layer onto the substrate include extrusion coating, direct gravure coating, reverse gravure coating, CAP coating, slit coating, and die coating methods. Another example thereof is a coating method using a coater such as a dip coater, a bar coater or a spin coater. Out of these examples, preferred are CAP coating, inkjet coating, dip coating, slit coating, die coating, and bar-coater-used coating methods since the composition can be continuously applied in a roll-to-roll manner. In the case of attaining the roll-to-roll-manner coating, it is allowable to apply the composition for forming photo-orientation layer and some other onto the substrate to form an orientation layer, and continuously apply the composition for forming optically anisotropic layer onto the resultant orientation layer.

<Drying of Composition for Forming Optically Anisotropic Layer>

Examples of the method for removing the solvent contained in the composition for forming optically anisotropic layer include natural drying, draught drying, heating drying, and reduced-pressure drying, and a method in which two or more of these drying methods are combined with each other. Out of these methods, natural drying and heating drying are preferred. The drying temperature ranges preferably from 0 to 250° C., more preferably from 50 to 220° C., even more preferably from 60 to 170° C. The drying period is preferably from 10 seconds to 20 minutes, more preferably from 30 seconds to 10 minutes. The composition for forming photo-orientation layer, and the orienting polymer composition can also be dried in the same way.

<Polymerization of Polymerizable Liquid Crystal Compound>

A method in the present invention for polymerizing the polymerizable liquid crystal compound is preferably photopolymerization. The photopolymerization is performed by radiating an active energy ray onto a laminate in which the composition for forming optically anisotropic layer containing the polymerizable liquid crystal compound is applied onto the substrate or the orientation layer. The active energy ray to be radiated is appropriately selected in accordance with the species of the polymerizable liquid crystal compound contained in the dried coating layer (in particular, the species of the polymerizable functional group which the polymerizable liquid crystal compound has); with, when the composition contains a photopolymerization initiator, the species of this initiator; and with the amounts of these components. The energy ray is specifically of one or more light species selected from the group consisting of visible rays, ultraviolet rays and an X-ray, and α, β and γ rays. Out of these species, ultraviolet rays are preferred since the rays make it easy to control the advance of the polymerization reaction, and ultraviolet rays used widely for a photopolymerization apparatus in the present technical field are usable. Thus, it is preferred to select the species of the polymerizable liquid crystal compound so as to be polymerizable by the ultraviolet rays.

When the composition for forming optically anisotropic layer contains a polymerization initiator, it is preferred to select the species of the polymerization initiator so as to be polymerizable by the ultraviolet rays.

Examples of a light source for the active energy ray include a low-pressure mercury lamp, a middle-pressure mercury lamp, a high-pressure mercury lamp, a super-high-pressure mercury lamp, a xenon lamp, a halogen lamp, a carbon arc lamp, a tungsten lamp, a gallium lamp, an excimer laser, an LED light source emitting a light ray having a wavelength range of 380 to 440 nm, a chemical lamp, a black light lamp, a microwave excited mercury lamp, and a metal halide lamp.

The period when the light is radiated is usually from 0.1 second to 10 minutes, preferably from 0.1 second to 1 minute, more preferably from 0.1 to 30 seconds, even more preferably from 0.1 to 10 seconds. When the period is in any one of these ranges, an optically anisotropic layer better in transparency can be yielded.

The thickness of the retardation film (optically anisotropic layer) of the present invention is appropriately adjustable in accordance with the usage thereof. The thickness is preferably from 0.5 to 5 μm. In order to make the film small in photoelasticity, the thickness is more preferably from 0.5 to 4 μm, even more preferably from 0.5 to 3 μm.

The maximum absorption wavelength (λmax) of the polymer made from the in-orientation polymerizable liquid crystal compound is preferably from 250 to 400 nm, more preferably from 280 to 390 nm, even more preferably from 300 to 380 nm, in particular preferably from 315 to 385 nm, especially preferably from 330 to 360 nm. When the maximum absorption wavelength (λmax) of the polymer made from the in-orientation polymerizable liquid crystal compound is the above-mentioned lower limit or higher, a retardation film made of this polymer tends to show reverse-wavelength dispersibility easily. When the maximum absorption wavelength (λmax) of the polymer made from the in-orientation polymerizable liquid crystal compound is the above-mentioned upper limit or lower, the polymer is restrained from absorbing light having visible ray wavelengths, so that the film is not easily colored.

The polymer made from the in-orientation polymerizable liquid crystal compound preferably satisfies the above-mentioned formula (1). When the polymer satisfies the formula (1), it is possible to restrain the retardation film, or an organic EL element or any other display element containing this polymer from being deteriorated by ultraviolet rays having wavelengths near 380 nm.

A liquid crystal cured layer (retardation film) made of the polymer made from the in-orientation polymerizable liquid crystal compound preferably has reverse-wavelength dispersibility. In short, the film preferably satisfies the formulae (5) and (6).

The retardation film of the present invention preferably includes a compound showing a maximum absorption wavelength (λmax) at a wavelength of 360 to 420 nm (hereinafter, this compound may be referred to as the "light selectively-absorbing compound"). When the retardation film of the invention contains the compound showing a maximum absorption wavelength (λmax) at a wavelength of 360 to 420 nm, the film shows a high light selective absorbency to visible rays having short wavelengths, so that the film can exhibit a high light resistance. Furthermore, when this film is used in a display device, the film can be obtained as a retardation film that can exhibit good display properties.

The compound showing a maximum absorption wavelength (λmax) at a wavelength of 360 to 420 nm is not particularly limited as far as the compound shows the above-mentioned absorbing property. The compound may be, for example, a known ultraviolet absorbent. The compound is preferably a compound showing a maximum absorption wavelength (λmax) at a wavelength of 380 to 430 nm, more preferably a compound showing light selective absorbency at wavelengths near 400 nm.

In the present invention, the light selectively-absorbing compound is, for example, a compound satisfying the following formula (3'):

$$0.4 \geq \varepsilon(420)/\varepsilon(400) \qquad (3')$$

wherein ε(420) represents the gram absorption coefficient of the compound at a wavelength of 400 nm; and ε(400), that of the compound at a wavelength of 420 nm.

As described above, the value ε(420)/ε(400) represents the absorption intensity of the light selectively-absorbing compound at the wavelength of 400 nm to that of the compound at the wavelength of 420 nm. As this value is smaller, greater is the possibility that the compound shows a specific absorption at wavelengths near 400 nm. When the retardation film of the present invention contains a compound having such an absorption property, a high light selective absorbency at wavelengths near 400 nm can be given to the retardation film so that the retardation film can be improved in light resistance. The compound shows a low absorption to blue light rays near 420 nm, which are emitted from an EL element or some other display element; thus, when a retardation film containing such a compound is used in a display device, the device can give good display properties without hindering the color formula thereof. The value ε(420)/ε(400) of the light selectively-absorbing compound is preferably 0.4 or less, more preferably 0.3 or less, even more preferably 0.25 or less, in particular preferably 0.23 or less, especially preferably 0.2 or less, and is, for example, 0.15 or less. The lower limit thereof is not particularly limited, and is usually preferably 0.01 to cause the light selectively-absorbing compound to keep an absorption function at wavelengths near 400 nm. In a preferred embodiment of the present invention, the value ε(420)/ε(400) is from 0.016 to 0.207.

In the present invention, the light selectively-absorbing compound preferably satisfies not only the formula (3') but also alto the following formulae (7) and (8):

$$\lambda max < 420 \text{ nm} \qquad (7); \text{ and}$$

$$\varepsilon(400) \geq 40 \qquad (8)$$

wherein λmax represents the maximum absorption wavelength of the light selectively-absorbing compound; and ε(400) represents the gram absorption coefficient of the compound at a wavelength of 400 nm. The unit of the gram absorption coefficient is "L/(g·cm)"

When the light selectively-absorbing compound satisfies the formulae (7) and (8), it can be mentioned that this compound is a compound in which the maximum absorption is present at a shorter wavelength than 420 nm and further a high absorption is shown at wavelengths near 400 nm. When the retardation film of the present invention contains this light selectively-absorbing compound, the film can give an optical laminate having a high light resistance without giving any effect onto display properties thereof. This case is also advantageous since this compound can exhibit a high absorption effect even in a small amount. In the present invention, the maximum absorption wavelength λmax of the light selectively-absorbing compound is more preferably 410 nm or less, even more preferably 400 nm or less. The value ε(400) is more preferably 60 or more, even more preferably 80 or more, in particular preferably 100 or more. The value ε(400) is usually 500 or less.

The light selectively-absorbing compound showing absorption properties described above is, for example, a compound represented by a formula (I) illustrated below. The compound represented by the formula (I) is excellent, for example, in that the compound has light selective absorbency and a high molar absorption coefficient, and is easily blended into the retardation film.

[Chem. 76]

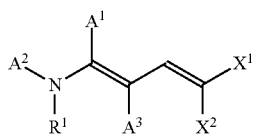

(I)

In the formula (I), $R^1$ represents a hydrogen atom or an alkyl group having 1 to 10 carbon atoms. From the viewpoint of the light selective absorbency to be targeted, R represent an alkyl group preferably having 1 to 8 carbon atoms, more preferably 1 to 5 carbon atoms, even more preferably 1 to 3 carbon atoms. When this alkyl group has one or more methylene groups, the methylene group or at least one of the methylene groups is optionally substituted with an oxygen or sulfur atom. Examples of this alkyl group include methyl, ethyl, n-propyl, isopropyl, n-butyl, tert-butyl, n-hexyl, n-octyl, n-decyl, methoxy, ethoxy, and isopropoxy groups.

In the formula (I), $A^1$, $A^2$ and $A^3$ each independently represent a hydrogen atom, an alkyl group having 1 to 6 carbon atoms, an aromatic hydrocarbon group, or an aromatic heterocyclic group. When the above-mentioned alkyl group has one or more methylene groups, the methylene group or at least one of the methylene groups is optionally substituted with a secondary amino group, or an oxygen or sulfur atom. Examples of this alkyl group include methyl, ethyl, n-propyl, isopropyl, n-butyl, tert-butyl, n-hexyl, methoxy, ethoxy, and isopropoxy groups.

In the formula (I), each of the aromatic hydrocarbon group and the aromatic heterocyclic group that is represented as each of $A^1$, $A^2$ and $A^3$ may have a substituent. Examples of the substituent include halogen atoms, alkyl groups having 1 to 6 carbon atoms, a cyano group, and a nitro group. This aromatic hydrocarbon group is preferably an aromatic hydrocarbon group having 6 to 12 carbon atoms, and is, for example, a phenyl or naphthyl group. The aromatic heterocyclic group is preferably an aromatic heterocyclic group having 3 to 9 carbon atoms, and is, for example, a pyridyl, pyrrolidinyl, quinolyl, thiophene, imidazolyl, oxazolyl, pyrrole, thiazolyl, or furanyl group.

$A^1$ and $A^2$, as well as $A^2$ and $A^3$, may be linked to each other to form a cyclic structure. The cyclic structure formed from $A^1$ and $A^2$ is, for example, a four- to eight-membered nitrogen-containing cyclic structure, and is preferably a five- or six-membered nitrogen-containing cyclic structure. Specific examples thereof include pyrrolidine, pyrroline, imidazolidine, imidazoline, oxazoline, thiazoline, piperidine, morpholine, and piperazine rings. These rings may have a substituent. Examples of the substituent may be the same as given as the examples of the substituent which each of the aromatic hydrocarbon group and the aromatic heterocyclic group that is represented as each of $A^1$, $A^2$ and $A^3$ may have.

The cyclic structure formed from $A^2$ and $A^3$ is, for example, a four- to eight-membered nitrogen-containing cyclic structure, and is preferably a five- or six-membered nitrogen-containing cyclic structure. Examples of the cyclic structure may be the same as given as the examples of the cyclic structure formed from $A^1$ and $A^2$. The cyclic structure formed from $A^1$ and $A^2$ may be combined with a different cyclic structure, such as an aromatic ring or an aliphatic ring, to form a condensed cyclic structure.

In the formula (I), $X^1$ and $X^2$ each independently represent an electron withdrawing group. Examples of the electron withdrawing group include —CN (cyano group), —NO$_2$ (nitro group), halogen atoms, alkyl groups each substituted with a halogen atom, and —Y$^1$—R$^4$ [wherein R$^4$ represents a hydrogen atom, an alkyl group having 2 to 50 carbon atoms, or an alkyl group having 2 to 50 carbon atoms and having one or more methylene groups in which the methylene group or at least one of the methylene groups is substituted with an oxygen atom and further a substituent may be bonded to any carbon atom of the alkyl group, and wherein Y$^1$ represents —CO—, —COO—, —OCO—, —NR$^5$CO, or —CONR$^6$— in which R$^5$ and R$^6$ each independently represent a hydrogen atom, an alkyl group having 1 to 6 carbon atoms, or a phenyl group]. $X^1$ and $X^2$ may be linked to each other to form a cyclic structure. Examples of the cyclic structure formed from $X^1$ and $X^2$ include a Meldrum's acid structure, a barbituric acid structure, and a dimedone structure.

$X^1$ is preferably —CN— (cyano group), —NO$_2$ (nitro group), a halogen atom, or —Y$^1$—R$^4$ wherein Y$^1$ is —CO—, —COO— or —OCO—, and is more preferably —CN— (cyano group), or —Y$^1$—R$^4$ wherein Y$^1$ is —COO— from the viewpoint of the light selective absorbency of the light selectively-absorbing compound, and the compatibility thereof with the raw material of the retardation film. In the same manner, from the viewpoint of the light selective absorbency and the compatibility with the raw material of the retardation film, $X^2$ is preferably —CN— (cyano group), —NO$_2$ (nitro group), a halogen atom, or —Y$^1$—R$^4$ wherein Y$^1$ is —CO—, —COO— or —OCO—. $X^2$ is more preferably -Y$^1$—R$^4$ wherein Y$^1$ is —COO—. Preferred is also a compound in which $X^1$ and $X^2$ are linked to each other to form a cyclic structure.

Specific examples of the light selectively-absorbing compound represented by the formula (I) include the following compounds:

a compound represented by the following (Ia):

[Chem. 77]

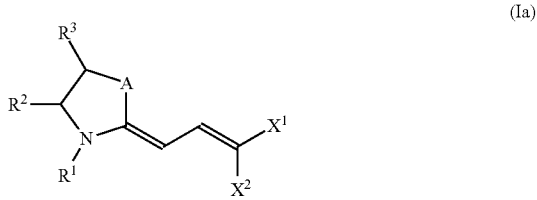

(Ia)

wherein $R^2$ and $R^3$ each independently represent a hydrogen atom, or an alkyl group having 1 to 12 carbon atoms;

A represents a methylene group, a secondary amino group, or an oxygen or sulfur atom; and $R^1$, $X^1$ and $X^2$ represent the same as described above; and a compound represented by the following formula (Ib):

[Chem. 78]

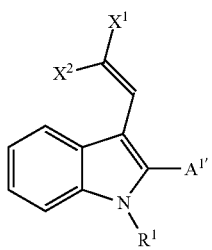

wherein $A^{1\prime}$ represents a hydrogen atom, an alkyl group having 1 to 6 carbon atoms, an aromatic hydrocarbon group, or an aromatic heterocyclic group provided that when the alkyl group has one or more methylene groups, the methylene group or at least one of the methylene groups is optionally substituted with a secondary amino group, or an oxygen or sulfur atom, and that the aromatic hydrocarbon group and the aromatic heterocyclic group each have a substituent; and $R^1$, $X^1$ and $X^2$ represent the same as described above.

From the viewpoint of the light selective absorbency of the light selectively-absorbing compound, in the formula (Ia), $R^2$ and $R^3$ are each preferably a hydrogen atom, or an alkyl group having 1 to 10 carbon atoms, more preferably a hydrogen atom or an alkyl group having 1 to 8 carbon atoms, even more preferably a hydrogen atom or an alkyl group having 1 to 5 carbon atoms, in particular preferably a hydrogen atom or an alkyl group having 1 to 3 carbon atoms, very preferably a hydrogen atom.

In the formula (Ia), A preferably represents a methylene group, or an oxygen atom to cause the light selectively-absorbing compound to express a high light selective absorbency.

In the formula (Ib), examples of the alkyl group represented as $A^{1\prime}$ include methyl, ethyl, n-propyl, isopropyl, n-butyl, tert-butyl, n-hexyl, methoxy, ethoxy, and isopropoxy groups. Each of the aromatic hydrocarbon group and the aromatic heterocyclic group that is represented as $A^{1\prime}$ may have a substituent. Examples of the substituent are the same as given as the examples of the substituent which each of the aromatic hydrocarbon group and the aromatic heterocyclic group that is represented as each of $A^1$, $A^2$ and $A^3$ may have. This aromatic hydrocarbon group is preferably an aromatic hydrocarbon group having 6 to 12 carbon atoms, for example, a phenyl or naphthyl group. The aromatic heterocyclic group is preferably an aromatic heterocyclic group having 3 to 9 carbon atoms, for example, a pyridyl, pyrrolidyl, quinolyl, thiophene, imidazolyl, oxazolyl, pyrrole, thiazolyl, or furanyl group. From the viewpoint of the easiness of the production of the compound, $A^1$ is preferably a phenyl or naphthyl group, more preferably a phenyl group.

Specific examples of the light selectively-absorbing compound represented by the formula (Ia) include the following:

[Chem. 79]

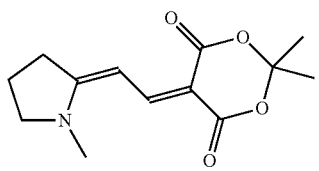

and a compound represented by the following formula (Ia-1):

[Chem. 80]

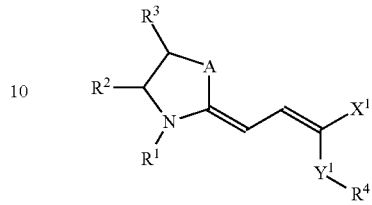

wherein A, $R^1$ to $R^4$, $X^1$ and $Y^1$ each represent the same as described above.

When the retardation film contains the light selectively-absorbing compound, it is particularly preferred from the viewpoint of the compatibility of the compound with the raw material of the retardation film that the retardation film contains the light selectively-absorbing compound represented by the formula (Ia-I)

About the alkyl group having 2 to 50 carbon atoms as $R^4$ in the formula (Ia-I), the number of carbon atoms therein is preferably from 2 to 30, more preferably from 2 to 20, even more preferably from 2 to 10 from the viewpoint of the affinity of the light selectively-absorbing compound with any hydrophobic substance, and/or the solubility thereof into any hydrophobic solvent, and economy.

About $R^4$ that is the alkyl group having 2 to 50 carbon atoms and having one or more methylene groups, the number of carbon atoms therein is preferably 3 to 45, more preferably from 4 to 40, even more preferably from 5 to 43, in particular preferably from 6 to 40, especially preferably from 8 to 38, very preferably from 10 to 35, very especially preferably from 12 to 34 from the viewpoint of the affinity of the light selectively-absorbing compound with any hydrophobic substance, and/or the solubility thereof into any hydrophobic solvent, and economy. The alkyl group represents, for example, an alkyl group having 14 to 32 carbon atoms. In the alkyl group having 2 to 50 carbon atoms and having one or more methylene groups, the methylene group or at least one of the methylene groups is substituted with an oxygen atom. Examples of the substituted group include methoxy, ethoxy, propoxy, 2-methoxyethoxymethyl, diethylene glycol, triethylene glycol, dipropylene glycol, and tripropylene glycol groups.

When $R^4$ is an alkyl group having 2 to 50 carbon atoms, particularly, an alkyl group having 3 to 50 carbon atoms, $R^4$ may be an alkyl group having a branched structure and having 3 to 12 carbon atoms, particularly, 6 to 10 from the viewpoint of the affinity of the light selectively-absorbing compound with any hydrophobic substance, and/or the solubility thereof in any hydrophobic solvent.

The alkyl group having a branched structure denotes an alkyl group having at least one carbon atom that is a tertiary carbon or quaternary carbon atom. Specific examples of the alkyl group having a branched structure and having 3 to 12 carbon atoms include alkyl groups having the following structures, respectively:

[Chem. 81]

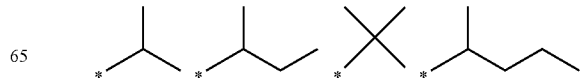

-continued

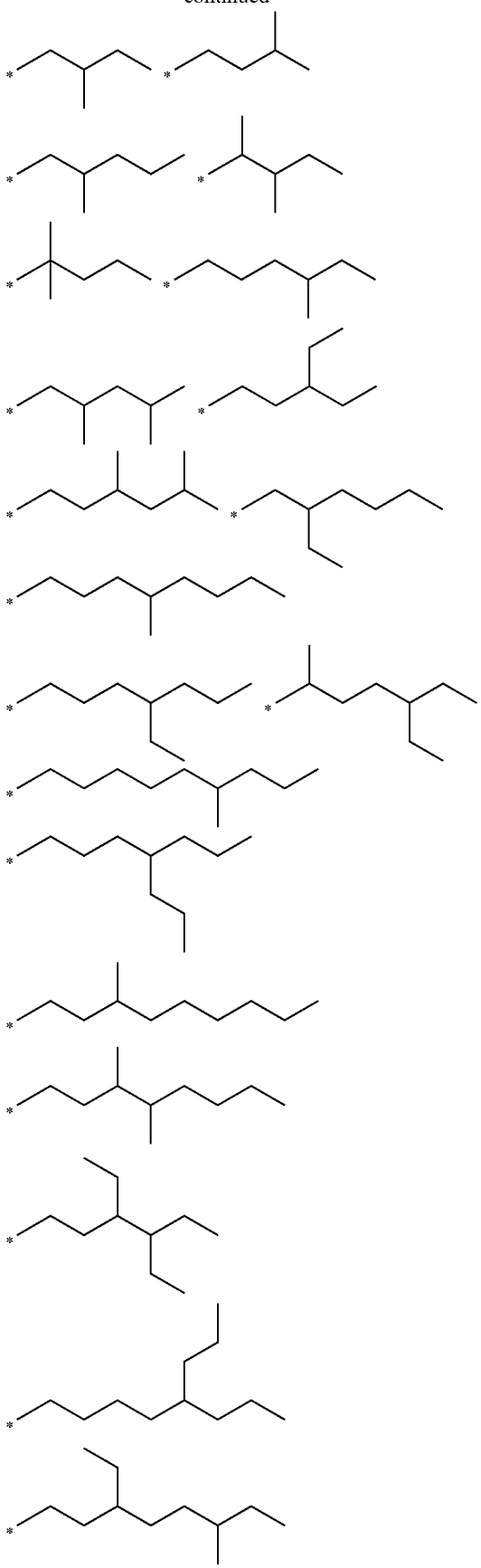

-continued

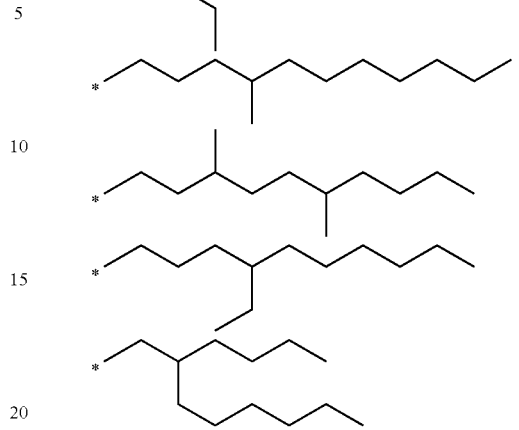

Each symbol * represents a linking moiety.

A substituent may be bonded onto any carbon atom of the alkyl group as $R^4$. Examples of the substituent include halogen atoms, alkyl groups having 1 to 6 carbon atoms, a cyano group, a nitro group, alkylsulfinyl groups having 1 to 6 carbon atoms, alkylsulfonyl groups 1 to 6 carbon atoms, alkylsulfonyl groups having 1 to 6 carbon atoms, a carboxyl group, fluoroalkyl groups having 1 to 6 carbon atoms, alkoxy groups having 1 to 6 carbon atoms, alkylthio groups having 1 to 6 carbon atoms, N-alkylamino groups having 1 to 6 carbon atoms, N, N-dialkylamino groups having 2 to 12 carbon atoms, N-alkylsulfamoyl groups having 1 to 6 carbon atoms, and N,N-dialkylsulfamoyl groups having 2 to 12 carbon atoms.

In the formula (Ia-I), $Y^1$ is preferably —CO—, —COO—, —OCO—, or O—, more preferably —CO—, —COO—, or OCO— from the viewpoint of the affinity of the light selective absorbency of the light selectively-absorbing compound, and the compatibility thereof with the composition for forming optically anisotropic layer.

An example of the compound represented by the formula (Ia-I) is a compound represented by the following formula (Ia-II):

[Chem. 82]

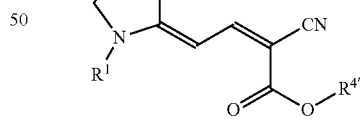

(Ia-II)

The compound represented by the formula (Ia-II) is high in light selective absorbency and excellent in affinity with any hydrophobic substance and solubility into any hydrophobic solvent. Thus, the retardation film of the present invention preferably contains the light selectively-absorbing compound represented by the formula (Ia-II):

In the formula (Ia-II), $R^1$ represents the same as described above. $R^{4'}$ represents a hydrogen atom or an alkyl group having 2 to 20 carbon atoms. When the alkyl group has one or more methylene groups, the methylene group or at least one of the methylene groups is optionally substituted with an oxygen atom. Examples of this alkyl group are the same as given as the examples for $R^4$ in the formula (Ia-I).

The compound represented by the formula (Ia-II) is, for example, a compound represented by the following formula (Ia-III):

[Chem. 83]

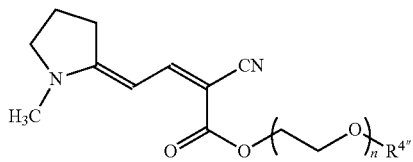

(Ia-III)

wherein $R^{4'''}$ represents an alkyl group having 1 to 6 carbon atoms, and n represents an integer of 1 to 10. The light selectively-absorbing compound represented by the formula (Ia-III) tends to have a high light selective absorbency at wavelengths near 400 nm, be excellent in solubility into various solvents and affinity with various compounds, and show amphiphilicity. For this reason, this compound can easily be dissolved in various solvents used in the present technical field and does not bleed out easily, and the compound can give a high light resistance to the retardation film. Accordingly, the light selectively-absorbing compound represented by the formula (Ia-III) is one light selectively-absorbing compound particularly preferred for the present invention.

In the formula (Ia-III), $R^{4'''}$ is preferably an alkyl group having 2 to 5 carbon atoms, more preferably an alkyl group having 3 or 4 carbon atoms. The symbol "n" is preferably an integer of 1 to 8, more preferably an integer of 1 to 6, and is, for example, an integer of 1 to 4, in particular, an integer of 1 to 3. When n is within any one of these ranges, the following advantages are produced: the light selectively-absorbing compound is good in solubility with any hydrophobic solvent and/or affinity with any hydrophobic substance; the compound is easily dissolved in any hydrophobic solvent in which a liquid crystal compound is to be dissolved as the raw material of the retardation film; and further the compound does not bleed out easily. When n is within any one of these ranges, the light absorbing property which each of the molecules of the light selectively-absorbing compound has is improved. Consequently, even when the amount of the compound (I) contained in the optical laminate is small, this compound can express a blue light ray cutting function. Moreover, when the compound represented by the formula (Ia-III) is incorporated into the retardation film, the compound does not easily hinder optical functions of the retardation film.

A specific example of the compound represented by the formula (Ia-III) is the following compound:

[Chem. 84]

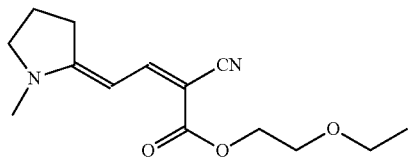

Specific examples of the light selectively-absorbing compound represented by the formula (Ib) include the following compounds:

[Chem. 85]

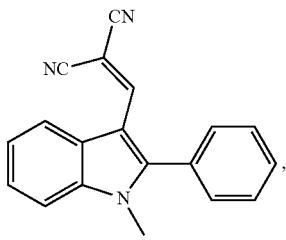

and
a compound represented by the following formula (Ib-1):

[Chem. 86]

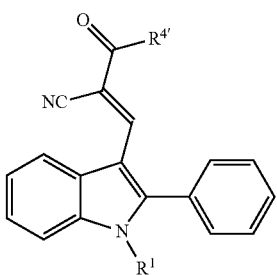

(Ib-1)

wherein $R^1$ and $R^{4'}$ are the same as described in the formula (Ia-II).

The light selectively-absorbing compound represented by the formula (Ib) is in particular preferably the compound represented by (Ib-1) from the viewpoint of the easiness of the production thereof.

Specific examples of the compound represented by the formula (Ib-I) include the following compounds:

[Chem. 87]

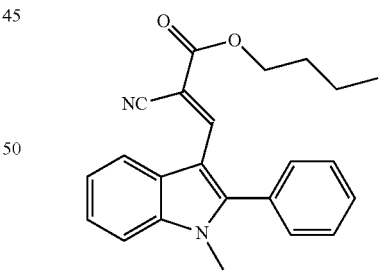

[Chem. 88]

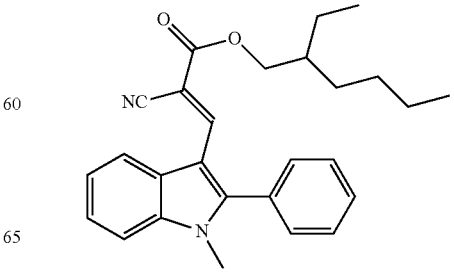

-continued

[Chem. 89]

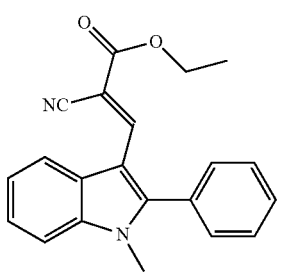

[Chem. 90]

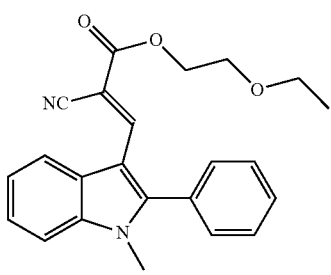

[Chem. 91]

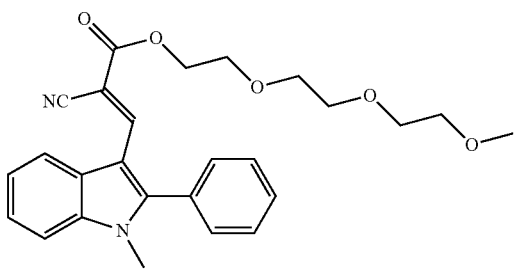

In the present invention, the retardation film preferably contains, as the light selectively-absorbing compound, at least one compound represented by the formula (I); more preferably contains at least one compound selected from the group consisting of compounds each represented by the formula (Ia) and compounds each represented by the formula (Ib); and even more preferably contains at least one compound selected from the group consisting of compounds each represented by the formula (Ia-I) and compounds each represented by the formula (Ib-I).

The compound represented by the above-mentioned formula (Ia-II) can be produced, for example, by converting 2-methylpyrroline with a methylating agent to a 1,2-dimethylpyrrolinium salt, subsequently causing the salt to react with N,N'-diphenylformamidine, and lastly causing the resultant to react with an active methylene compound in the presence of acetic anhydride and an amine catalyst. The compounds represented by the formulae (Ia), (Ia-I) and (Ia-III), respectively, can be produced by the same method as used to produce the compound represented by the formula (Ia-II). The compounds represented by the formulae (Ib) and (Ib-I), respectively, can each be obtained by causing 3-formylindole to react with an active methylene compound (Knoevenagel reaction). For the reaction, an amine catalyst may be together used. When $R^1$ in each of the formulae (Ib) and (Ib-1) is an alkyl group having 1 to 10 carbon atoms, a light selectively-absorbing compound to be targeted can be produced by causing a halogenated alkyl to react with 3-formylindole in the presence of a base catalyst, and then causing the resultant to react with an active methylene compound. These compounds may be commercially available products.

In the retardation film of the present invention, the optical absorption properties about the formulae (2) and (3) are controllable by blending one or more light selectively-absorbing compounds as defined above into the film. When the retardation film of the invention contains the light selectively-absorbing compound(s), for example, it is sufficient for the light selectively-absorbing compound(s) to be blended into the above-mentioned composition for forming optically anisotropic layer, which contains a polymerizable liquid crystal compound.

It is sufficient for the content of the light selectively-absorbing compound(s) to be appropriately determined in accordance with, for example, the species of the compound(s), a combination of the compounds, the species or the amount of a solvent to be used, and the film thickness of the retardation film. In an embodiment of the present invention, the content of the light selectively-absorbing compound(s) is preferably from 0.1 to 20 parts by mass, more preferably from 1 to 20 parts by mass, even more preferably from 3 to 12 parts by mass for 100 parts by mass of solid in the retardation film. When the retardation film contains the light selectively-absorbing compound(s) in an amount within any one of these ranges, the retardation film can be obtained as a desired retardation film without undergoing any precipitation from this film, or any other inconvenience with time. When the retardation film of the invention is a retardation film made of a polymerizable liquid crystal compound, the film can be obtained as a desired retardation film without hindering the orientation of the polymerizable liquid crystal compound.

Furthermore, the retardation film of the present invention may contain not only the light selectively-absorbing compound(s), which show(s) a high light selective absorbency near 400 nm, as described above, but also a known ultraviolet absorbent used generally in the present technical field, which shows absorption at wavelengths of 300 to 380 nm. Examples of the ultraviolet absorbent include triazole compounds, and triazine compounds. By using the ultraviolet absorbent together, the retardation film can be more effectively restrained from being deteriorated in performances by ultraviolet rays.

A different embodiment of the present invention provides an elliptically polarizing plate and a circularly polarizing plate each including the retardation film of the invention and a polarizing plate. When the retardation film of the invention is laminated onto a polarizing plate in an embodiment of the invention, it is preferred to attain the laminating to make an angle of substantially 45° by a slow axis (optical axis) of the retardation film and an absorption axis of the polarizing plate. By attaining the laminating to make the angle of substantially 45° by the slow axis (optical axis) of the retardation film of the invention and the absorption axis of the polarizing plate, the resultant can gain a function as a circularly polarizing plate. The laminating may be performed to make the slow axis of the retardation film of the invention substantially consistent with or orthogonal to the absorption axis of the polarizing plate. By making the slow axis of the retardation film of the invention substantially consistent with or orthogonal to the absorption axis of the polarizing plate, the resultant can also be caused to function as an optical compensation film. The formula "substantially 45°" usually denotes a range of 45±5°, and the formula "X substantially consistent with or orthogonal to Y" usually denotes that X and Y make an angle in a range of 0±5° or a range of 90±5°.

The above-mentioned polarizing plate is a member having a function of taking out linearly polarized light from natural light radiated into this plate. Specific examples of the polarizing plate include a monoaxially drawn polyvinyl alcohol based resin film in which a dichromic colorant, such as iodine or a dichromatic dye, is adsorbed and oriented. A coating type thin film polarizing plate may also be used. The coating type thin film polarizing plate may be any one selected from examples described in JP-A-2012-58381, JP-A-2013-37115, WO2012/147633, and WO2014/091921. The thickness of the polarizer is not particularly limited, and is usually from 0.5 to 35 μm.

The present invention can also provide an organic EL display device and a liquid crystal display device each having the above-mentioned elliptically polarizing plate or circularly polarizing plate. The elliptically polarizing plate or circularly polarizing plate of the invention is usable in a display device such as an organic EL display device or a liquid crystal display device after cut if necessary. The elliptically polarizing plate or circularly polarizing plate is usually bonded to a display device through a pressure-sensitive adhesive. A display device having the elliptically polarizing plate or circularly polarizing plate of the invention has not only light resistance against ultraviolet rays, but also a high light resistance against visible rays having short wavelengths near 400 nm. Thus, the polarizing plate is excellent in effect of restraining a deterioration of a display element or optical film included as one member of the display device. Simultaneously, the elliptically polarizing plate or circularly polarizing plate of the invention does not easily absorb light rays having wavelengths near 420 nm, which show blue, so that the display device can attain a good color formula.

EXAMPLES

Hereinafter, the present invention will be described in more detail by way of working examples thereof. In the examples, the symbol "%" and the word "part(s)" denote "% by mass" and "part(s) by mass", respectively, unless otherwise specified.

[Preparation of Composition for Forming Photo-Orientation Layer]

Five parts of an optically orienting material illustrated below were mixed with 95 parts of cyclopentanone (solvent), and the resultant mixture was stirred at 80° C. for 1 hour to yield a composition for forming photo-orientation layer. The following photo-orientation materials were synthesized by the method disclosed in JP-A-2013-33248.

[Chem. 92]

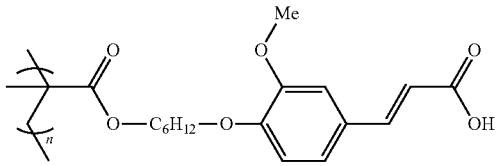

Optically Orienting Material
[Preparation of Composition a Containing Polymerizable Liquid Crystal Compound]

The following were mixed with each other to yield a composition A containing a polymerizable liquid crystal compound A illustrated below: the polymerizable liquid crystal compound A (12.0 parts); a polyacrylate compound (levelling agent: BYK-361N, manufactured by a company BYK-Chemie; 0.12 part); a polymerization initiator illustrated below (0.72 part); an optical absorbent (0.36 part); and cyclopentanone (solvent; 100 parts). The polymerizable liquid crystal compound A was synthesized by a method described in JP-A-2010-31223. An ultraviolet and visible ray spectrophotometer (UV 3150, manufactured by Shimadzu Corp.) was used to measure the maximum absorption wavelength λmax(LC) of the polymerizable liquid crystal compound A. As a result, the wavelength was 350 nm.
Polymerizable liquid crystal compound A:

[Chem. 93]

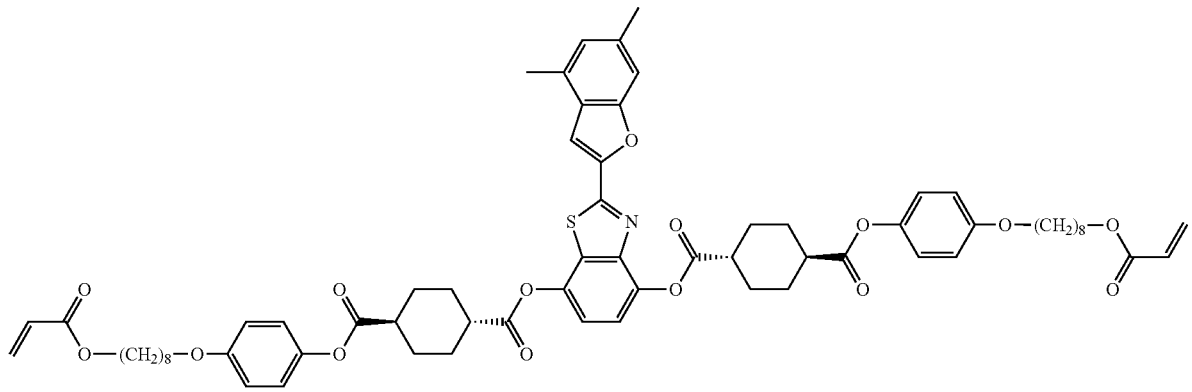

Polymerization initiator: 2-dimethylamino-2-benzyl-1-(4-morpholinophenyl)butane-1-one (IRGACURE 369, manufactured by the company BASF);
Levelling agent: polyacrylate compound (BYK-361N, manufactured by the company BYK-Chemie); and
Optical absorbent: BONASORB UA-3911 (manufactured by Orient Chemical Industries Co., Ltd., λmax=392 nm, ε(420)/ε(400)=0.207 (in 2-butanone), ε(400)=115 L/(g·cm), ε(420)=23.9 L/(g·cm)).
[Preparation of Composition B Containing Polymerizable Liquid Crystal Compound]

A composition B containing the polymerizable liquid crystal compound was yielded in the same way as used to prepare the composition A except the use of 0.36 part of BONASORB UA-3912 (manufactured by Orient Chemical Industries Co., Ltd.; λmax=386 nm, ε(420)/ε(400)=0.145 (in 2-butanone), ε(400)=66.3 L/(g·cm), ε(420)=9.6 L/(g·cm)) instead of the BONASORB UA-3911 as the optical absorbent.

[Preparation of Composition C Containing Polymerizable Liquid Crystal Compound]

A composition C containing the polymerizable liquid crystal compound was yielded in the same way as used to prepare the composition A except the use of 0.24 part of S0511 (manufactured by a company FEW Chemicals; λmax=392 nm, ε(420)/ε(400)=0.016 (in 2-butanone), ε(400)=197 L/(g·cm), ε(420)=3.2 L/(g·cm)) instead of the BONASORB UA-3911 as the optical absorbent.

[Preparation of Composition D Containing Polymerizable Liquid Crystal Compound]

A composition D containing the polymerizable liquid crystal compound was yielded in the same way as used to prepare the composition A except the use of 0.36 part of a compound UVA-01 (λmax=389 nm, ε(420)/ε(400)=0.015 (in 2-butanone), ε(400)=125 L/(g·cm), ε(420)=1.9 L/(g·cm)) instead of the BONASORB UA-3911 as the optical absorbent. The compound UVA-01 was prepared through the following steps:

Synthesis Example of Compound UVA-01

[Chem. 94]

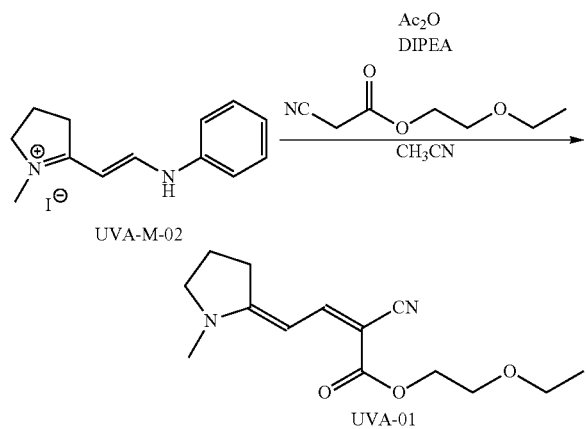

A 200-mL four-necked flask to which a Dimroth condenser and a thermometer were fitted was purged with nitrogen, and thereinto were charged 10 g of UVA-M-02 powder synthesized with reference to JP-A-2014-194508, 3.7 g of acetic anhydride (manufactured by Wako Pure Chemical Industries, Ltd.), 5.8 g of 2-ethoxyethyl cyanoacetate (manufactured by Tokyo Chemical Industry Co., Ltd.), and 60 g of acetonitrile (manufactured by Wako Pure Chemical Industries, Ltd.). These components were stirred with a magnetic stirrer. At a flask-internal-temperature of 25° C., 4.7 g of N,N-diisopropylethylamine (hereinafter abbreviated to DIPEA, manufactured by Tokyo Chemical Industry Co., Ltd.) was dropwise added into the flask through a dropping funnel over 1 hour. After the end of the addition, at a flask-internal-temperature of 25° C., the temperature of the inside was kept for 2 hours. After the end of the reaction, a pressure-reducing evaporator was used to remove acetonitrile. Toluene was added to the resultant oily substance. The produced insoluble component was removed by filtration. The pressure-reducing evaporator was used to concentrate the filtrate again, and the concentrated solution was subjected to column chromatography (silica gel) to be purified. The resultant was recrystallized from toluene to yield the target substance. The crystal was dried under a reduced pressure at 60° C. to yield 5.2 g of the UVA-01 as a yellow powder. The yield thereof was 65%. An ultraviolet and visible ray spectrophotometer (UV 3150, manufactured by Shimadzu Corp.) was used to measure the maximum absorption wavelength λmax(LC) of the UVA-01 in 2-butanone. As a result, the wavelength was 389 nm. The value ε(400) was 125 L/(g·cm), and the value ε(420)/ε(400) was 0.015. Furthermore, results obtained by measuring the resultant by $^1$H-NMR in CDCl$_3$ are as follows: $^1$H-NMR (CDCl$_3$) δ: 1.21 (t, 3H), 2.10 (quin. 2H), 2.98-3.04 (m, 5H), 3.54-3.72 (m, 6H), 4.31 (t, 2H), 5.53 (d, 2H), and 7.93 (d, 2H).

[Preparation of Composition E Containing Polymerizable Liquid Crystal Compound]

A composition E containing the polymerizable liquid crystal compound B was yielded in the same way as used to prepare the composition A except that the optical absorbent was not used.

[Preparation of Composition F Containing Polymerizable Liquid Crystal Compound]

A composition F containing a polymerizable liquid crystal compound B was yielded in the same way as used to prepare the composition A except the following: instead of the polymerizable liquid crystal compound A, as the compound B, a polymerizable liquid crystal compound B illustrated below (Paliocolor LC242 (registered trademark), manufactured by the company BASF; 12.0 parts) was used; and as the optical absorbent, the above-mentioned compound UVA-01 (1.44 parts) was used. An ultraviolet and visible ray spectrophotometer (UV 3150, manufactured by Shimadzu Corp.) was used to measure the maximum absorption wavelength λmax(LC) of the polymerizable liquid crystal compound B. As a result, the wavelength was 252 nm.

Polymerizable Liquid Crystal Compound B:

[Chem. 95]

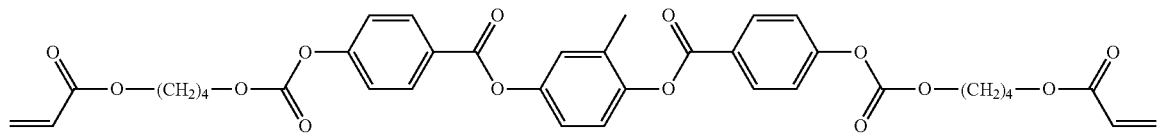

[Production of Each Polarizing Plate]

A polyvinyl alcohol film (average polymerization degree: about 2400, and saponification degree: 99.9% by mole or more) having a thickness of 30 μm was monoaxially drawn 4 times in a dry drawing manner, and further immersed in pure water of 40° C. temperature for 40 seconds while the strained state of the film was kept. Thereafter, the film was immersed in a dye solution of iodine and potassium iodide in water (ratio by mass of $I_2$/KI/$H_2O$=0.044/5.7/100) at 28° C. for 30 seconds to be dyed. Next, the film was immersed in a boric acid solution in water (ratio by mass of KI/$H_3BO_4$/$H_2O$=11.0/6.2/100) at 70° C. for 120 seconds. Subsequently, the film was washed with pure water of 8° C. temperature for 15 seconds. Thereafter, in the state of holding the film at a tension of 300 N, the film was dried at 60° C. for 50 seconds and at 75° C. for 20 seconds to yield each polarizer of 12 μm thickness in which iodine was adsorbed and oriented into the polyvinyl alcohol film.

An aqueous adhesive was injected into between the resultant polarizer and a cycloolefin polymer film (COP, ZF-14 manufactured by Zeon Corporation and having no UV absorbing property), and then nip rolls were used to bond the two onto each other. While the tension of the resultant bonded body was kept at 430 N/m, the body was dried at 60° C. for 2 minutes to yield a polarizing plate having, on one of the surfaces thereof, the cycloolefin film as a protection film. The above-mentioned aqueous adhesive was prepared by adding, to 100 parts of water, 3 parts of a carboxyl-group-modified polyvinyl alcohol (KURARAY POVAL KL318, Kuraray Co., Ltd.), and 1.5 parts of a water-soluble polyamide epoxy resin (aqueous solution thereof having a solid concentration of 30%: SUMIREZ RESIN 650, manufactured by Sumika Chemtex Co., Ltd.).

The degree of polarization Py and the single transmittance Ty of the resultant polarizing plate were measured as follows:

An instrument in which a polarizer-attached filter was set to an ultraviolet and visible ray spectrophotometer (UV 3150, manufactured by Shimadzu Corp.) was used to measure the single transmittance ($T^1$) in the transmission axis direction and the single transmittance ($T^2$) in the absorption axis direction of the polarizing plate within a wavelength range from 380 to 680 nm at intervals of 2 nm by a double beam method. Formulae (p) and (q) described below were used to calculate the single transmittance and the degree of polarization at each of the wavelengths. Furthermore, the resultant values were subjected to luminous correction, using a 2-degree visual field (C illuminant) according to JIS Z8701 to calculate the luminous transmittance (Ty) and the luminous degree of polarization (Py). As a result, the obtained polarizing plate was an absorption type polarizing plate in which the luminous transmittance Ty was 43.0% and the luminous degree of polarization Py was 99.99%. The transmittance of the polarizing plate was 40.3% at a wavelength of 380 nm, and that at a wavelength of 400 nm was 40.8%, that at a wavelength of 420 nm was 41.2%, and that at a wavelength of 430 nm was 42.4%.

Single transmittance $Ty$ (%)={$(T^1+T^2)/2$}×100  (p)

Plarization degree $Py$ (%)={$(T^1-T^2)/(T^1+T^2)$}×100  (q)

Example 1

[Production of Optically Anisotropic Layer 1]

A corona treatment apparatus (AGF-B10, manufactured by Kasuga Electric Works Ltd.) was used to treat a cycloolefin polymer film (COP; ZF-14, manufactured by Zeon Corp.) once at a power of 0.3 kW and a treating speed of 3 m/minute. A bar coater was used to apply the above-mentioned composition for forming photo-orientation layer onto the corona-treated film surface, and the workpiece was dried at 80° C. for 1 minute. A polarized UV radiating apparatus (polarized-unit-attached SPOT CURE SP-7, manufactured by Ushio Inc.) was used to expose the workpiece to polarized UV rays at a light integral dose of 100 mJ/$cm^2$ to form an orientation layer. The thickness of the resultant orientation layer was measured, using an ellipsometer M-220 (manufactured by JASCO Corp.). As a result, the film was 100 nm.

Subsequently, a bar coater was used to apply the previously prepared polymerizable-liquid-crystal-compound-containing composition A onto the orientation layer, and the workpiece was dried at 120° C. for 1 minute. Thereafter, a high-pressure mercury lamp (UNICURE VB-15201BY-A, manufactured by Ushio Inc.) was used to radiate ultraviolet rays (in a nitrogen atmosphere; light integral dose at a wavelength of 313 nm: 500 mJ/$cm^2$) to the workpiece from the composition-A-applied surface thereof to form an optical film including an optically anisotropic layer 1 (retardation film). The thickness of the resultant optically anisotropic layer 1 was measured, using a laser microscope (LEXT, manufactured by Olympus Corp.). As a result, the thickness was 2.1 μm.

A pressure-sensitive adhesive (acrylic pressure-sensitive adhesive sheet, manufactured by Lintec Corp.) was bonded onto the optically anisotropic layer 1 side of the resultant optical film, and then the resultant was bonded onto the polarizing plate treated with the corona treatment apparatus (AGF-B10, manufactured by Kasuga Electric Works Ltd.) once at the power of 0.3 kw and the treating speed of 3 m/minute. At this time, these members were laminated onto each other to set, to 45°, an angle-relationship of the slow axis of the optically anisotropic layer 1 with the absorption axis of the polarizing plate. In this way, a circularly polarizing plate was formed. Thereafter, the COP film as the substrate was peeled off therefrom to yield a circularly polarizing plate 1 in which the optically anisotropic layer 1 was transferred onto the polarizing plate.

[Measurement of In-Plane Retardation Value Re (λ) and Absorbance A (λ)]

In order to measure the in-plane retardation value Re (λ) and the absorbance A (λ) of the optically anisotropic layer 1, the same adhesive as described above was bonded to the optically anisotropic layer 1 side of an optical film produced separately in the same way as described above. The resultant was transferred onto a glass piece in the same way to produce a measuring sample. This sample was used to measure the respective in-plane retardation values Re (λ) at wavelengths of 450 nm, 550 nm, and 630 nm through a birefringence measuring instrument (KOBRA-WR, manufactured by a company Oji Scientific Instruments). Moreover, an ultraviolet and visible ray spectrophotometer (UV-3150, manufactured by Shimadzu Corp.) was used to measure the respective absorbances A (λ) at wavelengths of 380 nm, 400 nm, and 420 nm. The results are shown in Table 1.

[Measurement of Transmittance T(λ) of Circularly Polarizing Plate]

A glass piece was bonded onto the optically anisotropic film side of the resultant circularly polarizing plate through a pressure-sensitive adhesive (acrylic pressure-sensitive adhesive sheet, manufactured by Lintec Corp.). The ultraviolet and visible ray spectrophotometer was used in the same manner to measure a transmission spectrum of the resultant in a range of wavelengths from 300 to 800 nm. In Table 2 are shown the respective transmittance T(λ) at wavelengths of 380 nm, 400 nm, 420 nm, and 430 nm. The results are shown in Table 2.

[Measurement of Reflected Color Phase of Circularly Polarizing Plate]

Through the same adhesive as described above, an aluminum reflecting substrate (product number: HA0323, manufactured by Hikari Co., Ltd.) was bonded onto the optical orientation layer side of the circularly polarizing plate 1 in this order. Light from a C illuminant was radiated onto this bonded body from the circularly polarizing plate 1 side thereof along a 6°-angle direction to measure a reflection spectrum thereof. From the resultant reflection spectrum and a color-matching function of the C illuminant, the chromaticities a* and b* of the reflected color phase of the circularly polarizing plate in the L*a*b (CIE) color system were calculated. The results are shown in Table 2.

[Light Talking-Out Efficiency of OLED]

On the basis of the emission spectrum of the OLED and the transmission spectrum of the circularly polarizing plate, the light taking-out efficiency of the OLED was calculated. The results are shown in Table 2. For reference, $\lambda_{BLUE}=430$ nm, $\lambda_{GREEN}$ 550 nm, and $\lambda_{RED}=620$ nm.

"OLED light taking-out efficiency (%)"="OLED emission intensity (λ)"×"circularly polarizing plate transmittance (%)"

Example 2

An optically anisotropic layer 2 and a circularly polarizing plate 2 were produced in the same way as in Example 1 except that instead of the composition A, the composition B was used. In Table 1 are shown the thickness, the in-plane retardation value Re (λ) and the absorbance A (λ) of the optically anisotropic layer 2. In Table 2 are shown the transmittance T (λ), the reflected color phase and the OLED light taking-out efficiency of the circularly polarizing plate.

Example 3

An optically anisotropic layer 3 and a circularly polarizing plate 3 were produced in the same way as in Example 1 except that instead of the composition A, the composition C was used. In Table 1 are shown the thickness, the in-plane retardation value Re (λ) and the absorbance A (λ) of the optically anisotropic layer 3. In Table 2 are shown the transmittance T (λ), the reflected color phase and the OLED light taking-out efficiency of the circularly polarizing plate.

Example 4

An optically anisotropic layer 4 and a circularly polarizing plate 4 were produced in the same way as in Example 1 except that instead of the composition A, the composition D was used. In Table 1 are shown the thickness, the in-plane retardation value Re (λ) and the absorbance A (λ) of the optically anisotropic layer 4. In Table 2 are shown the transmittance T (λ), the reflected color phase and the OLED light taking-out efficiency of the circularly polarizing plate.

Example 5

An optically anisotropic layer 5 and a circularly polarizing plate 5 were produced in the same way as in Example 1 except that instead of the composition A, the composition F was used. In Table 1 are shown the thickness, the in-plane retardation value Re (λ) and the absorbance A (λ) of the optically anisotropic layer 5. In Table 2 are shown the transmittance T (λ), the reflected color phase and the OLED light taking-out efficiency of the circularly polarizing plate.

Comparative Example 1

An optically anisotropic layer 6 and a circularly polarizing plate 6 were produced in the same way as in Example 1 except that instead of the composition A, the composition E was used. In Table 1 are shown the thickness, the in-plane retardation value Re (λ) and the absorbance A (λ) of the optically anisotropic layer 6. In Table 2 are shown the transmittance T (λ), the reflected color phase and the OLED light taking-out efficiency of the circularly polarizing plate.

TABLE 1

|  | Thickness [μm] | Re(450) [nm] | Re(550) [nm] | Re(630) [nm] | A(380) | A(400) | A(420) | A(420)/A(400) |
|---|---|---|---|---|---|---|---|---|
| Example 1 | 2.1 | 130 | 152 | 155 | 2.83 | 0.69 | 0.26 | 0.38 |
| Example 2 | 2.1 | 131 | 149 | 153 | 2.59 | 0.53 | 0.14 | 0.27 |
| Example 3 | 2.1 | 128 | 149 | 153 | 2.84 | 1.34 | 0.14 | 0.11 |
| Example 4 | 2.1 | 129 | 151 | 153 | 3.84 | 1.15 | 0.15 | 0.13 |
| Example 5 | 1.2 | 160 | 148 | 143 | 2.20 | 2.22 | 0.17 | 0.07 |
| Comparative Example 1 | 2.1 | 129 | 151 | 153 | 2.15 | 0.13 | 0.03 | 0.23 |

TABLE 2

|  | Transmittance of circularly polarizing plate | | | | Reflected color phase | | | OLED light taking-out efficiency | | |
|---|---|---|---|---|---|---|---|---|---|---|
|  | T(380) [%] | T(400) [%] | T(420) [%] | T(430) [%] | L* | a* | b* | $\lambda_{Blue}$ [%] | $\lambda_{Green}$ [%] | $\lambda_{Red}$ [%] |
| Example 1 | 0.1 | 8.3 | 22.6 | 39.6 | 26 | −3.6 | −1.6 | 40 | 46 | 46 |
| Example 2 | 0.2 | 12.0 | 29.8 | 40.5 | 26 | −3.1 | −2.5 | 41 | 46 | 46 |
| Example 3 | 0.1 | 1.9 | 29.8 | 41.4 | 25 | −2.3 | −1.7 | 41 | 46 | 46 |
| Example 4 | 0.0 | 2.9 | 29.2 | 41.4 | 25 | −2.2 | −1.9 | 41 | 46 | 46 |
| Example 5 | 0.6 | 0.2 | 27.9 | 41.4 | 25 | 5.7 | −13.4 | 41 | 46 | 46 |
| Comparative Example 1 | 0.7 | 30.2 | 38.5 | 42.4 | 25 | −3.4 | −5.1 | 42 | 46 | 46 |

[Ultraviolet Ray Exposure Test]

Each of the circularly polarizing plates of Examples 1 to 4 and Comparative Example 1, which were produced as described, was bonded through a pressure-sensitive adhesive onto a glass piece. The circularly polarizing plate was then charged into a carbon arc weather-resistant testing machine (SUNSHINE WETHER METER, manufactured by Suga Test Instruments Co., Ltd.; 78.5 W/m² at wavelengths of 300 to 400 nm) to make an ultraviolet ray exposure test of the plate for 200 hours by exposing the polarizing plate side of this plate to ultraviolet rays. The birefringence measuring instrument (KOBRA-WR, manufactured by the company Oji Scientific Instruments) was used to measure the respective in-plane retardation values Re (λ) at wavelengths of 450 nm, 550 nm and 630 nm of the polarizing plate before and after the exposure. The results are shown in Table 3.

TABLE 3

|  | Before exposure to light | | | | After exposure to light | | | |
| --- | --- | --- | --- | --- | --- | --- | --- | --- |
|  | Re(450) [nm] | Re(550) [nm] | Re(630) [nm] | Re(450)/ Re(550) | Re(450) [nm] | Re(550) [nm] | Re(630) [nm] | Re(450)/ Re(550) |
| Example 1 | 130 | 152 | 155 | 0.855 | 141 | 155 | 157 | 0.910 |
| Example 2 | 131 | 149 | 153 | 0.879 | 143 | 153 | 153 | 0.934 |
| Example 3 | 128 | 149 | 153 | 0.859 | 130 | 150 | 152 | 0.870 |
| Example 4 | 129 | 151 | 153 | 0.854 | 134 | 153 | 155 | 0.876 |
| Comparative Example 1 | 129 | 151 | 153 | 0.854 | 148 | 149 | 149 | 0.993 |

The respective circularly polarizing plates of Examples 1 to 5 make it possible to cut off blue light rays efficiently from ultraviolet rays originating from natural light without hindering light emitted from the OLED. It is understood that this matter makes it possible to protect a display element such as an OLED, and further relieve, when he/she views the display, his/her tired feeling. About the change in the value Re(450)/Re(550) before and after the exposure in the ultraviolet ray exposure test, the respective circularly polarizing plates 1 to 4 of Examples 1 to 4 are smaller than the circularly polarizing plate 6 of Comparative Example 1. Thus, it is understood that a decline in the wavelength dispersibility of the retardation film of the present invention is also overcome. Furthermore, in Examples 1 to 5, the reflected color phase of natural light is also close to a neutral hue, so that these examples can attain a cleaner display.

What is claimed is:

1. A retardation film, satisfying all of the following formulae (1) to (4):

$$2 \leq A(380) \tag{1}$$

$$0.5 \leq A(400) \tag{2}$$

$$0.4 \geq A(420)/A(400) \tag{3}$$

$$100\ nm \leq Re(550) \leq 170\ nm \tag{4}$$

wherein each A(λ) represents the absorbance of the film at a wavelength of λ nm, and Re(550) represents the in-plane retardation value of the film to a light ray having a wavelength of 550 nm, the retardation film being a layer comprising a compound showing a maximum absorbance at a wavelength of 380 to 430 nm and a polymer which is made from a polymerizable liquid crystal compound having an acryloyl group in an orientation state, the compound showing a maximum absorbance at a wavelength of 380 to 430 nm being represented by the formula (Ia):

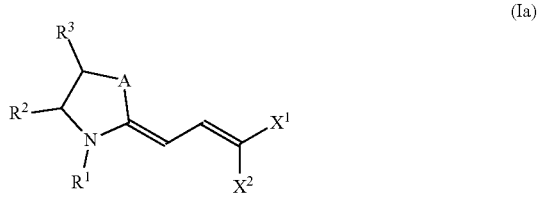

wherein $R^1$ represents a hydrogen atom or an alkyl group having 1 to 10 carbon atoms provided that when the alkyl group has one or more methylene groups, the methylene group or at least one of the methylene groups is optionally substituted with an oxygen atom or a sulfur atom, $R^2$ and $R^3$ each independently represent a hydrogen atom, or an alkyl group having 1 to 12 carbon atoms, A represents a methylene group, a secondary amino group, or an oxygen atom or sulfur atom, and $X^1$ and $X^2$ each independently represent an electron withdrawing group, and $X^1$ and $X^2$ may be linked to each other to form a cyclic structure, and the content of the compound showing a maximum absorbance at a wavelength of 380 to 430 nm being from 1 to 20 parts by mass for 100 parts by mass of solid in the retardation film, and the retardation film having an optical property represented by the following formulae (5) and (6):

$$Re(450)/Re(550) \leq 1 \tag{5, and}$$

$$1 \leq Re(650)/Re(550) \tag{6}$$

wherein each Re(λ) represents the in-plane retardation value of the film to a light ray having a wavelength of λ nm.

2. The retardation film according to claim 1, which has a thickness of 0.5 to 5 μm both inclusive.

3. The retardation film according to claim 1, wherein the polymer, which is made from the orientation-state polymerizable liquid crystal compound, shows a maximum absorption at a wavelength of 300 to 400 nm, and further shows an absorption satisfying the formula (1).

4. A circularly polarizing plate, comprising the retardation film recited to claim 1, and a polarizing plate laminated over the retardation film, wherein a slow axis of the retardation film and an absorption axis of the polarizing plate make an angle of substantially 45°.

5. An organic EL display device, comprising the circularly polarizing plate recited in claim 4.

6. An elliptically polarizing plate, comprising the retardation film recited in claim 1, and a polarizing plate laminated over the retardation film,
  a slow axis of the retardation film being consistent with or orthogonal to an absorption axis of the polarizing plate.

7. A liquid crystal display device, comprising the elliptically polarizing plate recited in claim 6.

8. The retardation film according to claim 1, wherein the compound showing a maximum absorbance at a wavelength of 380 nm to 430 nm is from 3 to 12 parts by mass per 100 parts by mass of solid in the retardation film.

* * * * *